US012484952B2

(12) United States Patent
Sano et al.

(10) Patent No.: US 12,484,952 B2
(45) Date of Patent: Dec. 2, 2025

(54) ELECTRO-THERMAL THERAPY FOR THE TREATMENT OF DISEASED OR UNWANTED TISSUE

(71) Applicant: North Carolina State University, Raleigh, NC (US)

(72) Inventors: Michael Benjamin Sano, Cary, NC (US); Christopher Carl Fesmire, Cary, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 918 days.

(21) Appl. No.: 17/056,198

(22) PCT Filed: May 31, 2019

(86) PCT No.: PCT/US2019/034886
§ 371 (c)(1),
(2) Date: Nov. 17, 2020

(87) PCT Pub. No.: WO2019/232358
PCT Pub. Date: Dec. 5, 2019

(65) Prior Publication Data
US 2021/0212753 A1    Jul. 15, 2021

Related U.S. Application Data

(60) Provisional application No. 62/678,554, filed on May 31, 2018.

(51) Int. Cl.
*A61B 18/14* (2006.01)
*A61B 18/00* (2006.01)
*A61B 18/12* (2006.01)

(52) U.S. Cl.
CPC ............... *A61B 18/1477* (2013.01); *A61B 2018/00577* (2013.01); *A61B 2018/00702* (2013.01);
(Continued)

(58) Field of Classification Search
CPC ...... A61B 18/1477; A61B 2018/00577; A61B 2018/00702; A61B 2018/00761;
(Continued)

(56) References Cited

U.S. PATENT DOCUMENTS

| 5,385,544 A * | 1/1995 | Edwards ................ A61N 1/40 604/164.08 |
| 6,022,316 A | 2/2000 | Eppstein et al. |

(Continued)

FOREIGN PATENT DOCUMENTS

| CN | 87100574 A | 8/1987 |
| CN | 105283143 A | 1/2016 |

(Continued)

OTHER PUBLICATIONS

Extended European Search Report for European Application No. 19812482.8 (11 pages) (Feb. 9, 2022).
(Continued)

*Primary Examiner* — Michael F Peffley
*Assistant Examiner* — Bo Ouyang
(74) *Attorney, Agent, or Firm* — Myers Bigel, P.A.

(57) ABSTRACT

A method for performing electrothermal therapy (ETT) includes inserting one or more electrodes into a target tissue, inserting one or more temperature sensors into the target tissue, selecting a pulse waveform for a plurality of electrical pulses, and delivering to the target tissue the plurality of electrical pulses having the selected pulse waveform through the one or more electrodes, wherein a delay between ones of the plurality of electrical pulses is selected based on a temperature reading from the one or more temperature sensors.

21 Claims, 32 Drawing Sheets

(52) U.S. Cl.
CPC ............... *A61B 2018/00761* (2013.01); *A61B 2018/00797* (2013.01); *A61B 2018/126* (2013.01); *A61B 2018/1467* (2013.01)

(58) Field of Classification Search
CPC .... A61B 2018/00797; A61B 2018/126; A61B 2018/1467
See application file for complete search history.

(56) References Cited

U.S. PATENT DOCUMENTS

| | | |
|---|---|---|
| 2003/0225331 A1 | 12/2003 | Diederich |
| 2005/0096584 A1 | 5/2005 | Ferek-Petric |
| 2012/0215213 A1 | 8/2012 | Juzkiw et al. |
| 2012/0215218 A1 | 8/2012 | Lipani |
| 2013/0253415 A1 | 9/2013 | Sano et al. |
| 2014/0025064 A1 | 1/2014 | Collins et al. |
| 2015/0150618 A1 | 6/2015 | Onik et al. |
| 2016/0166310 A1* | 6/2016 | Stewart ............... A61B 18/1492 606/34 |
| 2016/0166312 A1 | 6/2016 | Johnston |
| 2016/0184003 A1 | 6/2016 | Srimathveeravalli et al. |
| 2016/0324575 A1 | 11/2016 | Panescu et al. |
| 2016/0331441 A1* | 11/2016 | Konings ............... A61N 1/327 |
| 2016/0367310 A1* | 12/2016 | Onik ............... A61N 1/327 |
| 2017/0035499 A1 | 2/2017 | Stewart et al. |
| 2017/0065343 A1 | 3/2017 | Mickelsen |
| 2017/0245928 A1 | 8/2017 | Xiao et al. |
| 2017/0266438 A1* | 9/2017 | Sano ............... A61B 18/1477 |
| 2017/0348525 A1 | 12/2017 | Sano et al. |
| 2017/0348539 A1 | 12/2017 | Schwarz et al. |
| 2018/0071014 A1 | 3/2018 | Neal et al. |
| 2018/0263685 A1* | 9/2018 | Onik ............... A61B 18/18 |
| 2021/0212753 A1 | 7/2021 | Sano et al. |

FOREIGN PATENT DOCUMENTS

| | | |
|---|---|---|
| CN | 105792883 A | 7/2016 |
| WO | 2007014003 A2 | 2/2007 |
| WO | 2018005511 A1 | 1/2018 |
| WO | 2019232358 A1 | 12/2019 |

OTHER PUBLICATIONS

"Cell membrane", Wikipedia, retrieved from https://en.wikipedia.org/w/index.php?title=Cell_membrane&oldid=899062612 (6 pages) (May 27, 2019).

Al-Sakere et al. "Tumor ablation with irreversible electroporation" PloS One 2(11):e1135-e1135 (Nov. 2007).

Arena et al. "High-frequency irreversible electroporation (H-FIRE) for non-thermal ablation without muscle contraction" Biomed. Eng. Online 10:102-102 (2011).

Dong et al. "First Human Trial of High-Frequency Irreversible Electroporation Therapy for Prostate Cancer" Technol. Cancer Res. Treat. 17:1533033818789692-1533033818789692 (Jul. 2018).

El-Shabouri "Positively charged nanoparticles for improving the oral bioavailability of cyclosporin-A" Int. J. Pharm. 249(1):101-108 (Dec. 2002).

Hickey et al. "Control of polymeric nanoparticle size to improve therapeutic delivery" J. Control. Release Off. J. Control. Release Soc. 219:536-547 (Dec. 2015).

Kamaly et al. "Degradable Controlled-Release Polymers and Polymeric Nanoparticles: Mechanisms of Controlling Drug Release" Chem. Rev. 116(4):2602-2663 (Feb. 2016).

O'Brien et al. "Effects of internal electrode cooling on irreversible electroporation using a perfused organ model" Int. J. Hyperthermia 35:44-55 (2019).

Rogers et al. "Strength-duration curve for an electrically excitable tissue extended down to near 1 nanosecond" IEEE Transactions on Plasma Science 32(4):1587-1599 (2004).

Sano et al. "Burst and continuous high frequency irreversible electroporation protocols evaluated in a 3D tumor model" Phys. Med. Biol. 63(13):35022 (2018).

Sano et al. "Bursts of Bipolar Microsecond Pulses Inhibit Tumor Growth" Sci. Rep. 5:14999 (Oct. 2015).

Sano et al. "In-vitro bipolar nano- and microsecond electro-pulse bursts for irreversible electroporation therapies" Bioelectrochemistry 100:69-79 (2014).

Sano et al. "Production of Spherical Ablations Using Nonthermal Irreversible Electroporation: a Laboratory Investigation Using a Single Electrode and Grounding Pad" Spec. Issue Interv. Oncol. 27(9):1432-1440.e3 (Sep. 2016).

Sano et al. "Reduction of Muscle Contractions during Irreversible Electroporation Therapy Using High Frequency Bursts of Alternating Polarity Pulses: a Laboratory Investigation in an Ex Vivo Swine Model" J Vasc Interv Radiol. 29(6):893-898.e4 (2018).

Smith et al. "Active mechanisms are needed to describe cell responses to submicrosecond, megavolt-per-meter pulses: cell models for ultrashort pulses" Biophysical Journal 95:1547-1563 (2008).

Weaver et al. "A brief overview of electroporation pulse strength-duration space: a region where additional intracellular effects are expected" Bioelectrochemistry 87:236-243 (2012).

Xia et al. "Salt-Induced Charge Screening and Significant Conductivity Enhancement of Conducting Poly(3,4-ethylenedioxythiophene): Poly(styrenesulfonate)" Macromolecules 42(12):4141-4147 (Jun. 2009).

International Search Report and the Written Opinion of the International Searching Authority corresponding to International Patent Application No. PCT/US19/034886 (10 pages) (mailed Aug. 20, 2019).

Fesmire et al. "Irreversible electroporation is a thermally mediated ablation modality for pulses on the order of one microsecond" Bioelectrochemistry (May 5, 2020).

Pucihar et al. "Equivalent Pulse Parameters for Electroporation" IEEE Transactions on Biomedical Engineering 58(11) (Nov. 2011).

Retelj et al. "Electroporation of Intracellular Liposomes Using Nanosecond Electric Pulses-A Theoretical S" IEEE Transactions on Biomedical Engineering 60(9) (Sep. 2013).

Notification Concerning Transmittal of International Preliminary Report on Patentability (Chapter I of the Patent Cooperation Treaty) mailed Dec. 10, 2020 for corresponding International Application No. PCT/US2019/034886.

\* cited by examiner

FIG. 2A    FIG. 2B

ELECTRO-THERMAL THERAPY FOR THE TREATMENT OF DISEASED OR UNWANTED TISSUE

CROSS-REFERENCE TO RELATED APPLICATION

This application claims the benefit, under 35 U.S.C. § 119(e), of U.S. Provisional Application No. 62/678,554, filed May 31, 2018, the entire contents of which is hereby incorporated herein by reference.

FIELD

The present invention relates generally to methods and devices for destruction of unwanted tissues (tumors, vasculature, endothelium, etc.).

BACKGROUND

The ablation of unwanted soft tissue can be achieved by many means, including surgical excision, application of excessive amount of ionizing radiation or other forms of energy (excessive heating and cooling), exposure to cytotoxic chemicals, or by a combination of these means. It is common to use these means to destroy neoplasms. Treatments known in the art involve surgical intervention to physically remove the aberrant cell mass, radiation to kill the cells of the aberrant cell mass, exposure of aberrant cells to toxic chemicals (i.e., chemotherapy), or a combination of such techniques. While each treatment modality has shown significant effectiveness in treatment of various cell proliferative diseases, no one technique has been shown to be highly effective at treating all types of cell proliferative diseases and disorders.

While surgical intervention is effective at removal of solid tumors on tissues and organs that are physically accessible and capable of sustaining physical damage or capable of regeneration, surgical intervention can be difficult to perform on tumors that are not readily accessible or on organs that do not regenerate. In these cases, surgical intervention can often involve substantial physical damage to the patient, requiring extensive recuperation times and follow-on treatments. At other times, the extensive growth of the neoplasm prevents removal, since attempts at removal would likely kill the patient. Likewise, treatment with radiation can result in collateral damage to tissue surrounding the tumor, and can cause long-lasting side-effects, which can lower the quality of life of the patient. Chemotherapeutic treatments can cause systemic damage to the patient, and can result in significant side effects that might require a long recuperation period or cause permanent damage to tissues and organs.

Recent work by the inventors has focused on the ablation of unwanted soft tissue (malignant tumors) by application of excessive electrical energy, using a technique termed Irreversible Electroporation (IRE). Successful control and/or ablation of soft tissue sarcoma and malignant glioma have been achieved. Irreversible electroporation (IRE) involves placing electrodes within or near the targeted region to deliver a series of low energy, microsecond electric pulses. These pulses permanently destabilize the cell membranes of the targeted tissue (e.g., tumor), thereby killing the cells.

SUMMARY

Pursuant to embodiments of the present invention, a method for performing electrothermal therapy (ETT) includes inserting one or more electrodes into a target tissue, selecting a pulse waveform for a plurality of electrical pulses, and delivering to the target tissue the plurality of electrical pulses having the selected pulse waveform through the one or more electrodes, wherein a delay between ones of the plurality of electrical pulses is selected based on a temperature reading from the one or more temperature sensors.

In some embodiments, a volume of tissue to be treated is controlled by adjusting a rate of energy delivery by the plurality of electrical pulses to induce hyperthermic temperatures in the target tissue and/or permeabilize or rupture membranes of cells and/or induce apoptotic cell death in a target volume.

In some embodiments, the pulse waveform is a symmetric bipolar waveform that comprises positive and negative pulses with a same duration.

In some embodiments, the pulse waveform is an asymmetric waveform that comprises positive pulses with positive durations and negative pulses with negative durations.

In some embodiments, sums of the positive durations of the positive pulses and sums of the negative durations of the negative pulses are equal.

In some embodiments, sums of the positive durations and sums of the negative durations are selected so as to minimize muscle contractions.

In some embodiments, a sum of the positive durations and the negative durations are between 0.02 microseconds and 5000 microseconds every second, preferably between 1 and 500 microseconds every second.

In some embodiments, selecting the pulse waveform comprises selecting an average energy delivered per second by the pulse waveform, selecting symmetric, asymmetric, or charge balanced pulse waveforms, selecting a width of positive and negative pulses of the pulse waveform, and/or selecting a treatment voltage.

In some embodiments, delivering to the target tissue the plurality of electrical pulses compromises delivering a sum of positive durations and negative durations between 0.0001 seconds and 100 seconds, preferably between 0.01 seconds and 1 second.

In some embodiments, after delivering to the target tissue the plurality of electrical pulses, the target tissue comprises thermal necrosis that is surrounded by cells with their membranes destroyed.

In some embodiments, after delivering to the target tissue the plurality of electrical pulses, the target tissue comprises thermal necrosis that is surrounded by cells that are undergoing apoptosis.

In some embodiments, after delivering to the target tissue the plurality of electrical pulses, the target tissue comprises cells with their membranes destroyed and with no thermal necrosis or thermal necrosis of less than 1 $cm^3$.

In some embodiments, after delivering to the target tissue the plurality of electrical pulses, the target tissue comprises cells undergoing apoptosis and with no thermal necrosis or thermal necrosis of less than 1 $cm^3$.

In some embodiments, after delivering to the target tissue the plurality of electrical pulses, the target tissue comprises thermal necrosis that is surrounded by cells that have had their membranes permeabilized.

In some embodiments, after delivering the plurality of electrical pulses, the target tissue comprises cells with their membranes permeabilized and with no thermal necrosis or thermal necrosis of less than 1 $cm^3$.

In some embodiments, selecting the pulse waveform comprises selecting positive electrical pulses comprising a first voltage magnitude and negative electrical pulses comprising a second voltage magnitude, and a first absolute value of the first voltage magnitude is within 10% of a second absolute value of the second voltage magnitude.

In some embodiments, the positive electrical pulses and the negative electrical pulses have a same duration of 0.01 to 10 microseconds.

In some embodiments, the positive electrical pulses and the negative electrical pulses have different durations, each with a duration of 0.01 to 10 microseconds.

In some embodiments, the positive electrical pulses and the negative electrical pulses have different durations, and a first total on-time duration of the positive electrical pulses is substantially equal to a second total on-time duration of the negative electrical pulses.

In some embodiments, selecting the pulse waveform comprises selecting positive electrical pulses and negative electrical pulses, and a first voltage magnitude of the positive electrical pulses is different than a second voltage magnitude of the negative electrical pulses.

In some embodiments, the positive electrical pulses and the negative electrical pulses have a same duration of 0.1 to 10 microseconds.

In some embodiments, the positive electrical pulses and the negative electrical pulses have a same duration of 0.01 to 10 microseconds.

In some embodiments, the positive electrical pulses have a first duration, and the negative electrical pulses have a second duration, different from the first duration.

In some embodiments, the first duration and the second duration are each from 0.01 to 10 microseconds.

In some embodiments, the positive electrical pulses deliver a positive electrical charge that is substantially equal to a negative electrical charge delivered by the negative electrical pulses.

In some embodiments, the method may further include introducing an adjunctive compound into the target tissue.

Pursuant to embodiments of the present invention, an apparatus for electrothermal therapy (ETT) includes one or more electrodes for insertion into a target tissue, one or more temperature sensors, and a computer controller configured to perform operations including selecting a pulse waveform comprising a plurality of electrical pulses, generating the plurality of electrical pulses having the selected pulse waveform, wherein the pulse waveform has a delay between ones of the electrical pulses, controlling the delay between ones of the plurality of electrical pulses based on a temperature reading from the one or more temperature sensors, and delivering the plurality of electrical pulses through the one or more electrodes.

In some embodiments, the apparatus further includes a high voltage switching circuit comprising a plurality of switches to create an H-Bridge configuration that are configured to deliver the plurality of electrical pulses comprising positive and negative polarity from a high voltage power supply.

In some embodiments, the apparatus further includes a plurality of switches in an H-Bridge or totem pole configuration that are configured to deliver the plurality of electrical pulses comprising positive and negative polarity from a positive and a negative power supply.

In some embodiments, the apparatus further includes a transformer coupled to a plurality of switches in an H-Bridge or totem pole configuration to step up a lower voltage to a higher voltage.

In some embodiments, the apparatus further includes a voltage source connected to a capacitor. In some embodiments, the capacitor is a plurality of capacitors.

In some embodiments, a volume of tissue to be ablated is controlled by adjusting a rate of energy delivery by the plurality of electrical pulses to induce hyperthermic temperatures in the target tissue and/or permeabilize or rupture membranes of cells in a target volume.

In some embodiments, the pulse waveform is a symmetric bipolar waveform that comprises positive and negative pulses with a same duration.

In some embodiments, the pulse waveform is an asymmetric waveform that comprises positive pulses with positive durations and negative pulses with negative durations.

In some embodiments, sums of the positive durations of the positive pulses sums of the negative durations of the negative pulses are equal.

In some embodiments, a sum of the positive durations and the negative durations are between 0.02 microseconds and 5000 microseconds every second, preferably between 1 and 500 microseconds every second.

In some embodiments, selecting the pulse waveform comprises selecting an average energy delivered per second by the pulse waveform, selecting symmetric, asymmetric, or charge balanced pulse waveforms, selecting a width of positive and negative pulses of the pulse waveform, and/or selecting a treatment voltage.

In some embodiments, delivering to the target tissue the plurality of electrical pulses compromises delivering a sum of positive durations and negative durations between 0.0001 seconds and 100 seconds, preferably between 0.01 seconds and 1 second.

In some embodiments, after delivering the plurality of electrical pulses, the target tissue comprises thermal necrosis that is surrounded by cells with their membranes destroyed.

In some embodiments, after delivering the plurality of electrical pulses, the target tissue comprises thermal necrosis that is surrounded by cells that are undergoing apoptosis.

In some embodiments, after delivering the plurality of electrical pulses, the target tissue comprises cells with their membranes destroyed and with no thermal necrosis or thermal necrosis of less than 1 $cm^3$.

In some embodiments, after delivering the plurality of electrical pulses, the target tissue comprises cells undergoing apoptosis and with no thermal necrosis or thermal necrosis of less than 1 $cm^3$.

In some embodiments, after delivering to the target tissue the plurality of electrical pulses, the target tissue comprises thermal necrosis that is surrounded by cells that have had their membranes permeabilized.

In some embodiments, after delivering the plurality of electrical pulses, the target tissue comprises cells with their membranes permeabilized and with no thermal necrosis or thermal necrosis of less than 1 $cm^3$.

In some embodiments, selecting the pulse waveform comprises selecting positive electrical pulses comprising a first voltage magnitude and negative electrical pulses comprising a second voltage magnitude, and a first absolute value of the first voltage magnitude is within 10% of a second absolute value of the second voltage magnitude.

In some embodiments, the positive electrical pulses and the negative electrical pulses have a same duration of 0.01 to 10 microseconds.

In some embodiments, the positive electrical pulses and the negative electrical pulses have different durations, each with a duration of 0.01 to 10 microseconds.

In some embodiments, the positive electrical pulses and the negative electrical pulses have different durations, and a first total on-time duration of the positive electrical pulses is substantially equal to a second total on-time duration of the negative electrical pulses.

In some embodiments, selecting the pulse waveform comprises selecting positive electrical pulses and negative electrical pulses, and a first voltage magnitude of the positive electrical pulses is different than a second voltage magnitude of the negative electrical pulses.

In some embodiments, the positive electrical pulses and the negative electrical pulses have a same duration of 0.1 to 10 microseconds.

In some embodiments, the positive electrical pulses and the negative electrical pulses have a same duration of 0.01 to 10 microseconds.

In some embodiments, the positive electrical pulses have a first duration, and the negative electrical pulses have a second duration, different from the first duration.

In some embodiments, the first duration and the second duration are each from 0.01 to 10 microseconds.

In some embodiments, the positive electrical pulses deliver a positive electrical charge that is substantially equal to a negative electrical charge delivered by the negative electrical pulses.

In some embodiments, the computer controller is further configured to control an introduction of an adjunctive compound into the target tissue.

Pursuant to embodiments of the present invention, a computer program product includes a tangible non-transitory computer readable storage medium comprising computer readable program code embodied in the computer readable storage medium that when executed by at least one processor causes the at least one processor to perform operations comprising generating a user interface configured to control an administration of an electrothermal therapy (ETT) treatment to target tissue, accepting, via the user interface, input parameters for controlling an area of tissue ablation via the ETT treatment, responsive to the input parameters, selecting a pulse waveform comprising a plurality of electrical pulses, generating the plurality of electrical pulses having the selected pulse waveform, wherein the pulse waveform has a delay between ones of the electrical pulses, and controlling the delay between ones of the plurality of electrical pulses based on a temperature reading of the target tissue and the input parameters.

In some embodiments, the operations further include controlling a high voltage switching circuit to deliver the plurality of electrical pulses through one or more electrodes into the target tissue.

In some embodiments, the operations further include receiving the temperature reading from one or more temperature sensors in the target tissue.

In some embodiments, the input parameters comprise a treatment area and/or maximum temperature of the target tissue.

In some embodiments, the input parameters comprise a medical image, and the operations further include accepting, via the user interface, a first selection within the medical image of a first area to be treated.

In some embodiments, the operations further include accepting, via the user interface, a second selection within the medical image of a second area to be protected.

In some embodiments, the operations further include generating, via the user interface, an indication of a placement location for at least one electrode.

In some embodiments, the indication of the placement location for the at least one electrode is overlaid on an ultrasound, CT, or MRI image.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages, and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

Other features of embodiments of the present disclosure will be more readily understood from the following detailed description of specific embodiments thereof when read in conjunction with the accompanying drawings, in which:

FIGS. 2A and 2B illustrate ring and pin electrodes used for the in vitro experiments, according to embodiments described herein.

DETAILED DESCRIPTION

Figure 1A:
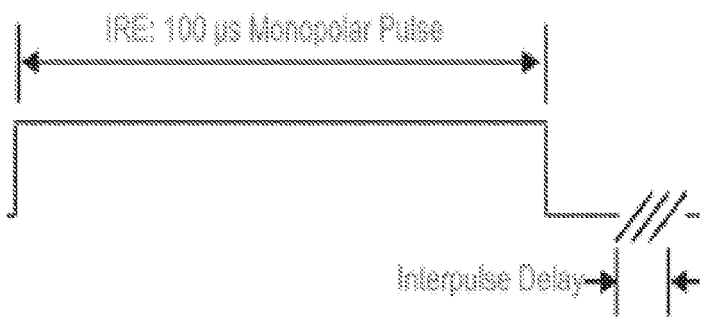
FIGS. 1A and 1B illustrate example waveform and electrode configurations, respectively, for IRE treatments.

Various embodiments will be described more fully hereinafter with reference to the accompanying drawings. Other embodiments may take many different forms and should not be construed as limited to the embodiments set forth herein. Like numbers refer to like elements throughout.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Figure 1B:
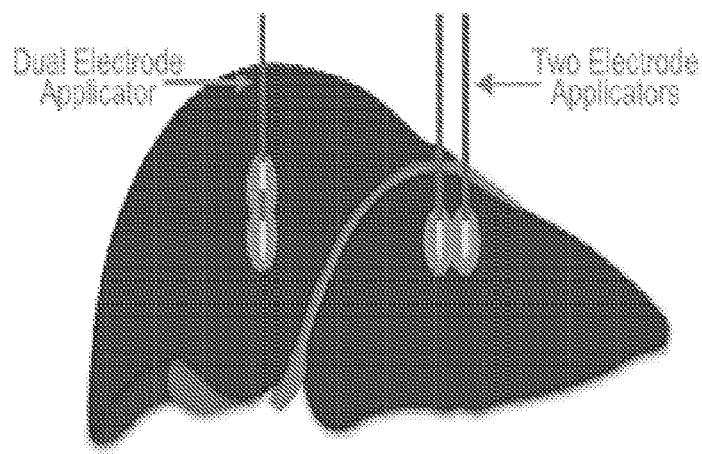

Irreversible electroporation (IRE) is a non-thermal minimally invasive tissue ablation technique which uses electric fields to create irreparable defects in the membranes of cells within a well-defined volume. As illustrated in FIGS. 1A and 1B, IRE treatments deliver a series of positive polarity pulses which must be delivered with cardiac synchronization via electrodes collocated in the tissue under treatment to keep muscle contractions within medically manageable ranges. This technique does not rely on thermal mechanisms to induce cell death which enables it to be employed for the treatment of tumors near critical nerve and blood vessels. Irreversible electroporation has been used clinically for approximately a decade and is available under the trade name the NanoKnife™ (NK-IRE). NK-IRE uses long duration (70-100 μs) positive-polarity pulses (e.g., FIG. 1A), which are highly effective at inducing electroporative effects. However, these pulses also induce intense muscle contractions which must be medically managed via a rigorous anesthetic protocol including neuromuscular paralytics. Reports of persistent muscle stimulation in spite of anesthesia and practical limitations associated with administering high doses of neuromuscular paralytics will likely constrain NK-IRE voltages to 3000 V or less. The long duration NK-IRE pulses may also lead to adverse cardiac events which necessitates that pulses be delivered in absolute synchrony with the patient's heartbeat.

The treatment of a 3 cm tumor with NK-IRE typically requires the placement of four applicators and delivery of three rounds of 90 pulses between each pair (6 pairs×90 pulses×3 rounds≈1620 pulses, total-energized time≈0.16 s) yielding total treatment times on the order of 35 minutes. Treatment planning for NK-IRE treatments can be more challenging than for other interventional ablative techniques as the electric field distribution around the electrodes can take on an oblong oval or peanut shape (e.g., FIG. 1B), which can become distorted by heterogeneities in the tissue.

Figure 1C:
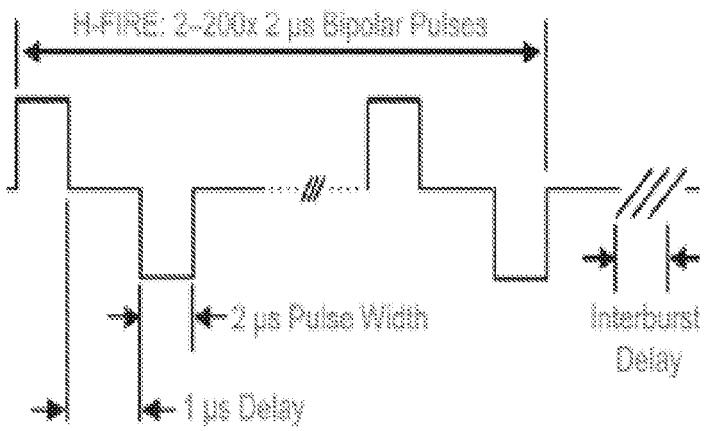
FIGS. 1C and 1D illustrate example waveform and electrode configurations, respectively, for H-FIRE treatments.
Figure 1D:
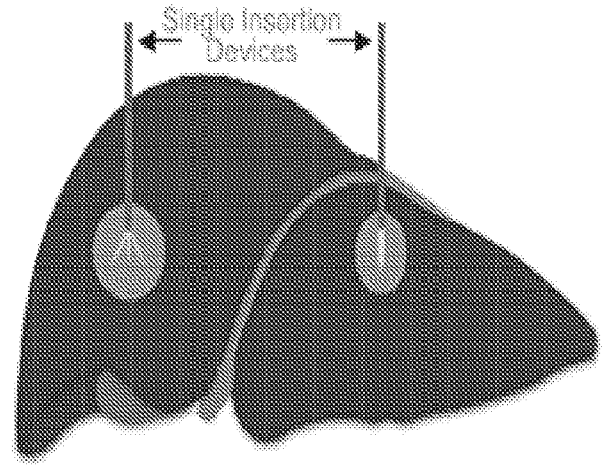

High frequency irreversible electroporation (H-FIRE) alleviates some of these challenges by using high-voltage alternating-polarity electrical pulses (e.g., FIG. 1C), which are shorter in duration (0.25-5 μs) than NK-IRE pulses. As illustrated in FIGS. 1C and 1D, H-FIRE treatments deliver multiple bursts containing alternating polarity pulses which can be delivered via traditional 2-electrode configurations or with single insertion devices in conjunction with a distal grounding pad (not shown). These alternating polarity pulses dramatically reduce the intensity of muscle contractions compared to NK-IRE which may enable the creation of substantially larger ablations by permitting the use of significantly higher treatment voltages. Additionally, by reducing the intensity of muscle contractions, H-FIRE enables the use of a single electrode applicator and grounding pad (A+GP) configuration (e.g., FIG. 1D), which may be contraindicated for NK-IRE treatments due to the uncontrollable stimulation of a large volume of muscle tissue between the electrical source and sink.

High frequency treatments may be less susceptible to distortion by inhomogeneities (blood vessels, nerves, fat, connective tissues) in the tissue under treatment resulting in ablations, which more closely reflect pre-operative treatment plans. Preliminary in vitro studies also indicate that H-FIRE may be able to achieve a degree of malignant targeting due to morphological changes associated with malignant cells (increased membrane capacitance, larger nucleus-to-cytoplasm ratio, etc.). In vivo, H-FIRE has been shown to be an effective technique for inhibiting tumor growth, and preliminary large animal studies indicate that the treatment can be administered with only local anesthetic.

On an equivalent energy basis, H-FIRE ablations are smaller than those created with NK-IRE, and the electric field required to induce cell death ($E_{lethal}$) increases as the constitutive pulse duration decreases. For example, an in vitro H-FIRE treatment delivering 100× bursts each energized for 100 µs was reported to have a lethal electric field threshold of approximately 794 V/cm and 1497 V/cm when the constitutive pulses were 5 µs and 1 µs in duration, respectively. Energy-dose matched NK-IRE treatments resulted in a lethal threshold of 463 V/cm$^3$. The symmetry of H-FIRE waveforms also appears to play an important role in electroporation, and asymmetric waveforms may reduce lethal thresholds (465 V/cm and 577 V/cm for 5 µs and 1 µs asymmetric waveforms, respectively) at the expense of inducing more intense muscle contractions.

There are a number of important waveform parameters related to H-FIRE have not yet been fully investigated. To further investigate H-FIRE, a 3D tumor model was used to evaluate the effect that number of bursts, burst repetition rate, burst-energized time, and total-energized time have on the H-FIRE lethal threshold in search of an improved treatment protocol. A finite element model was then used to predict ablation sizes possible with an A+GP electrode configuration for hypothetical treatment voltages between 1 kV and 10 kV.

It was found that increasing the number of 100 µs H-FIRE bursts from 100× to 1000× substantially decreased the electric field required to induce cell death. For these high-energy treatments, where the total-energized time was on the order of 0.05-0.1 s, it appears that the traditional H-FIRE procedure of delivering 100 µs bursts at 1 Hz bursts is not optimal. For example, because all of the energy is delivered in a burst, it is difficult to dynamically adjust the energy delivery rate to account for tissue heating or failure to reach a particular temperature threshold.

Electro-thermal therapy (ETT) is a new cancer therapy that uses ultra-short duration high-voltage electrical pulses to elevate the temperature of the tissues to induce mild hyperthermia and/or permeabilize or rupture the membranes of cells within a well-defined volume. The embodiments described herein result, in part, from a realization that ETT treatment can be improved to treat tumors which are 1-4 cm in as little as 100 seconds. Additionally, ETT treatment can be applied to the mucosal linings of the lungs, stomach, intestinal track, etc. for the treatment of emphysema, Zollinger-Ellison syndrome, gastritis, diabetes, etc. For example, emphysema is caused by overproduction of mucus by the cells lining the bronchi. Eliminating or reducing the number of these mucus producing cells may help alleviate the symptoms or eliminate the condition. Similarly, gastritis is an inflammation in the cells lining the stomach. Elimination of these cells or alternatively, reducing the number of Parietal (acid producing) cells may alleviate the symptoms of gastritis. Recent research has shown that a significant number of patients undergoing gastric bypass surgery experience some form of diabetes remission. Similarly, the placement of a gastric sleeve to cover the duodenum has shown significant reduction in diabetes. It has been found that the cells lining the duodenum play a major role in the development of insulin resistance. It may be possible to manage or cure diabetes, if the cells lining the duodenum can be eliminated.

ETT protocols which continuously delivered 4 µs waveforms (one positive and one negative 2 µs pulse) were evaluated in a three dimensional tumor model where temperature could be monitored in real time. A 100 Hz ETT protocol resulted in a volume of cell death, which corresponded to an electric field iso-contour of 476 V/cm. ETT protocols were compared to irreversible electroporation (IRE) protocols and finite element simulations using 5 kV waveforms predicted an IRE ablation volume of 3.9 cm$^3$ (1.7 cm diameter) and a maximum ETT ablation volume of 5.3 cm$^3$ (2.4 cm diameter). Ablations as large as 15.7 cm$^3$ (3.3 cm diameter) are predicted for ETT treatments with 10 kV pulses.

ETT uses mild hyperthermia to enhance the lethal effects of these high frequency waveforms. Lower $E_{lethal}$ were found for treatments consisting of a continuous stream of 4 µs waveforms (one positive and one negative pulse) repeated at 25-100 Hz until a total-energized time of about 0.05 or 0.1 s was reached (250-1000 s total treatment times). Simulated treatments with an A+GP electrode configuration resulted in ETT ablations that were smaller than voltage matched NK-IRE ablations when the total-energized time of the two protocols were identical (0.01 s); however, higher total-energized time (0.02 s, 0.05 s, and 0.1 s) ETT protocols produced larger simulated ablations than the baseline (0.01 s) NK-IRE protocol.

Cell Culture and 3D Tumor Model

U-118 MG Grade IV human glioblastoma cells (HTB-15, ATCC Inc., Manassas, VA) were cultured in DMEM (11965118, Gibco, Gaithersburg, MD), supplemented with 10% V/V Fetal Bovine Serum (A3160601, Gibco, Gaithersburg, MD) and 2% V/V Penicillin-Streptomycin solution (15070063, Gibco, Gaithersburg, MD) until reaching approximately 80% confluence. The cells were then harvested via trypsinization (25200056, Gibco, Gaithersburg, MD), centrifuged, and suspended in fresh media at a concentration of 1×10$^6$ cells/mL. Three dimensional (3D) tumor constructs were created by mixing the concentrated cell suspension with PureCol EZ gel (5074-35ML, Advanced Biomatrix, San Diego, CA) in a 1 to 1 ratio to achieve a 2.5 mg/mL concentration of type 1 collagen and 5×10$^5$ cells/mL. 500 µL of the cell/collagen mixture was then transferred into each well of 12-well plates. The mixture was allowed to solidify overnight at 37° C. in an incubator then an additional 500 µL of media was added to keep the gels hydrated until treatment.

Experimental In-Vitro Treatments

FIGS. 2A and 2B illustrate ring and pin electrodes used for the in vitro experiments. The custom ring and pin electrode may produce circular ablations. The outer ring was fabricated from 19 mm outer diameter 0.89 mm thick 316 stainless steel tubing (89785K259, McMaster-Carr, Douglasville, GA). The inner pin was fabricated from a 1.64 mm outer diameter blunt 304 stainless steel dispensing needle (75165A552, McMaster-Carr, Douglasville, GA). The ring and pin assembly was held in place using a friction fit to a custom laser cut acrylic holder and an electrical connection to the outer ring was made via a friction fit to a 1.63 mm outer diameter blunt 304 stainless steel dispensing needle. The entire assembly was designed to hold the electrodes flush against the bottom at the center of the well. A custom pulse generator based on an H-Bridge topology was used for all IRE and H-FIRE experiments.

Figure 8A:
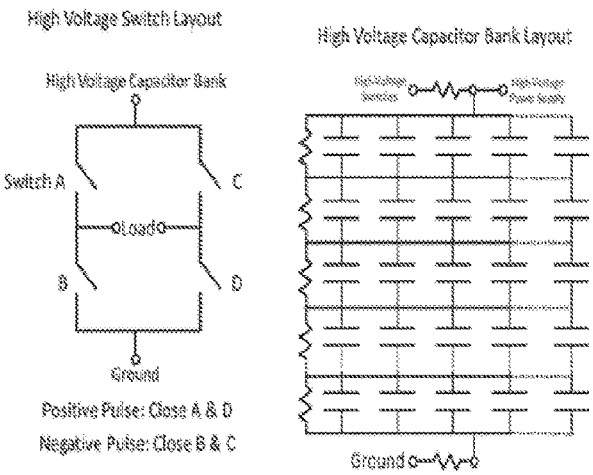
FIGS. 8A, 8B, and 8C illustrate example configurations for pulse generators, according to embodiments described herein.
Figure 8B:
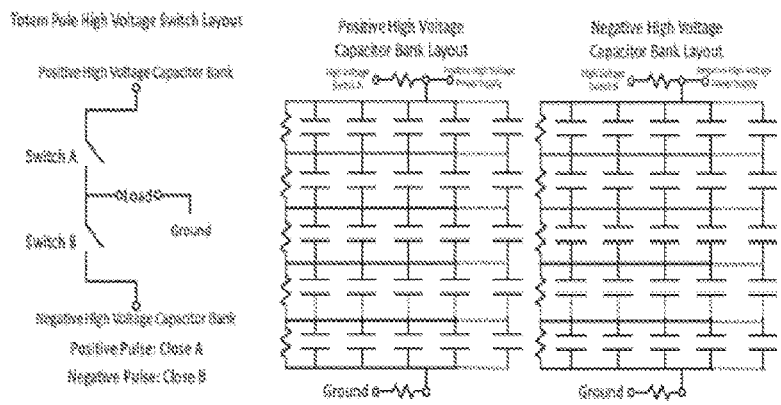
Figure 8C:
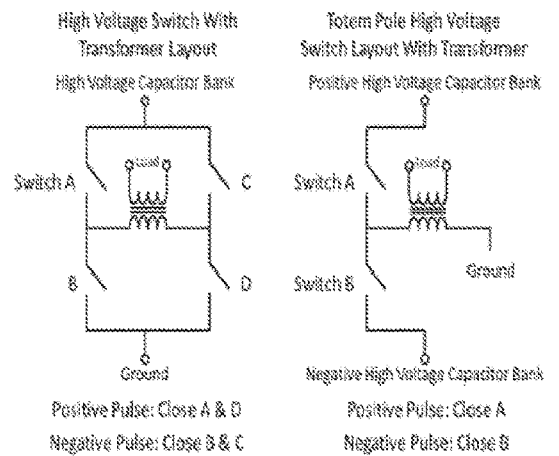

FIGS. 8A, 8B, and 8C illustrate example configurations for pulse generators, according to embodiments described herein. For example, FIG. 8A illustrates an example high voltage hardware configuration for a pulse generator using an H-Bridge topology. As another example, FIG. 8B illustrates an example high voltage hardware configuration for a pulse generator using a totem pole topology. FIG. 8C illustrates an example high voltage hardware configuration for a pulse generator using a transformer to achieve higher output voltages. In some embodiments, the transformer configuration may be a step-up transformer. The pulse generator configurations of FIGS. 8A, 8B, and 8C are merely examples, and the embodiments described herein are not limited thereto.

Referring back to FIGS. 2A-2F, baseline IRE treatments were conducted using 100× positive polarity pulses each energized for 100 µs and delivered at a repetition rate of 1 Hz. These treatments had a total energized time of 0.01 s (100 µs×100 pulses). To simplify the discussion of the H-FIRE waveforms, the notation P-D-N is used where P is the positive pulse duration, N is the negative pulse duration, and D is the delay between alternating polarity pulses, all with units of µs. In this study, a symmetric 2-1-2 waveform was used for all H-FIRE experiments. Typically, this 2-1-2 waveform is repeated in a rapid burst to achieve a burst-energized time of 100 µs and the bursts are repeated 100× at 1 Hz for a total-energized time of 0.01 s. A series of parametric studies were conducted to investigate how different parameters in the H-FIRE waveform affect lethal thresholds.

First, a standard treatment consisting of 100× bursts of the 2-1-2 waveform energized for 100 µs was delivered at 0.5, 1, 2, 4, or 10 Hz. These treatments all had the same total-energized time of 0.01 s. Second, the 2-1-2 waveform was energized for 100 µs and treatments with 24×, 48×, 100×, 200×, 500×, and 1000× bursts were delivered at 1 Hz. These treatments had total energized times between 0.0024 and 0.1 s. Third, the number of bursts was held constant at 100× and the 2-1-2 waveform was energized for 24 µs, 48 µs, 100 µs, and 200 µs. These treatments had total energized times between 0.0024 and 0.02 s. Fourth, the average on-time per second was held constant at 100 µs/s and the duration of each burst was incremented between 4 µs (delivered at 25 Hz) and 400 µs (delivered at 0.25 Hz). Finally, an ETT protocol which consisted of 4 µs waveforms (one positive pulse, one negative pulse) delivered continuously at 50 Hz until total energized times of 0.01, 0.02, 0.05, and 0.1 s were achieved. A minimum of three treatments (range: 3-17) were conducted for each parameter. Some treatments were repeated on multiple dates to verify consistency between cell passages and experimenters.

Before treatment excess media was removed from the wells. This increased the load impedance and decreased resistive heating within the well. Following treatment, 500 µL of fresh media was added to each well to ensure the hydrogels remained hydrated until imaging. Temperature increases due to resistive heating were measured using a fiber optic temperature probe (TS5-20MM-02, Micronor Inc., Camarillo, CA) placed inside the center pin electrode. Data was collected using a FOTEMP signal conditioner (Micronor Inc., Camarillo, CA), transmitted via a USB serial connection, and recorded using a custom Python script at 3 Hz. Temperature profiles were adjusted in post-processing to align the treatment start times then averaged. Temperature data is presented as mean±standard deviation.

Imaging of In-Vitro Ablations

Stock solutions of 4 µM Calcein AM (Invitrogen, Carlsbad, CA) were prepared by adding 125 µL of sterile DMSO (MP Biomedicals, Santa Ana, CA) to 50 µg of powdered dye and stored at −20° C. Stock solutions of 1 mg/ml, propidium iodide (MP Biomedicals, Santa Ana, CA) were prepared by adding 25 mL of sterile PBS (MP Biomedicals, Santa Ana, CA) to 25 mg of powdered dye and stored at 4° C. 2 µL of Calcein AM and 100 µL of propidium iodide stock solutions were added to each well and the gels were incubated for 30 minutes. After incubation, the gels were washed twice with 500 µL of sterile PBS which was removed prior to imaging on a Leica DMi8 microscope with a 4.2 megapixel digital camera (DFC9000GT, Leica Inc., Wetzlar, Germany). Images of the entire well were captured at 1.25× and 2.5× and stitched together using the microscopes software (LASX, Leica Inc. Wetzlar, Germany). For each well, four measurements of the ablation diameter were made (horizontal, vertical, 2× diagonal) and each measurement were correlated to finite element simulations to determine a corresponding lethal threshold. Values for each treatment parameter were then averaged and are presented as mean±standard deviation.

Calculation of Lethal Thresholds

To determine the electric field distribution within the 12-well a 2D axisymmetric model was used in conjunction with the Electric Currents module in COMSOL Multiphysics (V5.3, COMSOL Inc., Palo Alto, CA) which solve the equations:

$$\nabla \cdot J = 0 \quad [\text{Equation 1}]$$

$$J = \sigma E \quad [\text{Equation 2}]$$

$$E = -\nabla V \quad [\text{Equation 3}]$$

where J is the local current density, σ is the electrical conductivity, E is the electric field, and V is the local voltage. This system was considered electroquasistatic as the geometry can be considered electrically small compared to the skin depth and wavelength calculated for the pulses used in this study. Similarly, dielectric charging of the media was considered to be instantaneous due to the high conductivity (~1.2 S/m) and small relative permittivity (~80) of cell culture media.

Figure 2C:
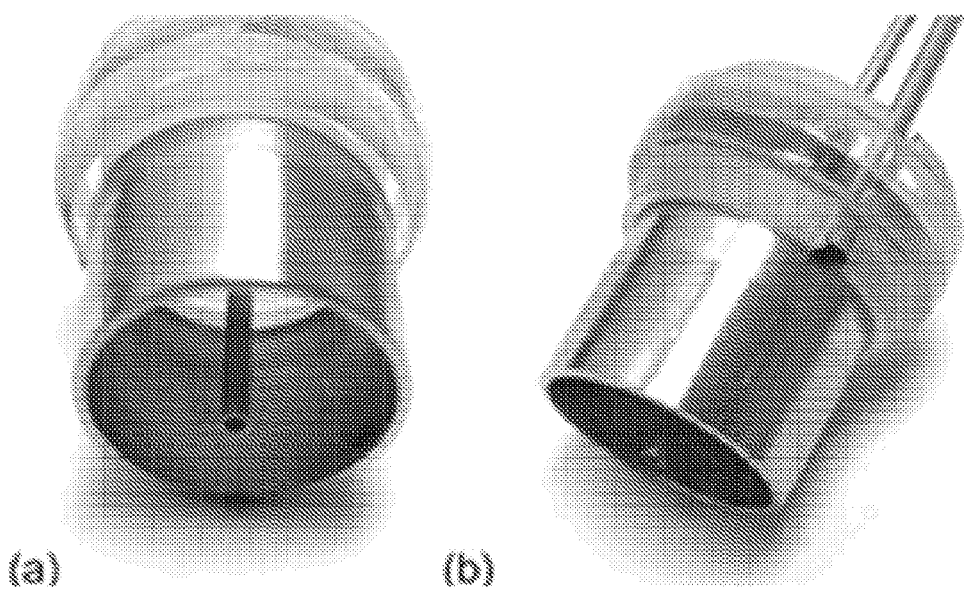
FIG. 2C illustrates a configuration of an experimental well configuration, according to embodiments described herein.
Figure 2C:
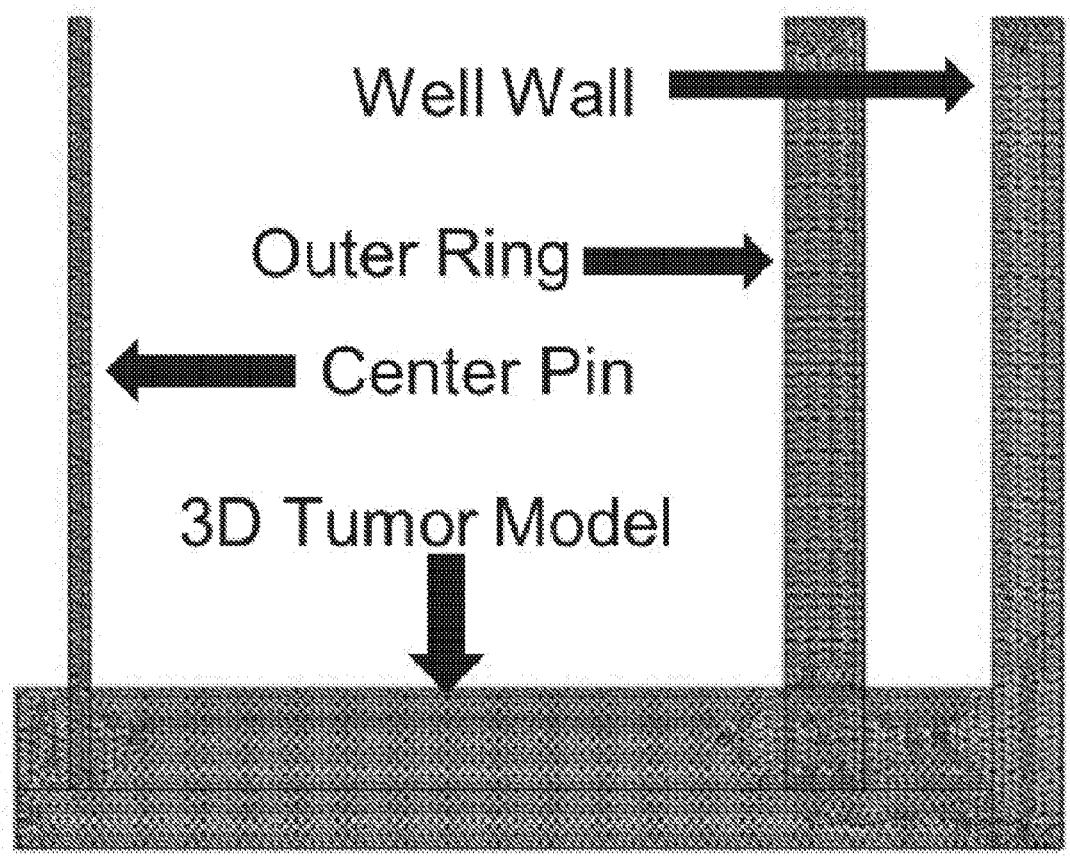

FIG. 2C illustrates a configuration of an experimental well configuration according to embodiments described herein. Geometries representing a single well within a 12 well (e.g., FIG. 2C) plate were created based on manufacturers' schematics and caliper measurements with separate domains representing the plastic well, cell culture media, and the experimental electrodes.

Experimental voltages were applied to the top most surface of the center pin electrode. The top surface of the outer ring electrode was set to ground:

$$V = 0 [V] \quad [\text{Equation 4}]$$

All external domain boundaries which did not contact another domain (e.g. the interface between plastic and air) were set as electrical insulation:

$$n \cdot J = 0 \quad \text{[Equation 5]}$$

The electrical conductivity ($\sigma$) was set to 1.2 S/m for the media, $4\times10^6$ S/m for the electrodes, and $1\times10^6$ S/m for the plastic well plate components.

A free tetrahedral mesh was generated in all domains using extremely fine mesh elements with 0.02 cm maximum and $4\times10^{-5}$ cm minimum mesh element sizes. For each simulation four rounds of adaptive mesh refinement were conducted using a functional error estimate with the equation mediaIntegral(ec.normE) where mediaIntegral is a $4^{th}$ order integration over the media domain and ec.normE is the electric field distribution. The initial mesh consisted of approximately 4450 triangular elements which increased to approximately 313,000 elements after four rounds of adaptive meshing. The simulations required approximately 7 seconds to solve for each voltage on a dual core Intel i7-7660U processor with 16 GB of RAM.

Figure 2D:
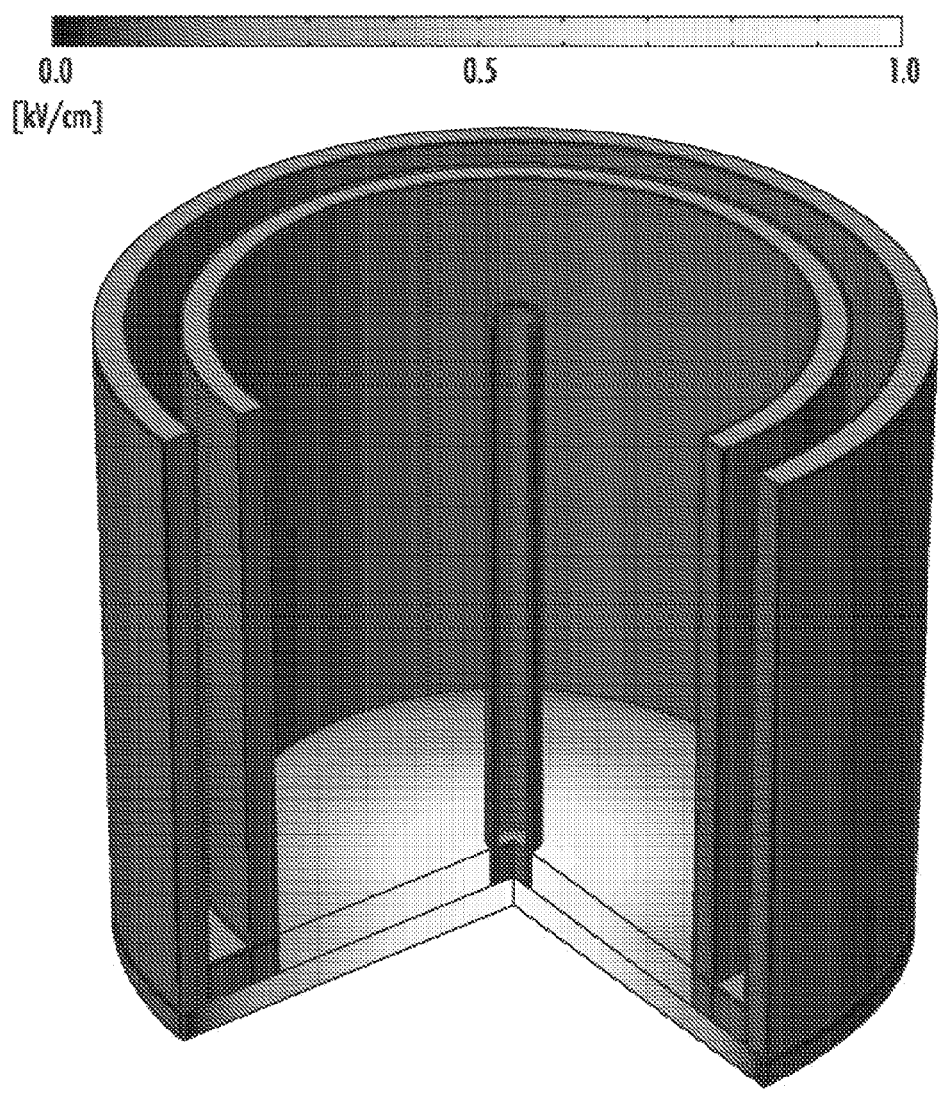
FIG. 2D illustrates an experimental electric field distribution, according to embodiments described herein.

FIG. 2D illustrates an experimental electric field distribution, according to embodiments described herein. The electric field distribution (e.g., FIG. 2D) for each voltage, along a line from the center of the well to the exterior boundary, was exported to Excel (Microsoft Inc., Redmond, WA). A look up table was then used to match the ablation radii from the in vitro experiments to electric field values to determine the lethal threshold for each measurement. Values for each parameter set were then averaged and are presented as mean±standard deviation. Statistical significance between protocols was determined using a single sided Student's T-test with unequal variances calculated using the Real Statistics Resource Pack software (Version 4.3, Charles Zaiontz, Milan, Italy) for Microsoft Excel. An alpha value of 0.001 was used to determine if lethal thresholds between treatment protocols were statistically significantly different.

Mathematical Modeling of Clinical H-FIRE Ablations

Figure 2E:
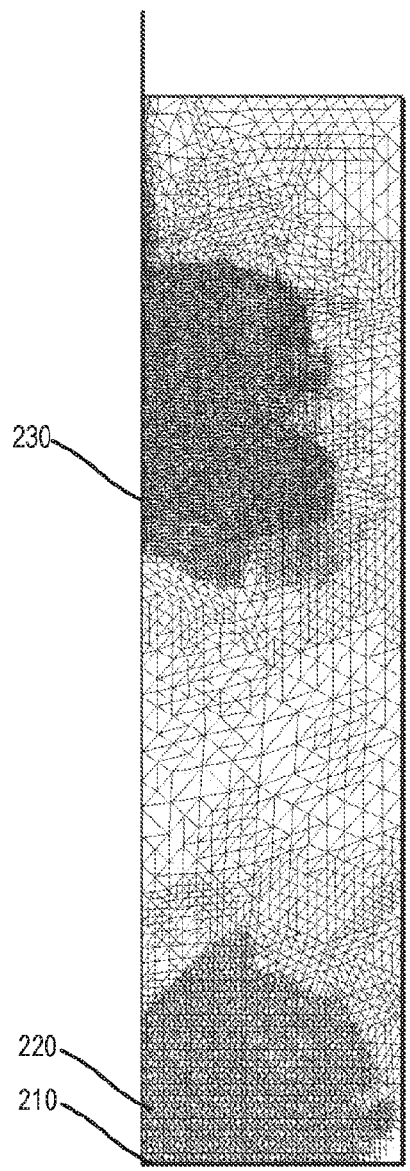
FIGS. 2E and 2F illustrated a simulated electric field distribution within an abdomen, according to embodiments described herein.
Figure 2F:
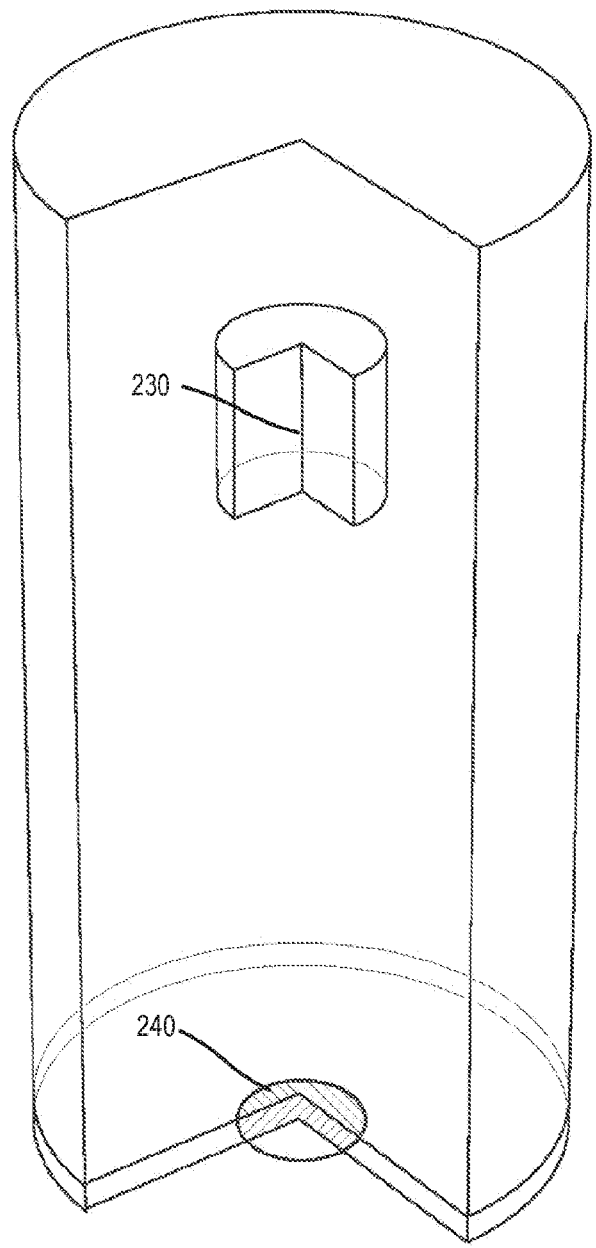

The size and shape of hypothetical clinical ablations were determined using a finite element model of a treatment using a single electrode applicator and a distal grounding pad which incorporated the lethal thresholds determined in vitro. FIGS. 2E and 2F illustrated a simulated electric field distribution within an abdomen, according to embodiments described herein. The steady state electric field distribution within a simulated abdomen (e.g., FIGS. 2E, 2F) was calculated using the 2D Electric Currents module in COMSOL Multiphysics, solving equations 1-3.

The abdomen was simulated using a simplified 10×40 cm rectangular axi-symmetric domain (e.g., FIG. 2E). Fat 220 and skin 210 were simulated by 1.0 and 0.15 cm deep rectangular domains, respectively, at the distal end of the abdomen domain. The insulating therapeutic electrode applicator was simulated using a 0.065×15 cm rectangle and the conductive active electrode 230 was simulated using a 0.065×1 cm rectangle. A 0.1×5 cm rectangle was used to simulate the distal grounding pad 240 which was located adjacent to the skin domain boundary 30 cm from the center of the active electrode 230.

The increase in electrical conductivity in tissue due to electroporation around the probe was simulated concurrently while solving for the steady state electric field distribution using a dynamic tissue conductivity function implemented as a piecewise step equation with continuous second derivative smoothing:

$$\sigma(E) \begin{cases} 0.1 & E < (1 - 0.499) \cdot E_{lethal} \\ \Gamma(E) & \text{otherwise} \\ \sigma_{final} & E > (1 + 0.499) \cdot E_{lethal} \end{cases} \quad \text{[Equation 6]}$$

$$\Gamma(E) = 0.5 + 0.9375 \cdot \gamma(E) - 0.625 \cdot \gamma(E)^3 + 0.187 \cdot \gamma(E)^5 \quad \text{[Equation 7]}$$

$$\gamma(E) = (E - E_{lethal})/(E_{lethal} * r) \quad \text{[Equation 8]}$$

where E is the local electric field and $E_{lethal}$ is the lethal threshold found experimentally.

Tissue impedances are highly frequency dependent and changes in tissue conductivity due to electroporation are smaller for H-FIRE treatments than for IRE. Experimental data was used to recapitulate this effect and H-FIRE waveforms were simulated with a relative increase in conductivity of 1.81× ($S_{final}$=0.181 S/m) while IRE waveforms were simulated with a 3.6× increase ($S_{final}$=0.36 S/m) from a baseline conductivity of 0.1 S/m.

Hypothetical treatment voltages (1,000 to 10,000 V) were applied to the internal surface of the active treatment electrode 230. The external surface of the grounding pad 240 was set to ground (Equation 4). All external domain boundaries which did not contact another domain were set as electrical insulation (Equation 5). A summary of the electrical parameters used for these simulations is shown in Table 1:

TABLE 1

Parameters used in finite element simulations.

| Parameter Name | Value | Units |
|---|---|---|
| 3D Tumor Conductivity | 1.2 | S/m |
| 12 Well Wall Conductivity | $1 \times 10^{-6}$ | S/m |
| Electrode Conductivity | $4 \times 10^6$ | S/m |
| Clinical Applicator Probe Body Conductivity | $1 \times 10^{-12}$ | S/m |
| Fat Conductivity | 0.027 | S/m |
| Skin Conductivity | 0.029 | S/m |
| Abdomin Initial Tissue Conductivity | 0.1 | S/m |
| Conductivity Multiplier (IRE) | 3.6 | — |
| Conductivity Multiplier (H-FIRE) | 1.8 | 1 |

For each simulation, four rounds of adaptive meshing were implemented to minimize finite element artifacts in the regions where tissue conductivity changed dramatically. A functional error estimate with the equation abdominIntegral (sigma) was used where abdominIntegral is a $4^{th}$ order integration and sigma was defined as the electrical conductivity (ec.sigmaphiphi) within a 3×6 cm rectangular domain surrounding the active electrode 230. Typical initial meshes had approximately 1,300 elements which increased to approximately 64,000 elements after the fourth round of adaptive meshing (e.g., FIG. 2E) and each parameter required approximately 54 seconds to solve on a ten core Intel i7-6950X processor with 64 GB of RAM.

Ablation volumes were then determined by conducting a volume integration which evaluated the expression $E > E_{lethal}$ where E was the local electric field and $E_{lethal}$ was the mean lethal electric field determined experimentally for each treatment group simulated.

Figures 3A, 3B:
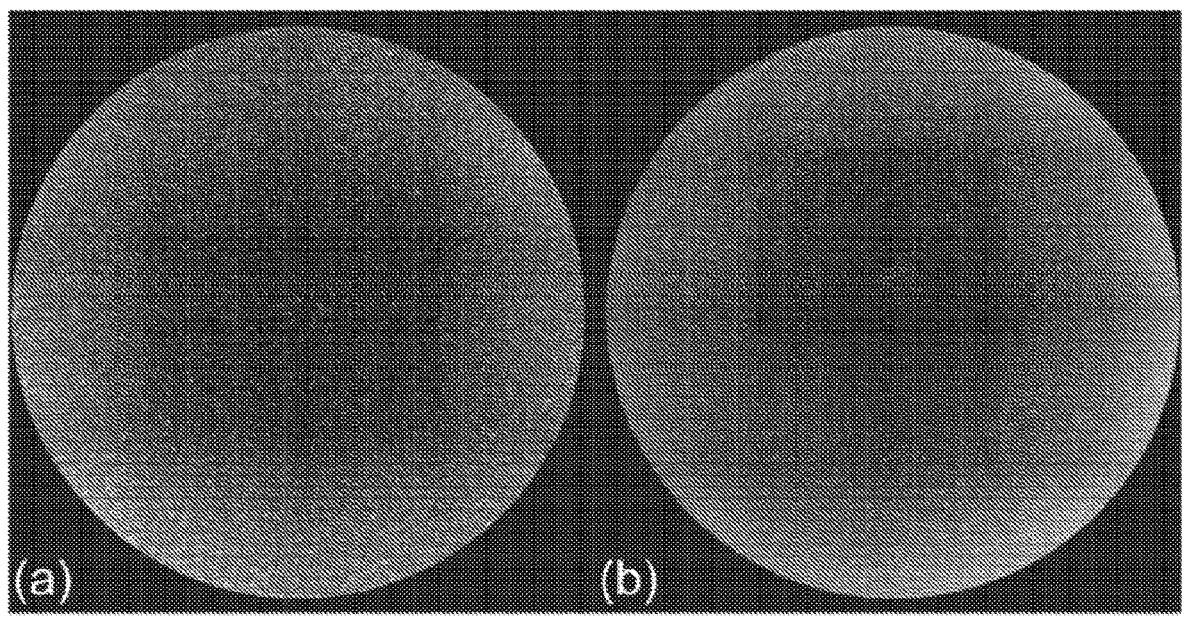
FIGS. 3A-3D illustrate experiments involving comparisons between NK-IRE and H-FIRE treatments.
Figure 3C:
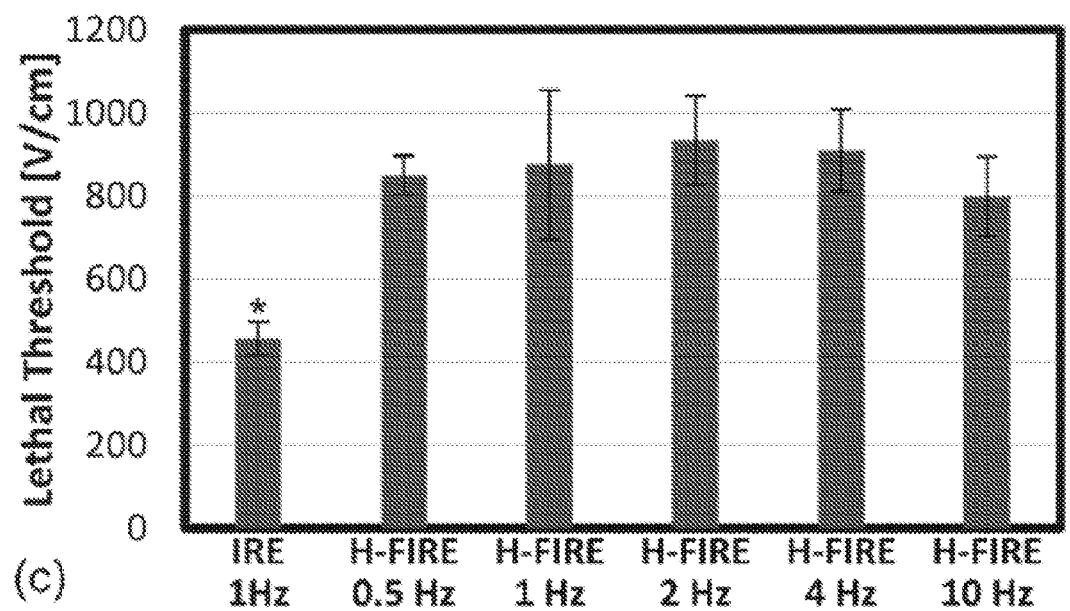
Figure 3D:
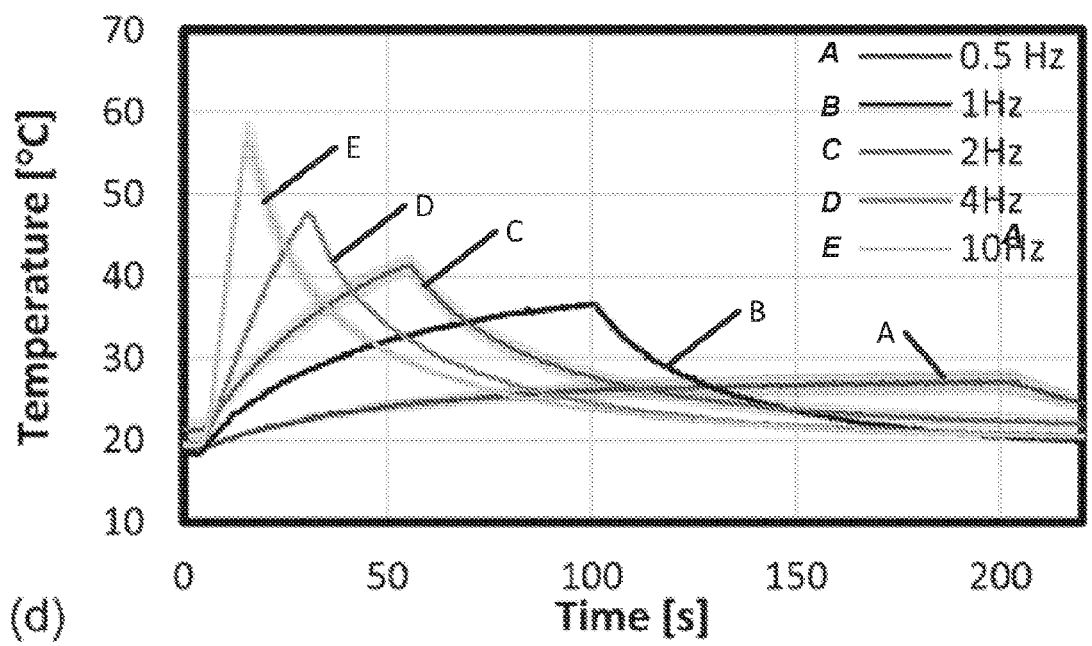

FIGS. 3A-3D illustrate experiments involving comparisons between NK-IRE and H-FIRE ablations. FIGS. 3A and 3B contain images showing the distribution of live (green) and dead (red) cells 24 hours after treatment with 100× pulses/bursts energized for 100 µs with (a) 500 V IRE (FIG. 3A) and (b) 750 V H-FIRE waveforms (FIG. 3B) at 1 Hz. FIG. 3C is a graph illustrating lethal thresholds for IRE treatments at 1 Hz and H-FIRE treatments at 0.5 to 10 Hz. FIG. 3D is a graph illustrating temperatures recorded at the center of the pin electrode for H-fire treatments at 750 V. All H-FIRE protocols in this figure consisted of 100× bursts where each burst was energized for 100 μs. A '*' designation indicates a statistically significant difference ($\alpha=0.001$)

NK-IRE Baseline Treatments

Standard NK-IRE treatments consisting of 100× monopolar pulses each 100 μs in duration and delivered at 1 Hz were (FIG. 3A) conducted to provide a baseline for comparison to the H-FIRE protocols investigated here. For these treatments, a lethal threshold of 456±40 V/cm was found.

H-FIRE Baseline Treatments (0.5-10 Hz)

Standard H-FIRE treatments consisting of 100× bursts with each burst energized for 100 μs and delivered at 1 Hz (FIG. 3B) were conducted to provide a baseline for comparison to all other HI-FIRE protocols. For these treatments, a lethal threshold of 876±180 V/cm was found. Neither decreasing the burst repetition frequency to 0.5 Hz (798±47 V/cm) nor increasing the burst repetition frequency to 2 Hz (933±106 V/cm), 4 Hz (910±98 V/cm) and 10 Hz (798±95 V/cm) resulted in a statistically significant change in lethal threshold (Table 2) compared to the baseline 1 Hz H-FIRE treatment. However, a statistically significant difference was found between the baseline IRE treatment and all of the 100×100 μs H-FIRE treatments (0.5-10 Hz, $\alpha=0.001$).

TABLE 2

Lethal Thresholds for IRE and H-FIRE Baseline Treatments delivered at 0.5-10 Hz

| Treatment Type | Energized Time[μs] | Number of Bursts | Repetition Rate [Hz] | N | Lethal Threshold [V/cm] |
|---|---|---|---|---|---|
| NK-IRE | 100 | 100 | 1 | 7 | 456 ± 40 |
| H-FIRE | 100 | 100 | 0.5 | 6 | 849 ± 47 |
| H-FIRE | 100 | 100 | 1 | 17 | 876 ± 180 |
| H-FIRE | 100 | 100 | 2 | 6 | 934 ± 106 |
| H-FIRE | 100 | 100 | 4 | 6 | 910 ± 98 |
| H-FIRE | 100 | 100 | 10 | 6 | 798 ± 95 |

H-FIRE Number of Bursts Per Treatment (24×-1000×)

Figures 4A, 4B, 4C, 4D:
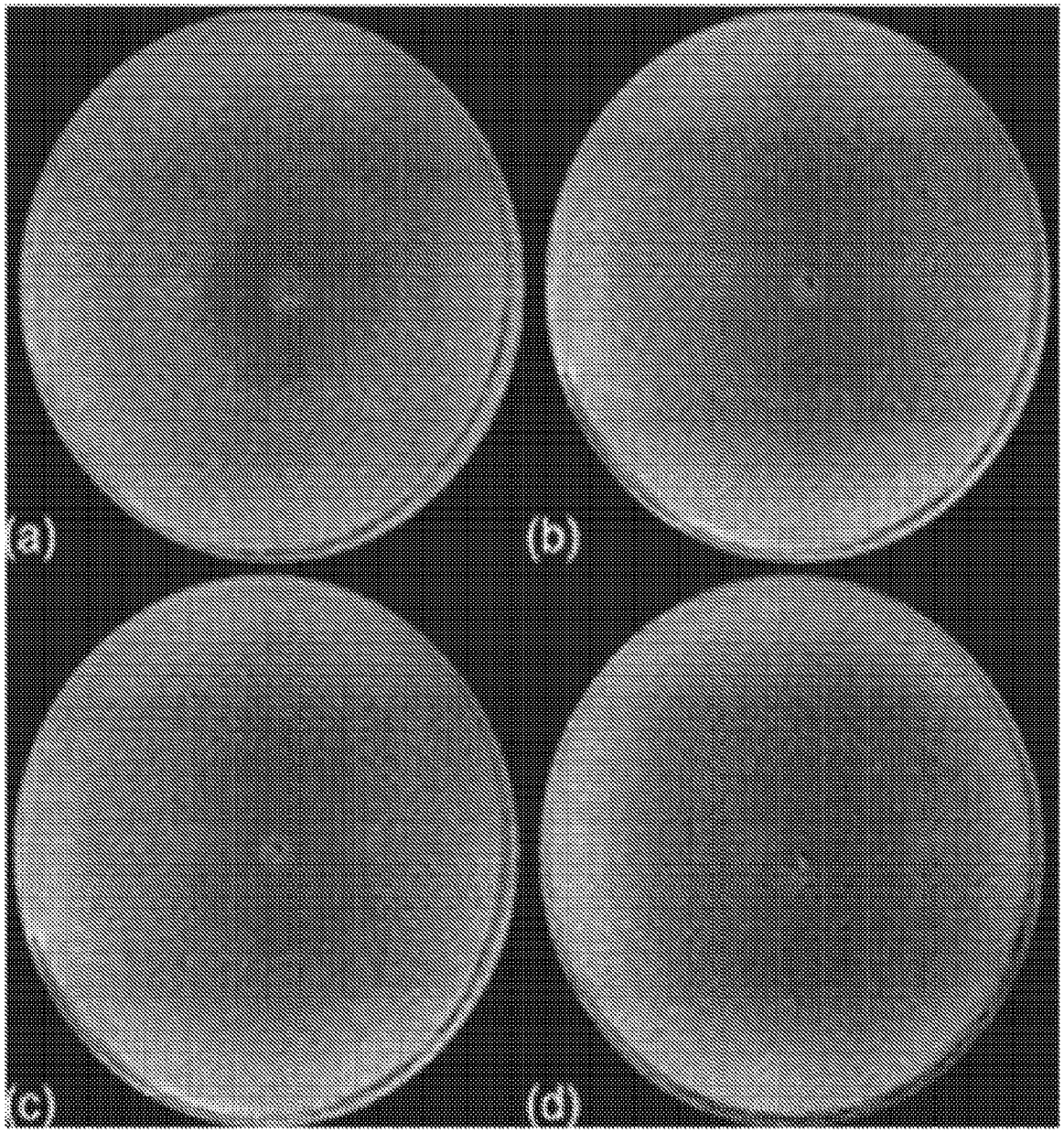
FIGS. 4A-4F illustrate experiments involving H-FIRE ablations.
Figure 4E:
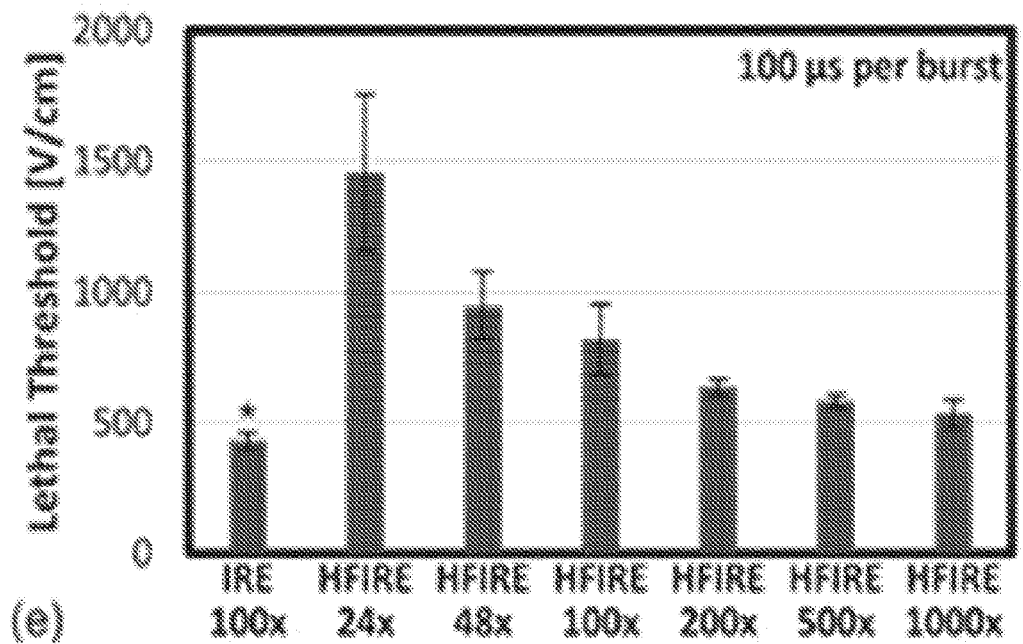
Figure 4F:
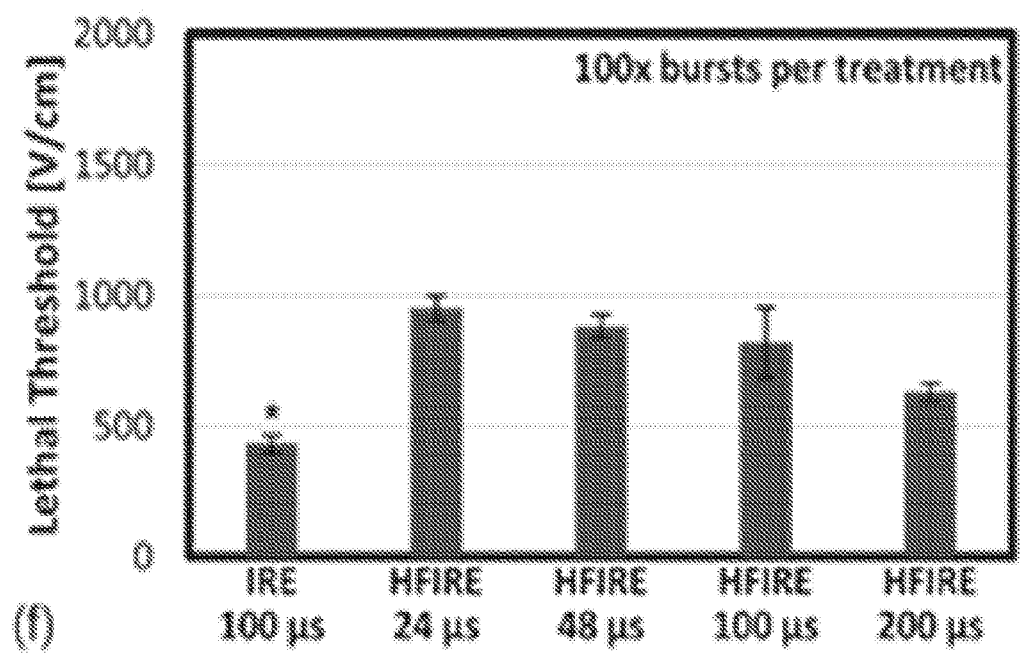

FIGS. 4A-4F illustrate experiments involving H-FIRE treatments. FIGS. 4A-4F illustrate that the number of bursts and the burst energized time affect the ablation size and resulting lethal thresholds. Ablations imaged 24 hours after H-FIRE treatment with 500 V 100 μs bursts when (a, FIG. 4A) 100×, (b, FIG. 4B) 200×, (c, FIG. 4C) 500×, and (d, FIG. 4D) 1000× bursts are delivered. FIG. 4E illustrates lethal thresholds for H-FIRE treatments where each burst is energized for 100 μs and 24× through 1000× bursts are delivered. FIG. 4F illustrates lethal thresholds for treatments where 100× bursts are delivered and each burst is energized for 24 μs, 48 μs, 100 μs, or 200 μs. Baseline lethal thresholds for IRE treatments with 100×100 μs monopolar pulses are shown in FIGS. 4E and 4F for comparison. A '*' designation indicates a statistically significant difference ($\alpha=0.001$) between IRE and H-FIRE all treatments.

To investigate how the number of bursts impacts lethal thresholds in H-FIRE treatments a series of experiments were conducted where the burst energized-time was held constant at 100 μs. The 3D tumor constructs were then treated with 24×, 48×, 100×, 200×, 500×, or 1000× bursts. The treatments with 24× bursts resulted in the highest lethal thresholds (1456±298 V/cm). Mean lethal thresholds decreased sequentially for 48× (947±130 V/cm), 100× (876±136 V/cm, FIG. 4A), 200× (636±29 V/cm, FIG. 4B), 500× (582±24 V/cm, FIG.) 4C), and 1000× (525±54 V/cm, FIG. 4D) burst treatments. A statistically significant difference was found between the 200× and 1000× treatments, but not between the 500× and 1000× treatments ($\alpha=0.001$, FIG. 4E, Table 3). A statistically significant difference was found between the 100 μs 100×IRE treatment and all H-FIRE treatments ($\alpha=0.001$) in this group (100 μs energized, 24×-1000×).

TABLE 3

Lethal Thresholds for H-FIRE treatments with 24×-1000× 100 μs bursts

| Burst Energized Time [μs] | Number of Bursts | Repetition Rate [Hz] | N | Lethal Threshold [V/cm] |
|---|---|---|---|---|
| 100 | 24 | 1 | 4 | 1456 ± 298 |
| 100 | 48 | 1 | 5 | 947 ± 130 |
| 100 | 100 | 1 | 17 | 818 ± 136 |
| 100 | 200 | 1 | 3 | 636 ± 29 |
| 100 | 500 | 1 | 3 | 582 ± 24 |
| 100 | 1000 | 1 | 4 | 535 ± 54 |

H-FIRE Energized Time Per Burst (24 μs-200 μs)

To investigate how the energized time per burst affects lethal thresholds in H-FIRE treatments a series of experiments were conducted where the number of bursts was held constant at 100×. The energized-time per burst was sequentially increased from 24 μs to 200 μs and all bursts were delivered at 1 Hz. The highest lethal threshold was found for treatments where each burst was energized for 24 μs (949±49 V/cm). Mean lethal thresholds decreased sequentially for bursts energized for 48 μs (881±45 V/cm), 100 μs (876±136 V/cm), and 200 μs (630±34 V/cm). A statistically significant difference was found between the 100 μs 100× IRE treatment and all H-FIRE treatments ($\alpha=0.001$) in this group (100× bursts, 24-200 μs). The lethal thresholds for the 100× burst 100 μs and 200 μs energized time treatments were also statistically significantly different ($\alpha=0.001$, FIG. 4F, Table 4).

TABLE 4

Lethal Thresholds for H-FIRE treatments with 100× bursts energized for 24-200 μs

| Burst Energized Time[us] | Number of Bursts | Repetition Rate [Hz] | N | Lethal Threshold [V/cm] |
|---|---|---|---|---|
| 24 | 100 | 1 | 3 | 949 ± 49 |
| 48 | 100 | 1 | 3 | 881 ± 45 |
| 100 | 100 | 1 | 17 | 818 ± 136 |
| 200 | 100 | 1 | 6 | 630 ± 34 |

H-FIRE vs. Electro-Thermal Therapy (100 μs/s-0.01 s total)

Figure 5A:
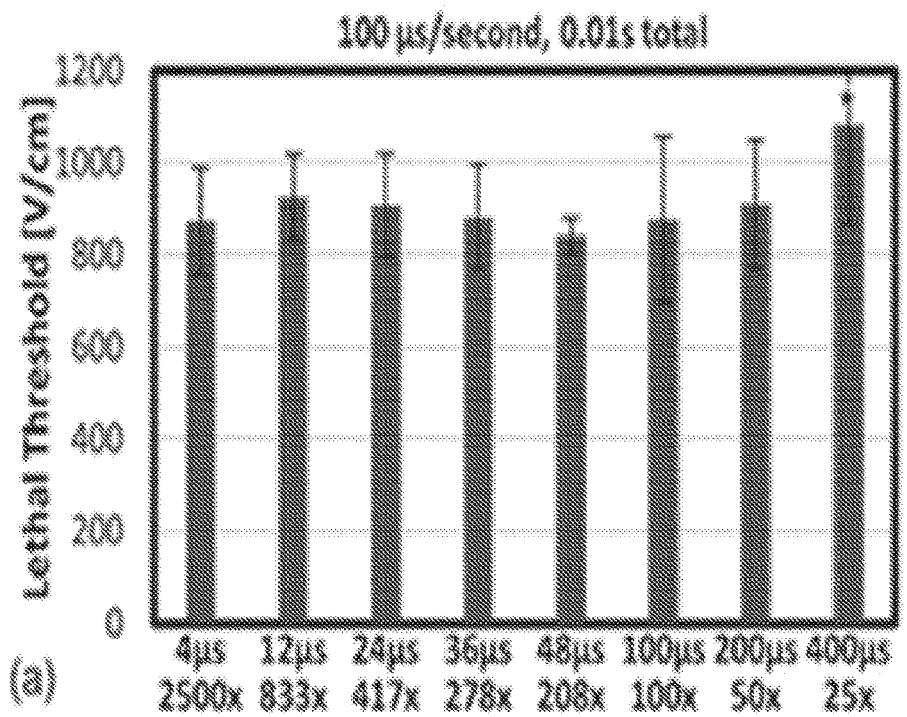
FIGS. 5A and 5B illustrate comparisons of treatment energies, according to embodiments described herein
Figure 5B:
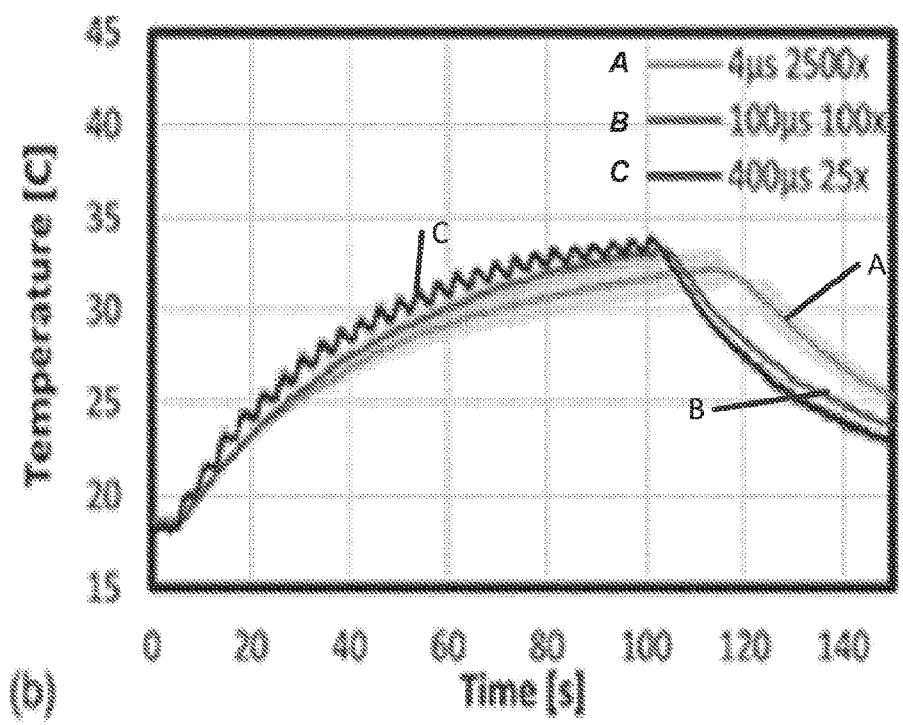

FIGS. 5A and 5B illustrate comparisons of treatment energies, according to embodiments described herein. FIG. 5A illustrates lethal thresholds when the average energy per second (100 μs/s) and total treatment energized time (0.01 s) are held constant. FIG. 5B illustrates temperature measurements for treatments with 750 V pulses verifying that similar energy doses were delivered. A '*' designation indicates a statistically significant difference ($\alpha=0.001$) from the 4 μs 2500× treatment protocol.

To investigate how average energy delivery affects lethal ETT treatments a series of experiments were conducted in which a total of 0.01 seconds of total-energized time were delivered. The average energy per second was held constant at 100 μs/second and bursts which were 4 μs, 12 μs, 24 μs, 36 μs, 48 μs, 100 μs, 200 μs, and 400 μs in duration were delivered. The number of bursts and burst repetition rate were adjusted to maintain equivalent energy per second and total-energized times (4 µs, 2500×, 25 Hz), (12 µs, 833×, 8.33 Hz), (24 µs, 417×, 4.12 Hz), (36 µs, 278×, 2.78 Hz), (48 µs, 208×, 2.08 Hz), (100 µs, 100×, 1 Hz), (200 µs, 50×, 0.5 Hz), (400 µs, 25×, 0.25 Hz). The lowest lethal threshold (e.g., FIG. 5A, Table 5) was found for treatments consisting of 2500×4 µs bursts delivered at 25 Hz (841±127 V/cm), however, there was not a statistically significant difference between this treatment and the 12 µs (925±93 V/cm), 24 µs (908±114 V/cm), 36 µs (881±116 V/cm), 48 µs (841±39 V/cm), 100 µs (876±136 V/cm), and 200 µs (908±139 V/cm) treatments ($\alpha=0.001$).

TABLE 5

Lethal Thresholds for treatments with 0.01 s total-energized time delivered at a rate of 100 µs/s

| Burst Energized Time [µs] | Number of Bursts | Repetition Rate [Hz] | N | Lethal Threshold [V/cm] |
|---|---|---|---|---|
| 4 | 2500 | 25.0 | 9 | 874 ± 117 |
| 12 | 833 | 8.33 | 6 | 925 ± 93 |
| 24 | 417 | 4.17 | 6 | 908 ± 114 |
| 36 | 278 | 2.78 | 5 | 881 ± 116 |
| 48 | 208 | 2.08 | 6 | 841 ± 39 |
| 100 | 100 | 1.00 | 17 | 876 ± 180 |
| 200 | 50 | 0.50 | 4 | 909 ± 139 |
| 400 | 25 | 0.25 | 6 | 1083 ± 217 |

However, a statistically significant difference was found between the 4 µs treatment and the 400 µs treatment (1083±217). Temperature measurements taken during these treatments (e.g., FIG. 5B) indicated that the temperature increased approximately 16° C. during these treatments the maximum temperature remained below 34° C. for all treatments. Real-time recording and plotting of data while delivering pulses resulted in a slight increase in the total treatment time (~111 s) for the 2500×4 µs treatment (e.g., FIG. 5B-light grey line). The remainder of the treatments in this group were completed in 100 s.

H-FIRE vs. ETT (0.01-0.1 s Total-Energized Time)

Figure 6A:
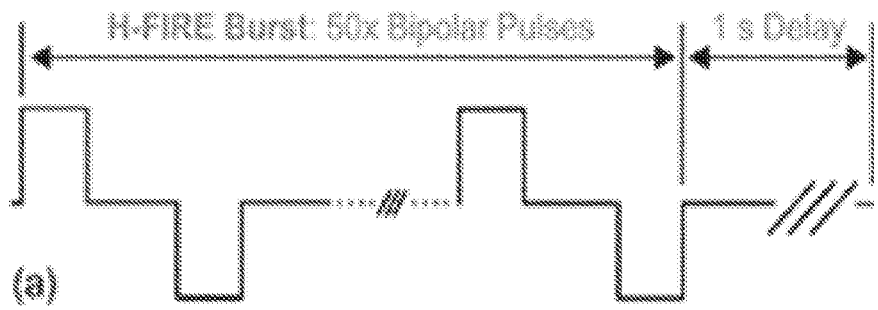
FIGS. 6A-6E illustrate a comparison of H-FIRE and ETT treatments, according to embodiments described herein.
Figure 6B:
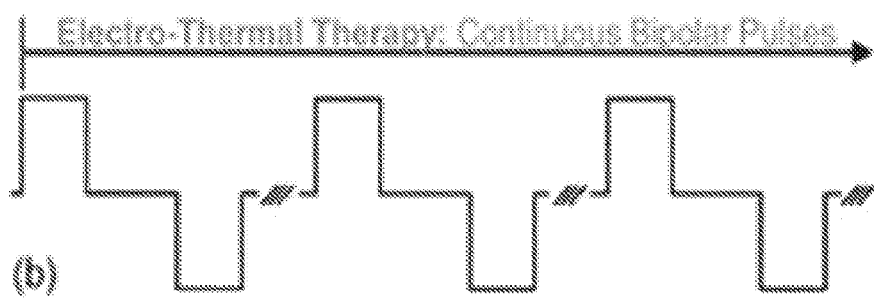
Figure 6C:
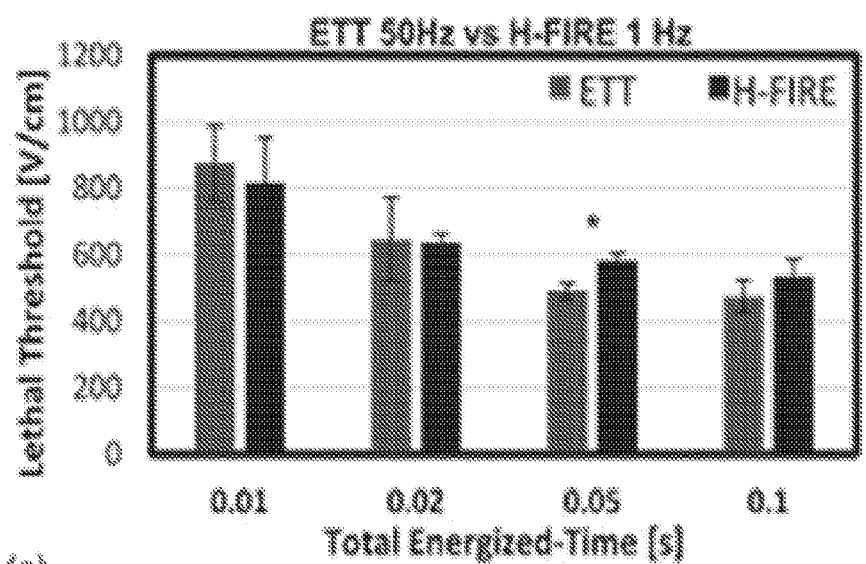
Figure 6D:
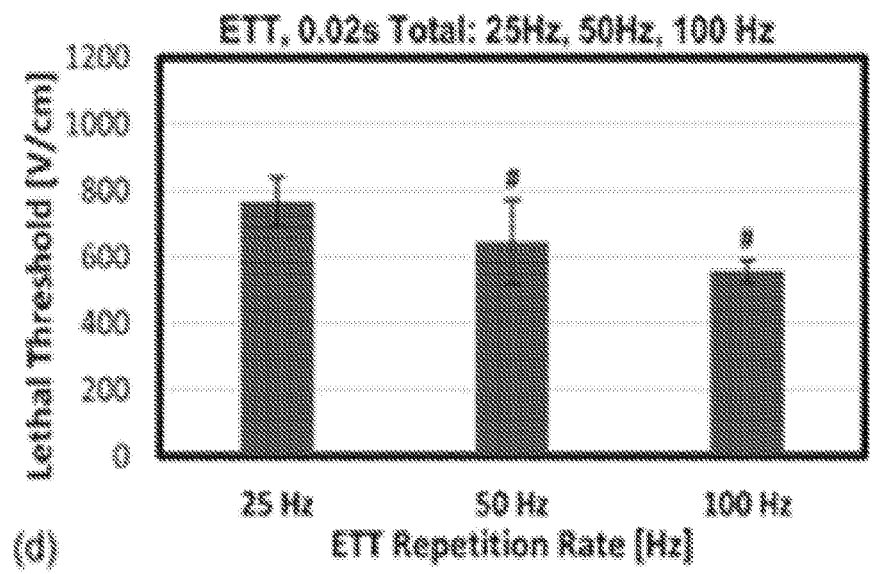
Figure 6E:
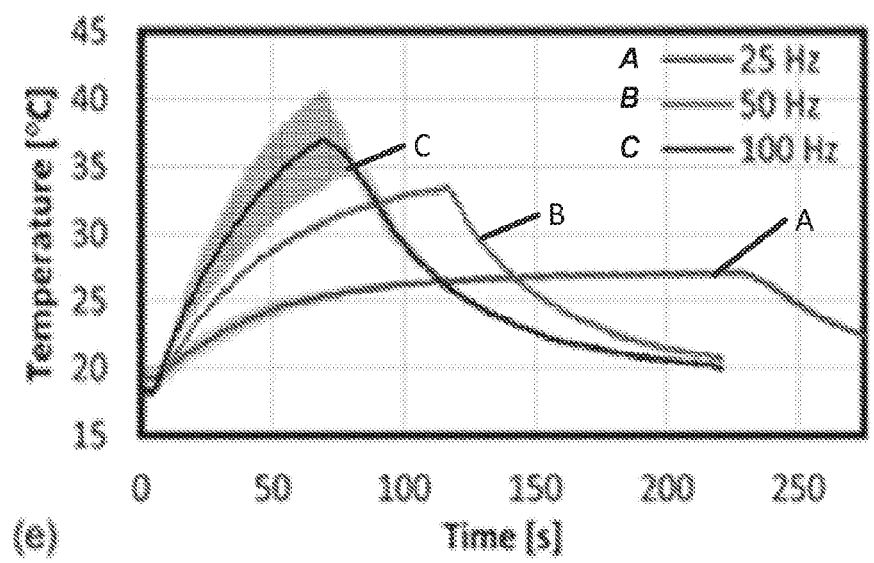

FIGS. 6A and 6B illustrated a comparison of H-FIRE (e.g., FIG. 6A) and ETT (e.g., FIG. 6B) treatments. FIG. 6C illustrates comparing lethal thresholds of ETT delivered at 50 Hz to equivalent energy H-FIRE treatments. FIGS. 6D and 6E illustrate a comparison of lethal thresholds (e.g., FIG. 6D) and temperature profiles (e.g., FIG. 6E) for 500 V ETT treatments with 0.02 s total-energized time when delivered at 50 Hz and 100 Hz. A designation indicates a statistically significant difference ($\alpha=0.001$) between matched H-FIRE and ETT treatment groups. A '#' designation indicates a statistically significant difference ($\alpha=0.001$) from the 25 Hz treatment group.

Traditionally, H-FIRE treatments have mirrored clinical IRE treatments by delivering all of the treatment energy in rapid bursts (e.g., FIG. 6A) to enable energy delivery in conjunction with cardiac synchronization. However, cardiac synchronization may not be necessary for ETT (e.g., FIG. 6B) which delivers energy on a continuous basis. To evaluate how these diffuse continuous protocols affect lethal thresholds, a series of experiments were conducted in which 4 µs ETT waveforms (2 µs positive-1 µs delay-2 µs negative) were delivered at 50 Hz (e.g., FIG. 6C, Table 6). Energy was delivered until a total-energized time of 0.01 s, 0.02 s, 0.05 s, or 0.1 s was achieved. This corresponds to the delivery of 2500×, 5000×, 12500×, and 25000× waveforms (4 µs each), respectively. These treatments had equivalent total-energized times to standard 100 µs H-FIRE treatments which delivered 100×, 200×, 500×, and 1000× (100 µs) bursts at 1 Hz, respectively.

TABLE 6

Lethal Thresholds for ETT treatments with continuous delivery of 4 µs waveforms delivered at 25-100 Hz to achieve total-energized times of 0.01-0.1 s

| Waveform Energized Time [µs] | # Bursts | Repetition Rate [Hz] | Total-Energized Time [s] | N | Lethal Threshold [V/cm] |
|---|---|---|---|---|---|
| 4 | 2500 | 50 | 0.01 | 9 | 874 ± 117 |
| 4 | 5000 | 25 | 0.02 | 4 | 768 ± 74 |
| 4 | 5000 | 50 | 0.02 | 5 | 645 ± 127 |
| 4 | 5000 | 100 | 0.02 | 3 | 558 ± 34 |
| 4 | 12500 | 50 | 0.05 | 3 | 491 ± 24 |
| 4 | 25000 | 50 | 0.1 | 3 | 476 ± 47 |

The ETT treatments had the highest lethal thresholds when the total-energized time was equal to 0.01 s (874±117 V/cm). Lethal thresholds decreased (e.g., FIG. 6C) as the total-energized time was increased to 0.02 s (645±127 V/cm), 0.05 s (491±24 V/cm), and 0.1 s (476±47 V/cm). A statistically significant difference was found between the H-FIRE and ETT treatments with total-energized times of 0.05 s with the ETT treatments resulting in significantly lower lethal thresholds ($\alpha=0.001$). No significant difference was found when the repetition rate was increased from 50 Hz to 100 Hz (4 µs burst, 0.02 s total-energized time, FIG. 6D), however, the 100 Hz ETT treatments resulted in substantially greater peak average temperatures (37° C., FIG. 6E) than treatments delivered at 50 Hz (33° C.) and 25 Hz (27° C.).

Simulation of Clinical Ablations

Figure 7A:
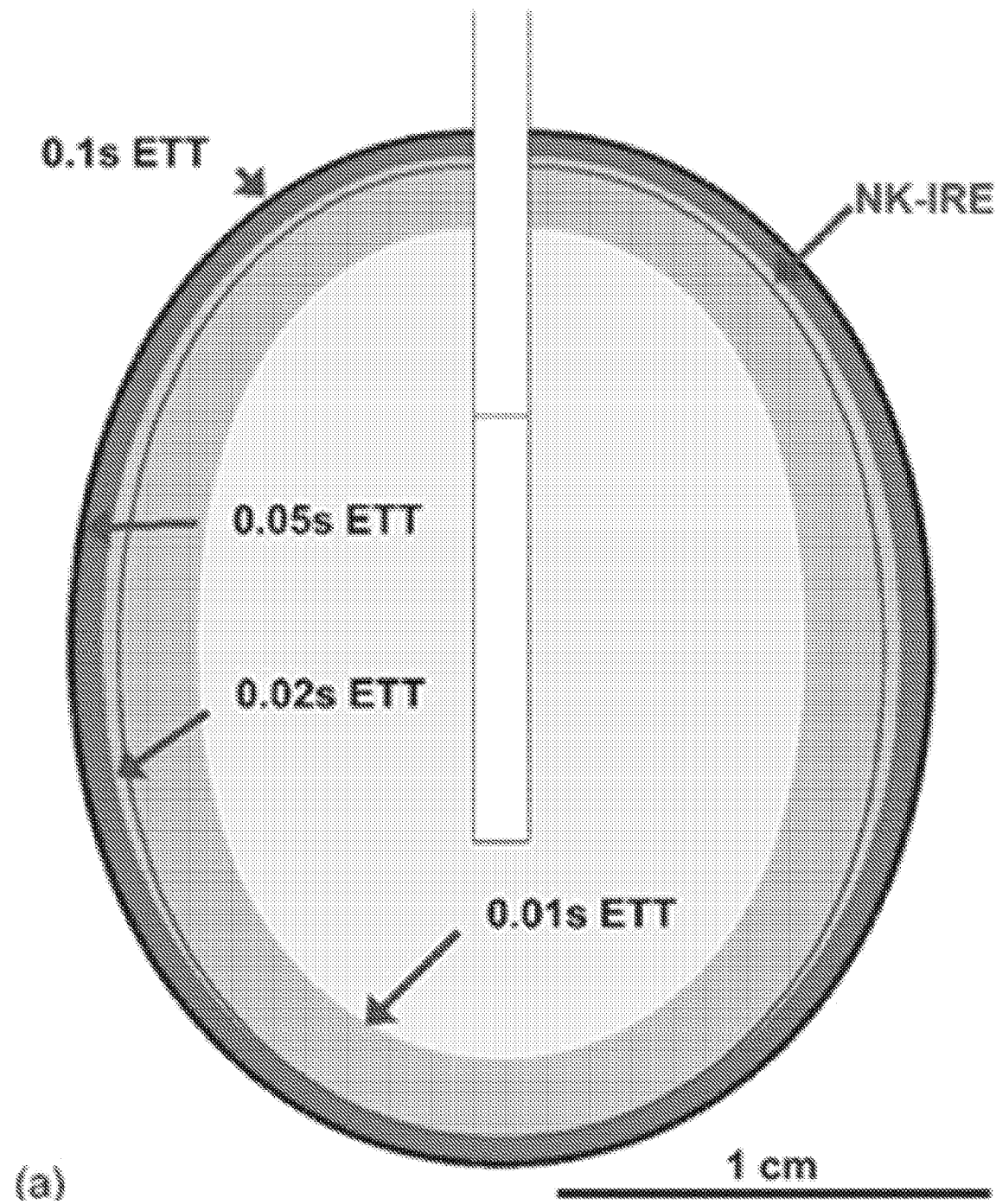
FIGS. 7A and 7B illustrate finite element simulations of a clinical ETT treatment, according to embodiments described herein.
Figure 7B:
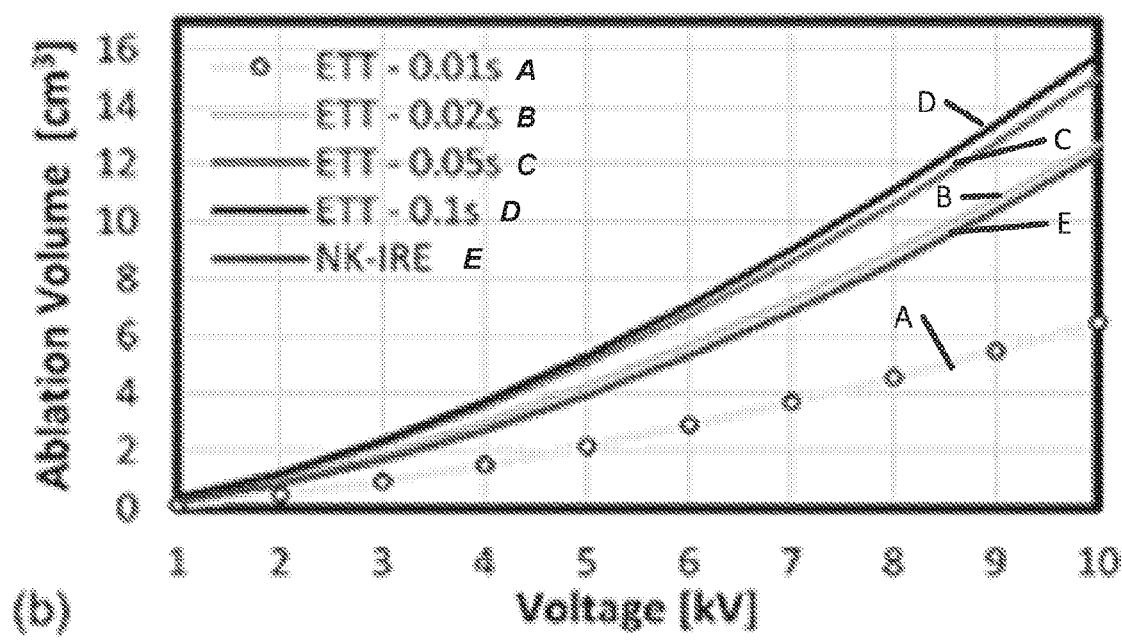

FIGS. 7A and 7B illustrate finite element simulations of a clinical ETT treatment, according to embodiments described herein. FIG. 7A illustrates predicted ablations for 100×100 µs (0.01 s) NK-IRE treatments (red) and 0.01 s (off white), 0.02 s (light grey), 0.05 s (dark grey), and 0.1 s (black) ETT treatments when 5000V pulses are administered. FIG. 7B illustrates predicted ablation volume as a function of applied voltage for the standard NK-IRE (432 V/cm) and the ETT protocols.

A baseline simulation voltage of 5000 V (e.g., FIG. 2F) was used as this is the highest H-FIRE treatment voltage that has been evaluated experimentally in the literature. At 5000 V, the simulations using a single 1 cm long active electrode predicted an NK-IRE ablation measuring approximately 1.7×1.7×2.3 cm (e.g., 3.9 cm$^3$, FIG. 7A-red boundary). Using the lethal thresholds for ETT treatments (e.g., FIG. 6C), these simulations predicted ablation volumes of 2.2, 4.3, 5.1, and 5.3 cm$^3$ for the 0.01 s, 0.02 s, 0.05 s, and 0.1 s treatments, respectively. The largest ETT ablation at this voltage was approximately 2.1×2.1×2.5 cm (e.g., FIG. 7A). A parametric voltage sweep was conducted using the baseline NK-IRE and ETT lethal thresholds for voltages between 1 kV and 10 kV (e.g., FIG. 7B). The predicted ablation volumes for the 0.02 s, 0.05 s, and 0.1 s total-energized time ETT treatments were consistently larger than those predicted for the baseline NK-IRE protocol. The largest predicted ablation zone, 15.7 cm$^3$ (2.9×2.9×3.3 cm), was found for the 0.1 s total-energized time H-FIRE protocol at 10 kV.

Electroporation is an electric field mediated phenomena, and increasing the applied voltage may be the most straightforward method for increasing the size of ablations. However, NK-IRE appears to have reached a road-block due to the intense muscle contractions induced by the 3000 V monopolar pulses used clinically. Dosages for the neuromuscular paralytics used to inhibit these muscle contractions appear to have reached their practical limits as there are no reported pre-clinical or ongoing clinical trials at higher voltages. Despite this challenge, IRE may be a promising technique for the treatment of small tumors with early clinical studies reporting success rates between 93% and 98% for ablation of 3 cm or smaller liver tumors. However, treatment of larger tumors remains a challenge.

For small tumors, the most common clinical NK-IRE treatment protocols require the placement of 4 electrodes to the distal edge of the tumor. Three treatment cycles are conducted in which all six probe-pair combinations are activated and the electrode probes are retracted by 1-2 cm after each cycle. In effect, a 3 cm tumor requires approximately 20 minutes to place the electrode applicators followed by approximately 35 minutes to deliver the NK-IRE treatment (approximately 1620× pulses, 0.162 s total-energized time). ETT may allow more rapid treatments for smaller tumors and facilitate the treatment of larger tumors by simultaneously enabling the use of higher voltages, greater energy delivery rates, and increased total-energized times than achievable with KN-IRE.

Interestingly, the rate at which H-FIRE bursts are delivered (FIGS. 3A-3D) and the duration of each burst (e.g., FIGS. 5A and 5B) appear to have minimal impact on lethal thresholds, provided that the total-energized time for each treatment remains the same. The baseline H-FIRE treatment investigated here delivered 100× bursts each energized for 100 µs resulting in a total-energized time of 0.01 s per treatment. The rate at which these bursts were delivered (0.5, 1, 2, 10 Hz) did not have a statistically significant impact on the lethal electric field threshold. When the average energized time per second (100 µs/s) and the total-energized time (0.1 s) were held constant, but the bursts were broken into different sized bursts (ETT) an interesting sinusoidal trend emerged. The mean electric field threshold was low for 4 µs bursts and slowly increased for 12-36 µs bursts. The lethal threshold then decreased again for 48-100 µs bursts before increasing for 200 µs and 400 µs bursts.

Only the 25×400 µs protocol was statistically significantly different than the 2500×4 µs protocol ($\alpha=0.001$). The higher lethal thresholds for the 50×200 µs and 25×400 µs protocols may be due a limitation of the pulse generator in which the output voltage decreases over the duration of 200-400 µs bursts. This issue may be remedied by increasing the amount of capacitive storage in future iterations of pulse generators. However, it may be unlikely that the voltage drop played a significant role, as the temperature profiles between the 100×100 µs burst protocols and the 25×400 µs protocols were nearly identical (e.g., FIG. 5B) indicating that similar average energies were delivered in each treatment.

Continuous delivery of ETT waveforms (one positive 2 µs pulse and one negative 2 µs pulse repeated at 25-100 Hz) appear to provide a lethal threshold advantage (59-91 V/cm) over the H-FIRE protocols which deliver 100 µs bursts at 1 Hz. (e.g., FIG. 6C). When delivered in this diffuse continuous manner (ETT) the rate of energy delivery did have a significant impact ($\alpha=0.001$) with 50 Hz and 100 Hz treatments having lethal thresholds that were approximately 123 V/cm and 210 V/cm lower than the 25 Hz treatment protocol, respectively. The diffuse continuous delivery of ETT waveforms may be able to reduce overall treatment times compared to more traditional NK-IRE and H-FIRE protocols. For example, a traditional treatment delivering 100 µs bursts at 1 Hz with a total-energized time of 0.05 s (500× bursts) would require 8.3 minutes to complete. In contrast continuous delivery of 4 µs bursts at 100 Hz would require 4× less time (2.1 minutes).

Substantial increases in temperature (e.g., FIG. 6E were observed when 4 µs burst were delivered at higher repetition rates. The 25 Hz repetition rate corresponded to an average on-time per second of 100 µs/s which was identical to the baseline NK-IRE and H-FIRE treatments (e.g., FIG. 5B). The statistically significant ($\alpha=0.001$) decrease in lethal threshold was observed when the repetition rate of ETT waveforms was increased to 50 Hz (200 µs/s) and 100 Hz (400 µs/s). This was not observed for the baseline 100 µs H-FIRE bursts delivered at 0.5 Hz-4 Hz (50 µs/s-400 µs/s, FIG. 3C), however, a non-statistically significant decrease in lethal threshold was observed for the 10 Hz. (1,000 µs/s) 100 µs H-FIRE burst treatment group. In these higher energy-per-second treatment groups, thermal effects may be affecting cell viability or the collagen protein structure of the 3D tumor constructs.

In this 3D tumor model the lethal threshold for a traditional NK-IRE treatment (100×100 µs pulses, 0.01 s total-energized time) was 456 V/cm. The ETT treatments with 0.05 and 0.1 s total-energized time had lethal thresholds of 491 V/cm and 476 V/cm, respectively. This indicates that on an equivalent voltage basis, these ETT protocols should be capable of achieving similar ablation volumes as NK-IRE.

Preliminary validation of this hypothesis was achieved using finite element simulations (e.g., FIG. 7) of a clinical treatment using a single 1 cm long electrode applicator energized in conjunction with a distal grounding pad. Counterintuitively, the 0.02 s, 0.05 s, and 0.1 s ETT treatments resulted in simulated ablation zones that were larger than the 100×100 µs NK-IRE ablation zone (e.g., FIG. 7B). This is due to the relatively large change in tissue conductivity (3.6×), which occurs during NK-IRE treatments compared to ETT treatments (1.8×). This greater change in tissue conductivity for NK-IRE treatments produces a large 'virtual electrode' surrounding the electrode applicator. While this virtual electrode effect can be beneficial for applications where the source and sink electrode are co-located within the tissue under treatment, it is deleterious for the case where a single electrode is used in conjunction with a distal grounding pad. This is because the virtual electrode acts to enlarge the volume of tissue which is elevated to the treatment voltage. Electroporative treatments require a large electric field ($E=-\nabla V$) and the NK-IRE virtual electrode effect acts to minimize the voltage gradient in proximity to the electrode in this scenario. Shorter duration pulses (0.01-1.9 µs) ETT waveforms may result in even larger ablations due to even smaller changes in tissue conductivity for higher frequency (shorter duration) waveforms.

This study indicates that a transition away from NK-IRE to ETT may be clinically advantageous. H-FIRE ablations appear to more closely match static conductivity analytical solutions than NK-IRE treatments, which may simplify real-time treatment planning and enable accurate revisions in the operating suite. Muscle contractions due to the electrical pulses are substantially less intense (if detectable) for H-FIRE treatments than voltage-matched NK-IRE treatments for two-electrode and A+GP treatments. Preliminary 1000 V safety studies with H-FIRE in veterinary patients indicate that the therapy can be administered with only local anesthesia; this would be clinically impractical with NK-IRE given the intense muscle contractions induced. A traditional limitation to H-FIRE treatments has been the creation of smaller ablations on an equivalent dose basis to NK-IRE protocols which was confirmed here. Asymmetric H-FIRE waveforms have been proposed as one mechanism for increasing ablation sizes, however, these waveforms result in intense muscle contractions making them impractical for treatments without anesthesia including neuromuscular paralytics.

ETT may generate equivalent or larger ablations than NK-IRE. The advantage of diffuse delivery of very short 4 μs waveforms is that they are much less likely to induce muscle contractions than longer 100 μs bursts. This may enable the delivery of even higher voltages (5 kV-15 kV) without inducing muscle contractions or significantly higher on-times per second (200 μs/s-400 μs/s) which may reduce clinical treatment times.

This study demonstrated that lethal thresholds for ETT treatments can be dramatically reduced by increasing the total-energized time of the treatment from 0.01 s to 0.05 s. Increasing energized times beyond this resulted in even lower, but not statistically significantly different lethal thresholds. Continuous delivery of ETT at 25-100 Hz appears to be advantageous over delivery of longer 100 μs bursts at 1 Hz. Computational models were used to demonstrate that ETT treatments have the potential to create larger ablations than traditional NK-IRE treatments due to the less substantial change in tissue electrical conductivity in response to ETT treatments.

Figure 9A:
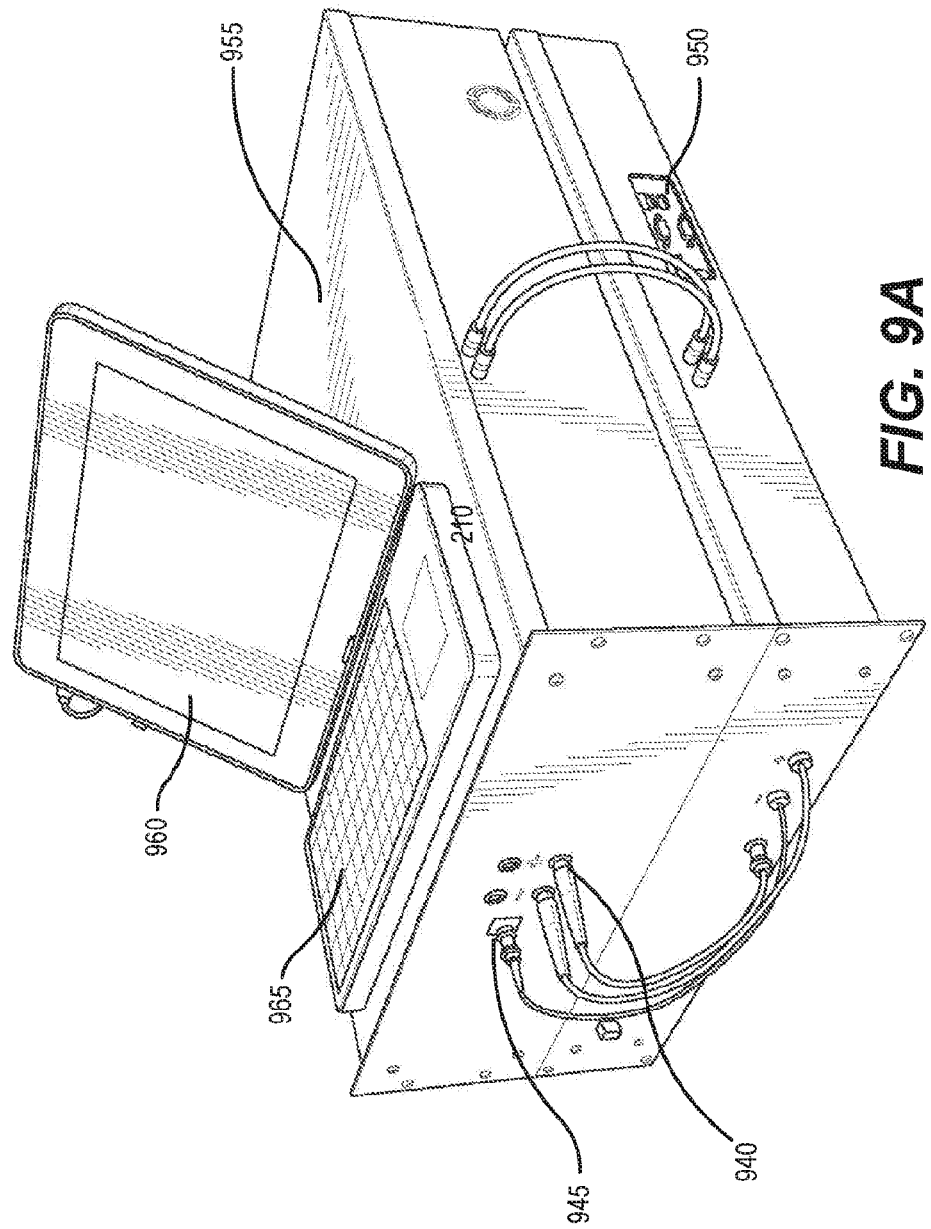
FIGS. 9A and 9B illustrate example systems configured to deliver ETT treatments, according to embodiments described herein.
Figure 9B:
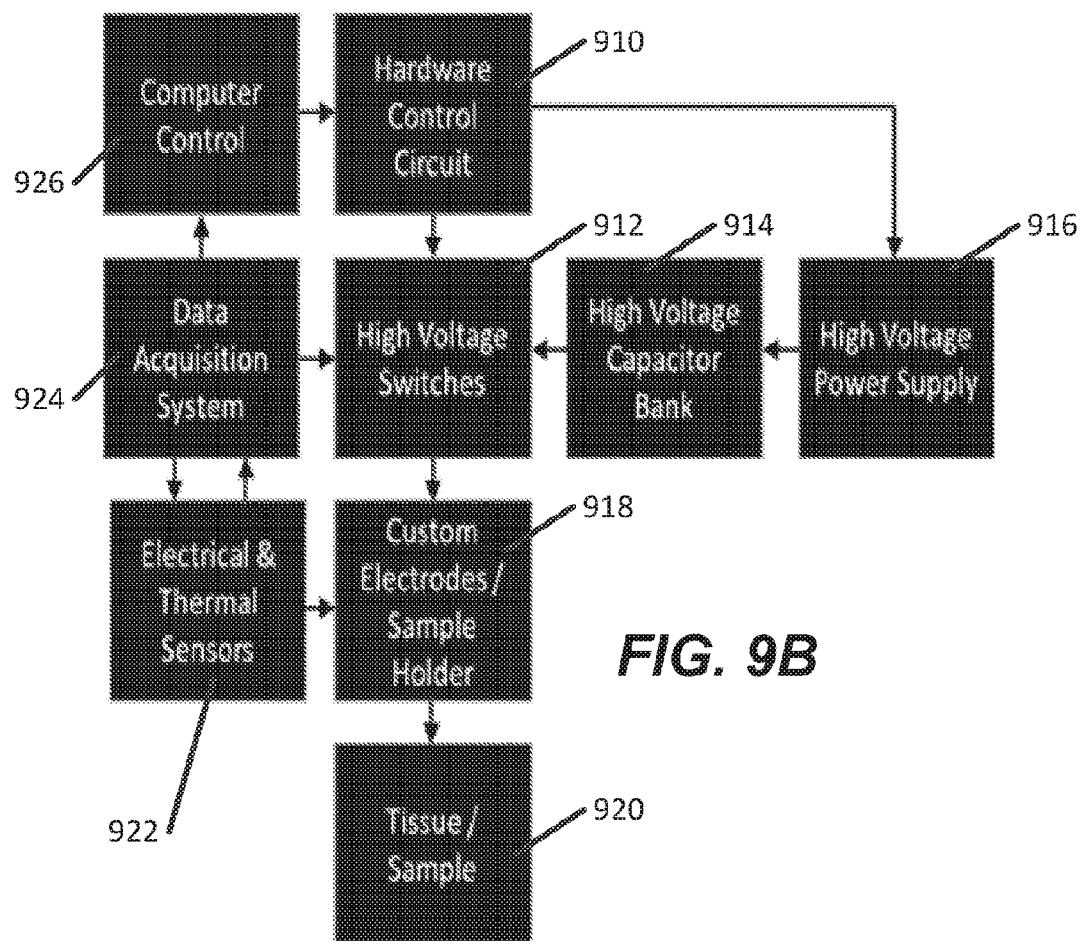

FIGS. 9A and 9B illustrate example systems configured to deliver ETT treatments, according to embodiments described herein. Referring to FIG. 9A, an example ETT treatment system may include electrode outputs 945 and temperature sensor inputs 940. The electrode outputs 945 may be configured to deliver a series of electrical pulses to target tissue (e.g., for ablation and/or treatment). The temperature sensor inputs 940 may measure a temperature of the target tissue and/or tissue in the vicinity of the target tissue. Target tissues that may be treated by ETT include, but are not limited to, tumors and/or mucous membranes (e.g., mucosal linings of, for example, the lung, stomach, and/or intestines). In some embodiments, ETT treatments may be used to decellularize and allow repopulation of healthy tissue with new cells (e.g., stem cells, genetically modified cells). In some embodiments, ETT treatments may be used for cosmetic applications (e.g., fat, cellulite, skin tags, moles, blemishes, and/or warts). In some embodiments, ETT treatments may be used for cardiac tissue, such as for the correction of arrhythmia and atrial fibrillation. In some embodiments, ETT treatments may be performed on the duodenal lining in a subject in need thereof to assist with the regulation of diabetes. In some embodiments, ETT treatments may be used for pain management (e.g., peripheral nerves) in a subject in need thereof. In some embodiments, ETT treatments may be used for benign prostatic hyperplasia (BPH) to treat healthy prostate tissue. In some embodiments, ETT treatments may be performed on brain tissue to, for example, enhance drug delivery, treat Parkinson's/tremors, and/or treat depression/anxiety.

An example ETT treatment system may also include a controller 950, which may include, for example, control hardware and/or one or more processors. The controller 950 may control an output delivered to the electrode outputs 945 based on the temperature measured by the temperature sensor inputs 940. That is to say that the controller 950 may control a waveform that includes the series of electrical pulses based on the measured temperature.

The example ETT treatment system may also include a high voltage energy storage 955. The high voltage energy storage 955 may provide power for the series of electrical pulses that are generated for deliver to the electrode outputs 945. In some embodiments, the high voltage energy storage 955 may include switch and/or capacitor configurations, such as those discussed herein with respect to FIGS. 8A-8C. However, the embodiments described herein are not limited there to. The high voltage energy storage 955 may include any power supply configuration capable of being configured to deliver the series of electrical pulses described further herein.

The example ETT treatment system may also include an input device 965 and a display 960. The input device 965 may allow for configuration and adjustment of the ETT treatment system. The display 960 may allow of the confirmation of treatment options and visualization of treatment progress.

FIG. 9B illustrates a schematic representation of an example ETT treatment system. As illustrated in FIG. 9B, the example ETT treatment system may include a hardware control circuit 910. The hardware control circuit 910 may control a series of high voltage switches 912 to deliver a series of electrical pulses. The high voltages switches 912 may be connected to a high voltage capacitor bank 914 that is powered by a high voltage power supply 916. The high voltage power supply 916 may be further controlled by the hardware control circuit 910.

The high voltage switches 912 may provide the electrical energy stored in the high voltage capacitor bank 914 as a series of electrical pulses delivered via electrodes 918 to a tissue sample 920. The series of electrical pulses may provide the ETT treatment to the tissue sample 920.

Thermal sensors 922 may be further coupled to the tissue sample 920. The thermal sensors 922 may measure a temperature of the tissue sample 920 and/or an area in the vicinity of the tissue sample 920. In some embodiments, the thermal sensors 922 may be part of and/or connected to, the electrodes 918. The thermal sensors 922 may be coupled to a data acquisition system 924 configured to collect data from, for example, the thermal sensors 922. In some embodiments, electrical sensors may also be used. Electrical sensors may be used for impedance measurements to detect if the tissue has undergone a "sufficient" change to indicate treatment is successful. Other electrical sensors could be, for example, physical temperature sensors. In some embodiments, fiber optic sensors may be used. In some embodiments, negative/positive temperature coefficient thermistors may be used, as well as thermocouples or semiconductor based temperature sensors. The data acquisition system 924 may be provided to a computer control 926. The computer control 926 may control the hardware control circuit 910 to control the delivery of the electrical pulses. In some embodiments, an energy delivered by the electrical pulses can be controlled responsive to the temperature measured by the thermal sensors. In some embodiments, the delivery of the electrical pulses may be configured to be controlled so as to maintain a temperature of the target tissue with a particular range. In some embodiments, the range of temperatures may be between 30° C. and 50° C. In some embodiments, the target tissue may be cooled down to about 1° C. to 2° C., and ETT treatments may be used to increase the temperature of the target tissue to between 1° C. to about 60° C. In the example ETT treatment system of FIG. 9B, data may be obtained from electrical and thermal sensors 922, which may be on the electrodes 918 and/or in tissue 920, and used to modulate the rate at which energy is delivered and determine treatment completion.

Figure 10A:
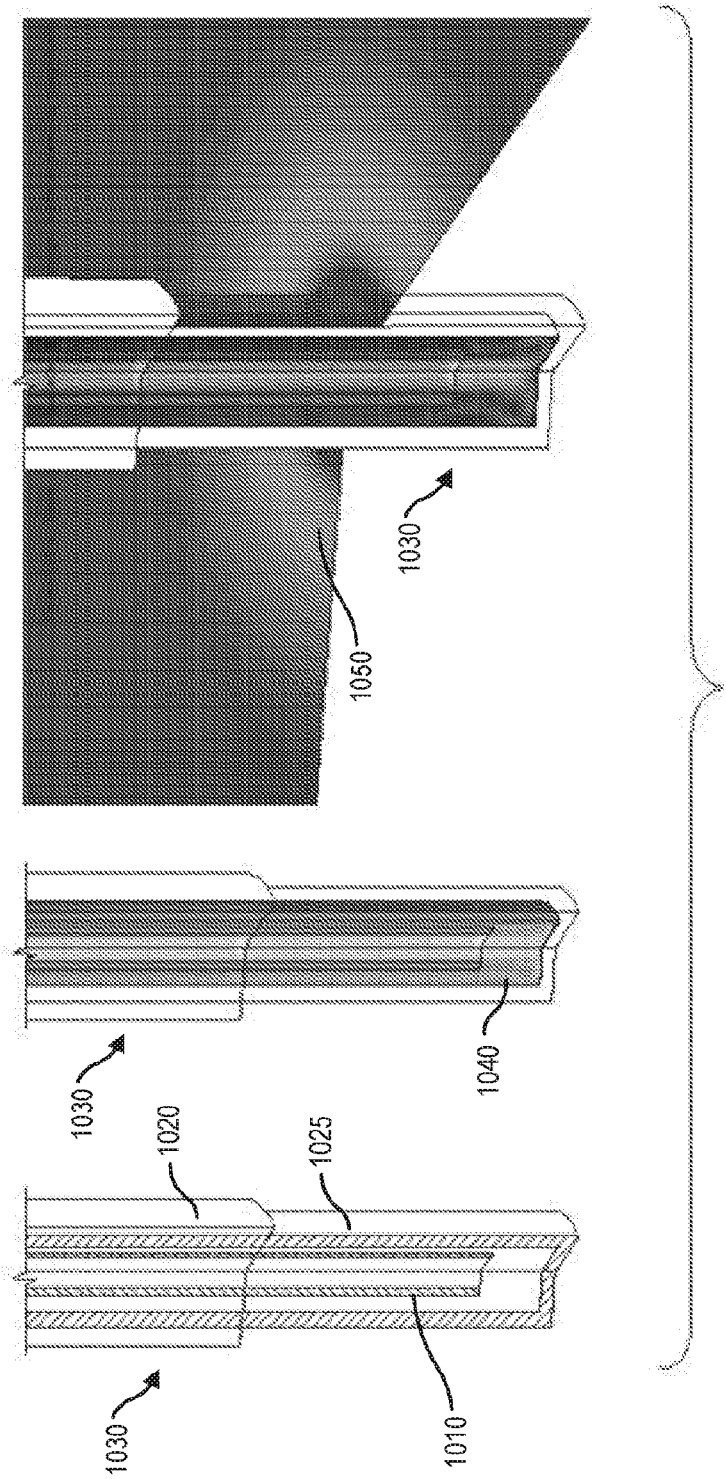
FIGS. 10A and 10B are schematic diagrams illustrating electrodes configured to deliver ETT treatments, according to embodiments described herein.
Figure 10B:
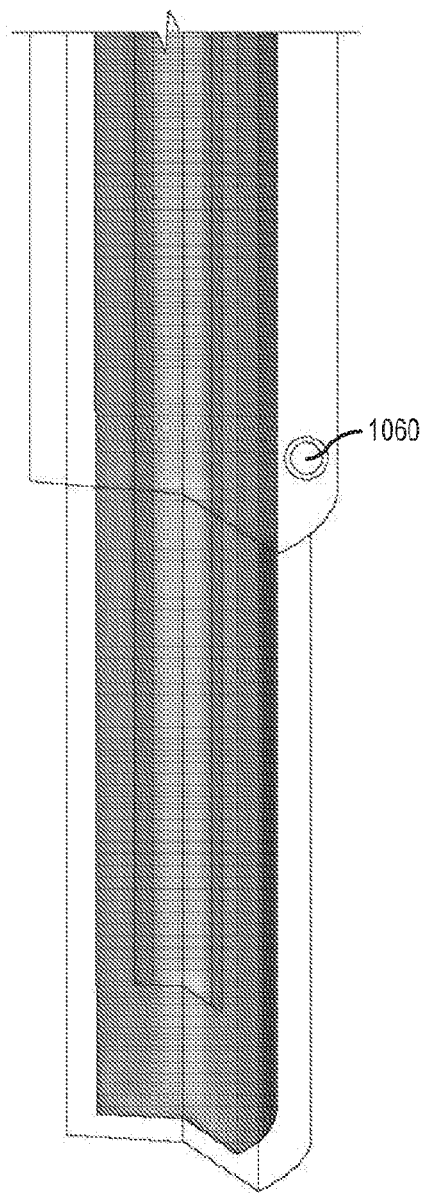

FIGS. 10A and 10B are schematic diagrams illustrating electrodes configured to deliver ETT treatments, according to embodiments described herein. Referring to FIG. 10A, an electrode 1030 may be configured to be connected to a voltage supply. In some embodiments, the electrode 1030 may include a perfusion tube 1010 to provide fluid flow 1040 through the electrode 1030. Thus, the electrode 1030 may be internally cooled so as to maintain a target temperature distribution 1050 in the tissue surrounding the electrode 1030. As illustrated in FIG. 10A, a temperature distribution 1050 in the tissue surrounding the electrode 1030 may expand outward from the electrode 1030. In some embodiments, the electrode 1030 may include an insulator 1040 on a first portion of the electrode 1030 and exposing a second portion 1025 of the electrode 1030. In some embodiments, as illustrated in FIG. 10B, the electrode 1030 may contain a temperature sensor 1060. The temperature sensor 1060 may perform data collection described herein with respect to the thermal sensors 922 of FIG. 9B.

Figure 11A:
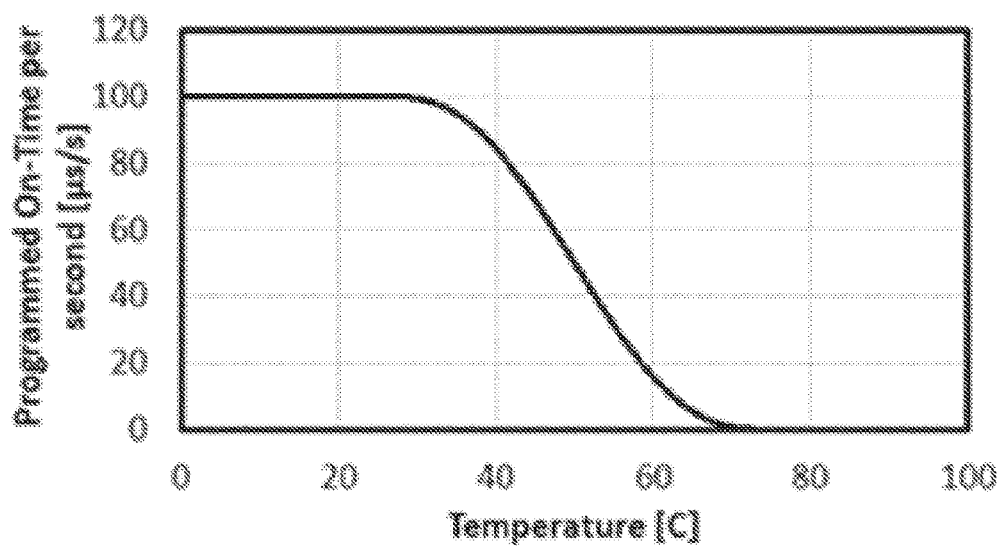
FIG. 11A illustrates the control of an on-time for the delivery of electrical treatment based on a recorded temperature, according to embodiments described herein.
Figure 11B:
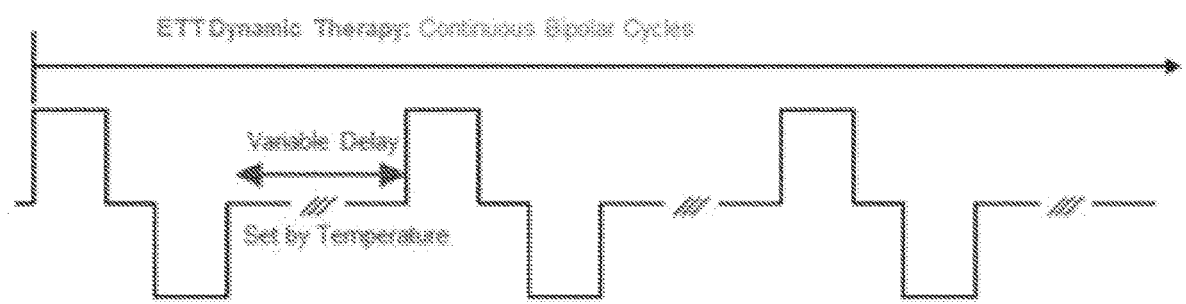
FIG. 11B illustrates an example waveform including a series of electrical pulses controlled based on a recorded temperature, according to embodiments described herein

FIG. 11A illustrates the control of an on-time for the delivery of electrical treatment based on a recorded temperature, according to embodiments described herein. FIG. 11B illustrates an example waveform including a series of electrical pulses controlled based on a recorded temperature, according to embodiments described herein. Referring to FIG. 11A, a dynamic control function may use a temperature measurement to determine the average rate at which energy is delivered. As the recorded temperature associated with a target tissue increases, the amount of energy delivered may be decreased. Decreasing the temperature associated with the delivery of the energy may result in a reduction of tissue damaged by thermal necrosis while still achieving the desired ablation. In some embodiments, the energy delivery may be controlled by controlling a duty cycle of electrical signals delivered to the target tissue. In some embodiments, the thermal necrosis can be maintained at less than 1 cm$^3$ of volume of the target tissue.

Referring to FIG. 11B, a series of electrical pulses may be delivered to target tissue. The overall energy delivered by the series of electrical pulses may be controlled by placing a variable delay between ones of the series of electrical pulses. In some embodiments, the variable delay may be based on the temperature measured by the temperature sensors. In some embodiments, the variable delay may be controlled to maintain a temperature of the target tissue between, for example, 30° C. and 50° C. As illustrated in FIG. 11B, the variable delay between groups of pulses may be modulated to achieve a target energy rate and a target tissue temperature.

As discussed herein, providing electrical energy while controlling the temperature of the target tissue may provide beneficial effects as compared to traditional treatments such as NK-IRE and H-FIRE. There may be two types of ablation of target tissue that occurs responsive to providing electrical energy to the target tissue. The first is thermal ablation (also referred to herein as thermal necrosis). In thermal ablation, the cells within the target tissue are killed, but other effects may also occur, including tissue coagulation, blood clotting, protein denaturing, blood vessel destruction, and/or other structural damage. The second type of ablation is referred to herein as ETT ablation. In ETT ablation, the cell membrane may be destabilized, resulting ultimately in cell death. However, in ETT ablation the same level of structural damage and/or tissue coagulation may not occur. This can be especially beneficial in treating tissue that is near important circulatory structures and/or organs that might be otherwise damaged by thermal ablation. As the temperature of the tissue increases, the amount of thermal necrosis that occurs also increases. The rate at which thermal necrosis occurs is dependent on the tissue temperature. For low temperatures (1-45° C.), thermal necrosis may never occur. For intermediate temperatures (46-55° C.) thermal necrosis may take hours to minutes to occur. For high temperatures (55-99° C.) thermal necrosis may take seconds to occur. ETT ablations occur when tissue temperatures are elevated above physiological (37° C.) and are exposed to electric fields. The temperature of the tissue is related to the rate at which energy is delivered to the target tissue. Thus, the embodiments described herein result, in part, from a realization that ETT ablation can be increased by controlling the amount of energy delivered based on the temperature of the target tissue.

Figures 12A, 12B, 12C, 12D:
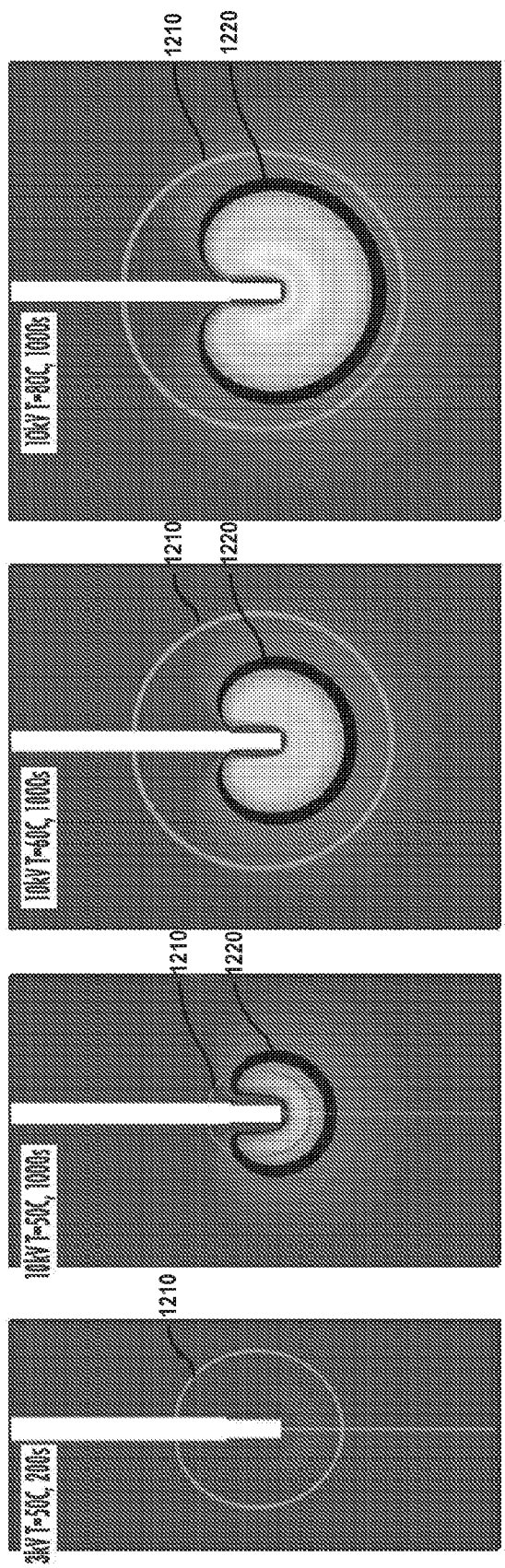
FIGS. 12A-12D illustrates a comparison of different types of ablation that can occur for different amounts of energy delivery and/or tissue temperature.

FIGS. 12A-12D illustrate a comparison of different types of ablation that can occur for different amounts of energy delivery and/or tissue temperature. FIGS. 12A-12D illustrate an ETT ablation boundary 1210 and a thermal ablation boundary 1220. FIGS. 12A-12D illustrate, in part, that treatment outcomes are a function of the applied voltage, rate of energy delivery, and/or total treatment time. FIG. 12A illustrates ablation due primarily to ETT where tissue temperatures are not elevated sufficiently to induce thermal necrosis. FIG. 12A illustrates a simulated outcome based on 3 kV electrical pulses with a target temperature of 50° C. for 200 s. FIG. 12B illustrates ablation which is a combination of ETT and thermal necrosis due to prolonged exposure to elevated temperatures. FIG. 12B illustrates a simulated outcome based on 10 kV pulses with a target temperature of 50° C. for 1000 s. FIGS. 12C and 12D illustrate ablations in which ETT dominates over thermal necrosis due to sufficient electrical energy delivery to induce ETT effects. FIG. 12C illustrates a simulated outcome based on 10 kV electrical pulses with target temperatures of 60° C. for 1000 s. FIG. 12D illustrates a simulated outcome based on 80° C. for 1000 s.

Figure 13A:
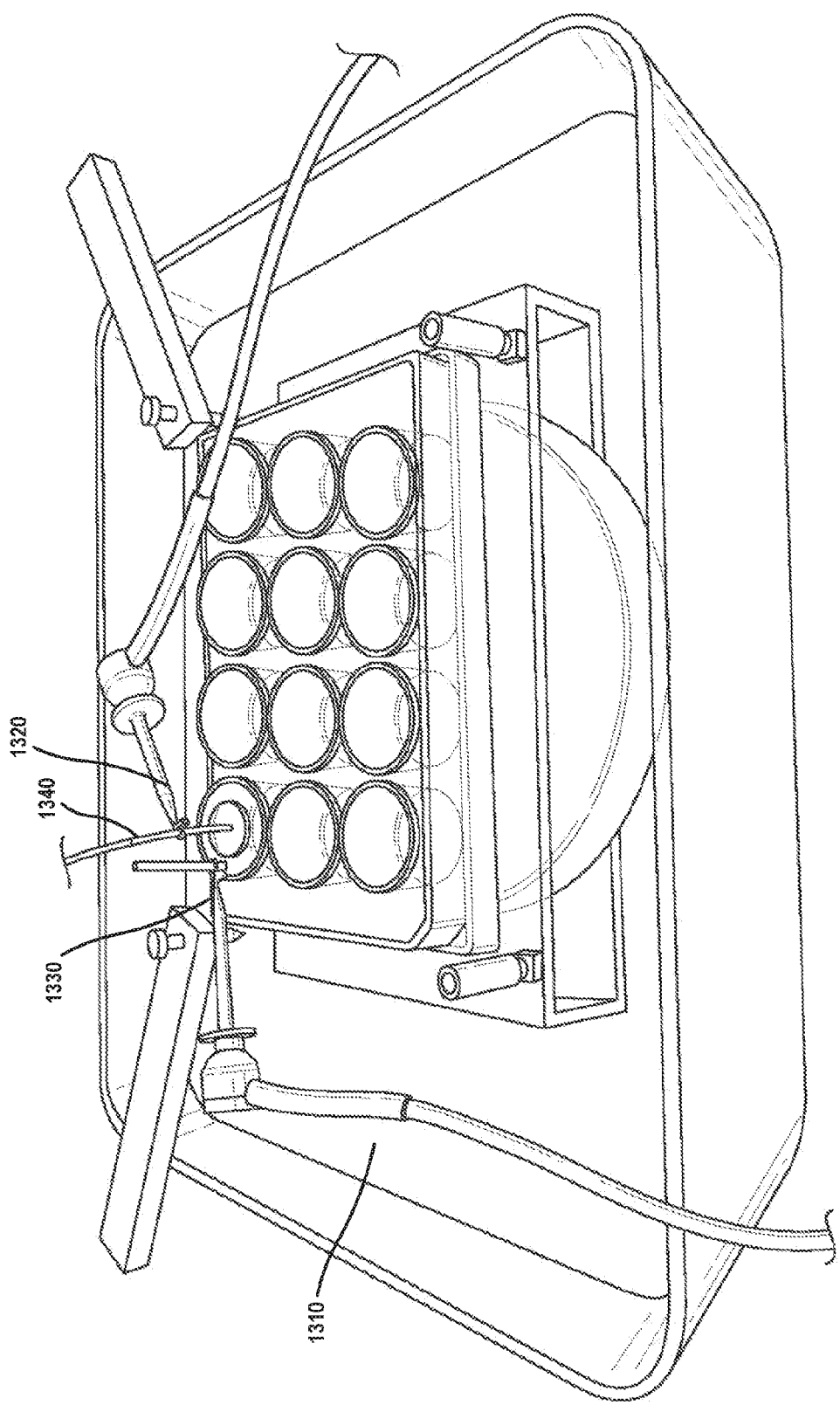
FIG. 13A illustrates an experiment in which a temperature of the target tissue may be controlled and/or measured while delivering electricity to the target tissue.
Figure 13B:
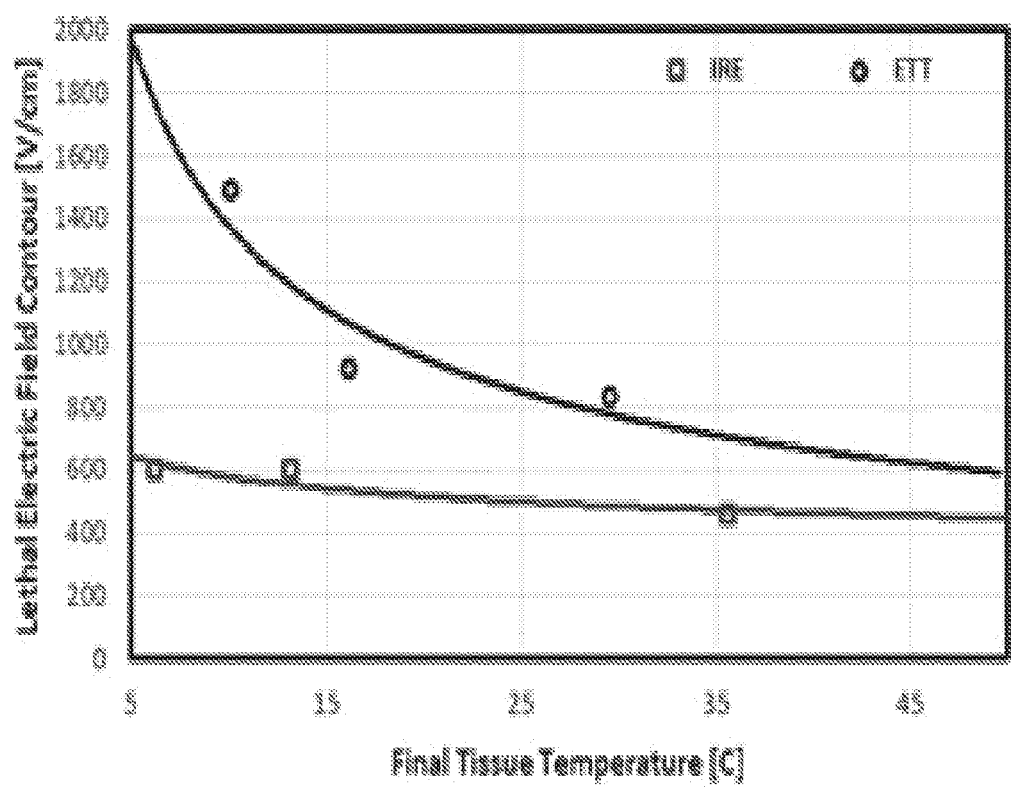
FIG. 13B illustrates a comparison of ETT and IRE treatments based on temperature.

ETT treatment, as described herein, may be delivered using pulses of alternating polarity. The use of alternating polarities may reduce a total cumulative electric charge applied to the target tissue. A benefit of using the alternating polarity waveforms may be seen when comparing ETT treatment to IRE treatment. FIG. 13A illustrates an experiment in which a temperature of the target tissue may be controlled and/or measured while delivering electricity to the target tissue. As illustrated in FIG. 13A, the target tissue may be placed in an ice/water bath 1310, with electricity provided through a source electrode 1320 and a sink electrode 1330. The temperature may be monitored by a temperature sensor 1340. FIG. 13B illustrates a comparison of ETT and IRE treatments based on temperature. As illustrated in FIG. 13B, treatment outcomes may change as a function of temperature for ETT but not for IRE. In the example illustrated in FIG. 13B, the total energized time (0.01 s) and average energy delivery rate (100 μs/s) were held constant, but the final temperature of the tissue was varied using the ice/water bath. Electric field contours corresponding to cell death were relatively constant when long duration (10 μs) pulses were delivered once per second (e.g., as in IRE). However, when short duration (2 μs) alternating polarity ETT waveforms were delivered continuously the lethal threshold dropped dramatically as final temperature increased. As illustrated in FIG. 13B, control of the energy delivery rate and tissue temperature may result in higher ablation volumes than traditional techniques.

An ETT treatment system may control delivery of electrical energy based on a number of different types of waveforms. As used herein the term "waveform" is used to describe a series of electrical pulses delivered over time that may or may not be periodic. FIGS. 14A-14F illustrate example waveforms for ETT treatment, according to embodiments as described herein.

Figure 14A:
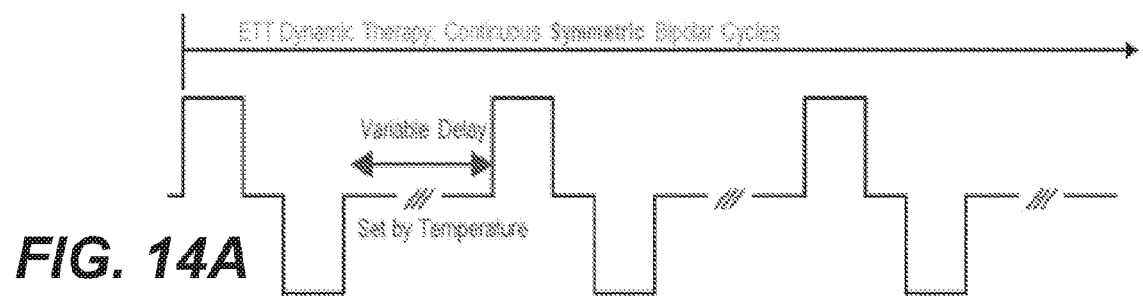
FIGS. 14A-14F illustrate example waveforms for ETT treatment, according to embodiments as described herein.

For example, an ETT system may deliver electrical energy in a continuous symmetric bipolar cycle as illustrated in FIG. 14A. The cycle may include electrical pulses of alternating polarity, where the positive electrical pulse and the negative electrical pulse may have substantially the same magnitude and/or duration. That is to say that an absolute value of the magnitude of the positive electrical pulse and an absolute value of the negative electrical pulse may be substantially the same. As used herein, the absolute values of the magnitudes of the positive electrical pulses and the negative electrical pulses may be considered to be substantially the same if they are within 10% of each other. The durations of the positive electrical pulses and the negative electrical pulses may be considered to be substantially the same if they are within 10% of each other.

Figure 14B:
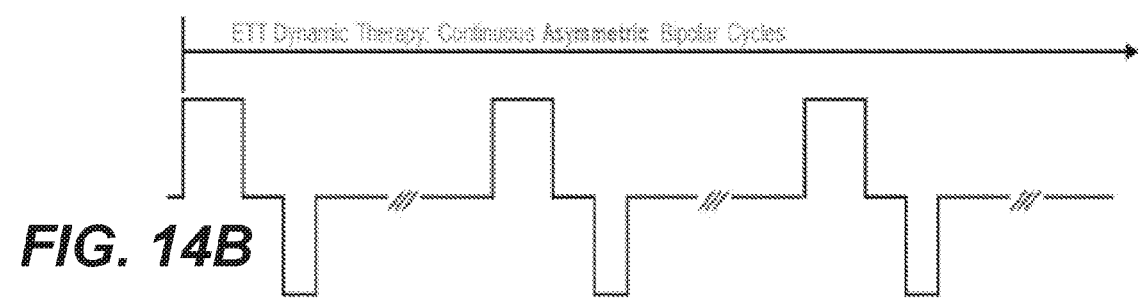

Referring to FIG. 14B, an ETT system may deliver electrical pulses having a continuous asymmetric bipolar cycle. The cycle may include electrical pulses of alternating polarity, where the positive electrical pulse may have a magnitude and/or duration that is different than the negative electrical pulses. In some embodiments, for example, a duration of the positive electrical pulse may be longer than a duration of the negative electrical pulse, but the embodiments described herein are not limited thereto. In some embodiments, for example, a duration of the positive electrical pulse may be shorter than a duration of the negative electrical pulse. In some embodiments, for example, a duration of the positive electrical pulse may be longer than a duration of the negative electrical pulse, and a magnitude of the positive electrical pulse may be lesser than a magnitude of the negative electrical pulse. The durations and magnitudes in the positive and negative directions may be controlled so that a substantially equivalent energy (e.g., within 10%) in the positive and negative polarity that results in zero net charge averaged over time. FIG. 14E illustrates an example of an asymmetric bipolar cycle in which the charge is substantially symmetric over time (e.g., a continuous asymmetric voltage-symmetric charge (AVSC) bipolar cycle). In the AVSC waveforms, charge is balanced by increasing the voltage of the shorter pulse or decreasing the voltage of the longer pulse so that the average charge delivered is substantially equivalent to zero.

Figure 14C:
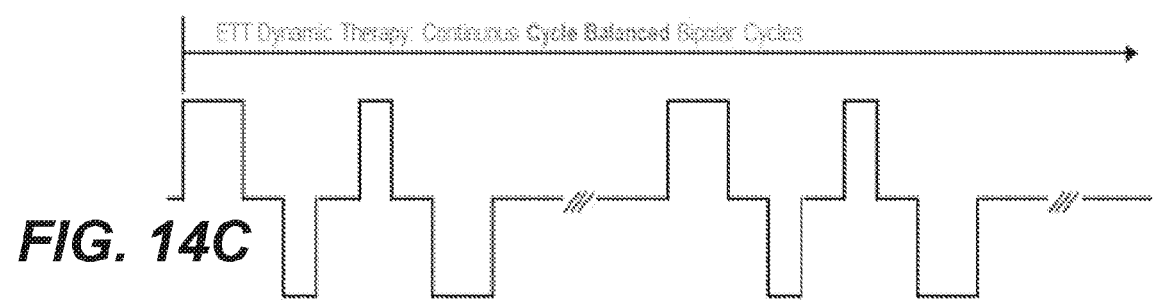

Referring to FIG. 14C, an ETT system may deliver electrical pulses having a continuous cycle balanced bipolar cycle. The cycle may include electrical pulses of alternating polarity, where a net charge over a series of n positive electrical pulses is substantially the same (e.g., within 10%) as a series of n negative electrical pulses. As illustrated in FIG. 14C a duration and/or magnitude of the positive electrical pulses may change, and a duration and/or magnitude of the negative electrical pulses may change, over time. However, the generated waveform may deliver equivalent energy in the positive and negative polarity that results in zero net charge averaged over time.

Figure 14D:
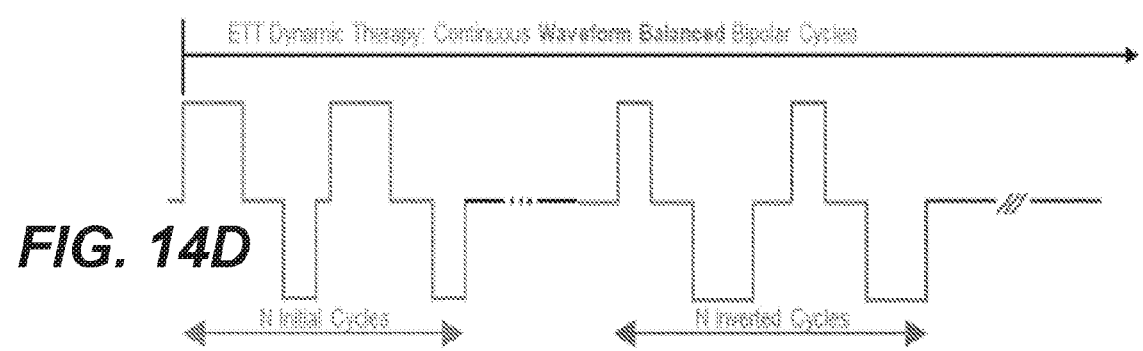
Figure 14E:
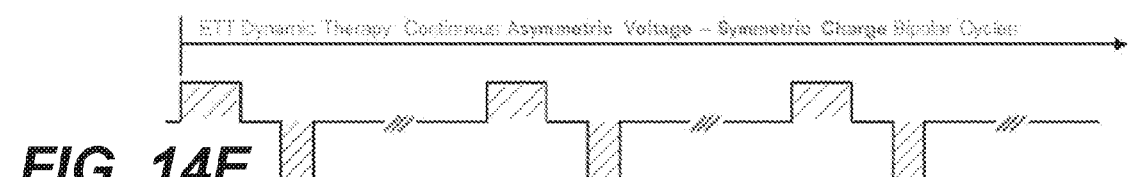
Figure 14F:
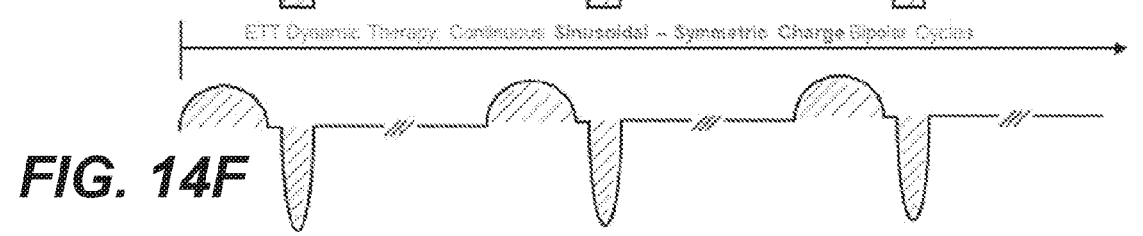

Referring to FIG. 14D, an ETT system may deliver electrical pulses having a continuous waveform balanced bipolar cycle. The cycle may include electrical pulses of alternating polarity, where a net charge over a first series of n positive and negative electrical pulses is substantially the same (e.g., within 10%) as a second series of n positive and negative electrical pulses. That is to say that a set of first N initial cycles may have a first set of positive durations/magnitudes and negative durations/magnitudes, and a set of second N inverted cycles may have a second set of positive durations/magnitudes and negative durations/magnitudes. An electrical energy delivered over the first N initial cycles may be substantially the same as that delivered in the second N inverted cycles, such that the generated waveform may deliver equivalent energy in the positive and negative polarity that results in zero net charge averaged over time.

Though FIGS. 14A-14E illustrate waveform patterns using electrical pulses that are substantially square waves, it will be understood that other patterns are possible. For example, FIG. 14E illustrates a continuous sinusoidal-symmetric charge bipolar cycle in which durations and magnitudes of the positive and negative electrical pulses are maintains such that the a substantially equivalent energy is delivered in the positive and negative polarity that results in zero net charge averaged over time. It will be understood that other waveform shapes are possible without deviating from the embodiments described herein.

In some embodiments, the ETT treatment may be performed so as to provide positive electrical pulses and negative electrical pulse each having a duration of 0.1 to 10 microseconds. In some embodiments, the ETT treatment may be performed so as to provide positive electrical pulses and negative electrical pulse each having a duration of 0.01 to 10 microseconds. In some embodiments, a sum of the positive durations of the positive electrical pulses and the negative durations of the negative electrical pulses are between 0.02 microseconds and 5000 microseconds every second, preferably between 1 and 500 microseconds every second. In some embodiments, a sum of positive durations of the positive electrical pulses and negative durations of the positive electrical pulses that are delivered as part of an ETT treatment is between 0.0001 seconds and 100 seconds, preferably between 0.01 seconds and 1 second.

Figure 15:
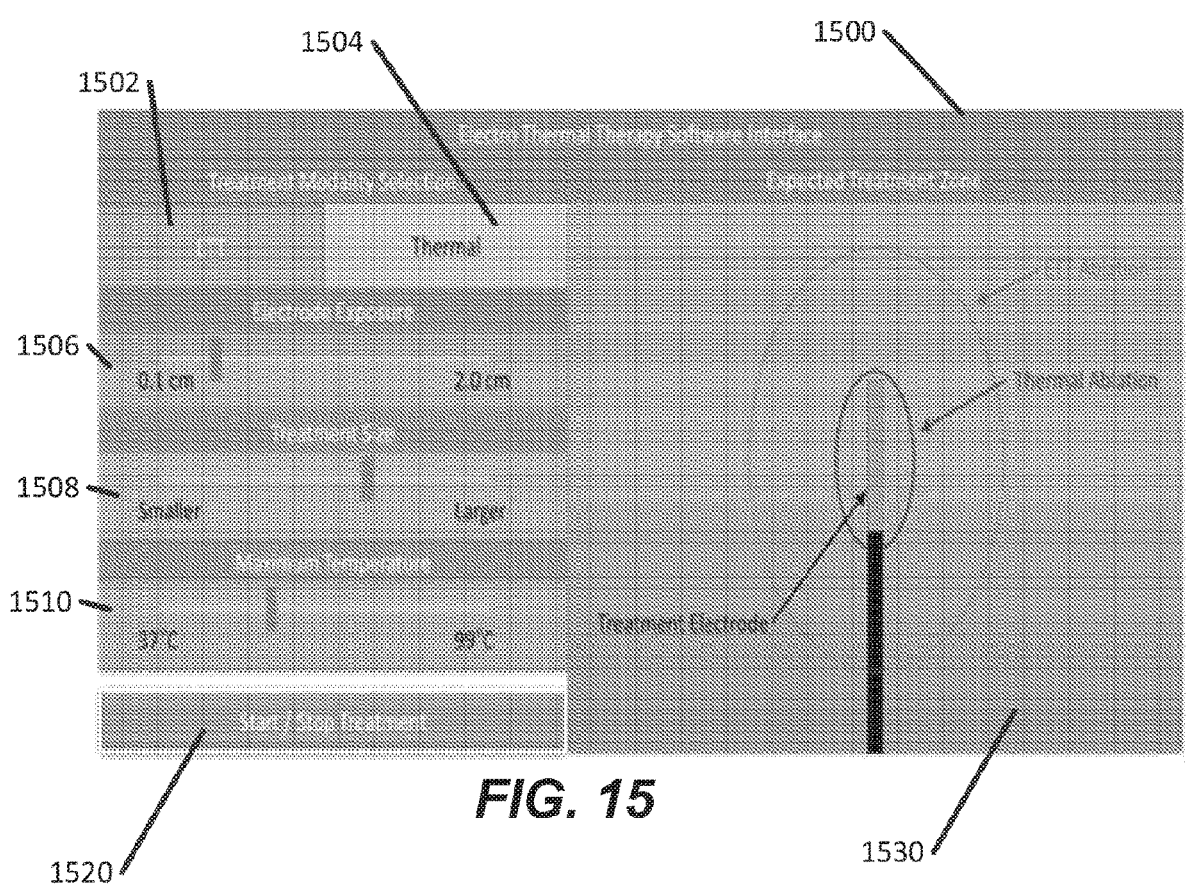
FIG. 15 illustrates an example user interface 1500 in which a user can specify a desired ablation size, according to embodiments described herein.

Referring back to FIGS. 9A and 9B, an ETT treatment system may allow for input to control the ETT treatment. In some embodiments, the input may include the specification of a size of an ablation region to generate. The computer controller of the ETT treatment system (e.g., computer control 926 of FIG. 9B) may select a duration and/or a magnitude of a waveform based on the desired ablation region. FIG. 15 illustrates an example user interface 1500 in which a user can specify a desired ablation size, according to embodiments described herein. In some embodiments, the user interface may allow the user to specify treatment modality between, for example, ETT ablation 1502 or thermal ablation 1504.

In some embodiments, the user interface 1500 may also allow the user to control electrode exposure 1506. Selecting electrode exposure may include the specification of a specific value and/or the use of a user interface control, such as a sliding control. In some embodiments, the electrodes used in ETT treatments may include metal which is covered in an insulating sheath. The insulating sheath may be retracted to expose the tip of the electrode and enable electrical contact with the tissue. The values illustrated in FIG. 15 for electrode exposure, as well as other interface inputs, are merely examples, and are not intended to be limiting of the present invention. For example, electrode exposure may be controlled to vary between 0.1 and 10 cm, and optionally between 0.5 and 4 cm. In some embodiments, the control for electrode exposure 1506 may allow for various exposures to be modeled so as to provide the correct ETT treatment area.

In some embodiments, the user interface 1500 may also allow the user to control the relative treatment size 1508. The relative treatment size may control an area to be ablated in the vicinity of a treatment electrode. Selecting the treatment size may include the specification of a specific value (e.g., a diameter of tissue to be ablated) and/or the use of a user interface control, such as a sliding control, to control the treatment size to be smaller or larger.

In some embodiments, the user interface 1500 may also allow the user to control the maximum temperature 1510 of the tissue to be treated. Controlling the maximum temperature may include the specification of a specific value (e.g., a temperature in degrees Celsius) and/or the use of a user interface control, such as a sliding control, to move the temperature between higher and lower temperature values. The values illustrated in FIG. 15 for maximum temperature are merely examples, and are not intended to be limiting of the present invention. For example, in some embodiments, a maximum temperature above 99° C. (e.g., for thermal ablation) and/or below 37° C. (e.g., for a cooled electrode) may be supported.

In some embodiments, the user interface 1500 may include a simulation 1530 that illustrates and expected treatment zone responsive to the selected treatment parameters (e.g., modality, electrode exposure, treatment size, and/or maximum temperature). The simulation 1530 may graphically illustrate a projected ablation area with respect to the electrode. The simulation 1530 may include illustration projecting which tissues will undergo thermal ablation and which tissue will undergo ETT ablation. The simulation 1530 may dynamically change responsive to other changes to the parameters in the user interface 1500. Thus, a user of the ETT treatment system may receive feedback via that simulation 1530 that the selected parameters should result in the expected treatment shape/size.

In some embodiments, the user interface 1500 may include an interface control 1520 to start and/or stop treatment. Once the user is satisfied with the selected parameters (e.g., after review of the simulation 1530), the user may select the interface control 1520 to begin treatment. The treatment may end automatically based on the selected course of treatment, or the user may select the interface control 1520 to end treatment once begun.

Though FIG. 15 illustrates manual control of the user interface 1500 to determine treatment size, other interface options are possible without deviating from the embodiments described herein. For example, the user interface 1500 may accept imaging data (e.g., an ultrasound, CT, or MRI image) in which a user specifies tissue to be ablated and tissue to be protected (e.g., a selection of an area to be treated). The ETT treatment system (e.g., computer control 926 of FIG. 9B) may determine a treatment size based on the area to be removed and the area not to be damaged (e.g., through thermal ablation). In some embodiments, the ETT treatment system (e.g., through user interface 1500) may suggest placement (e.g., a placement location) of the electrodes and/or a duration of treatment. In some embodiments, the suggestion of the placement may be overlaid on the imaging data (e.g., the ultrasound, CT, or MRI image).

Figure 16:
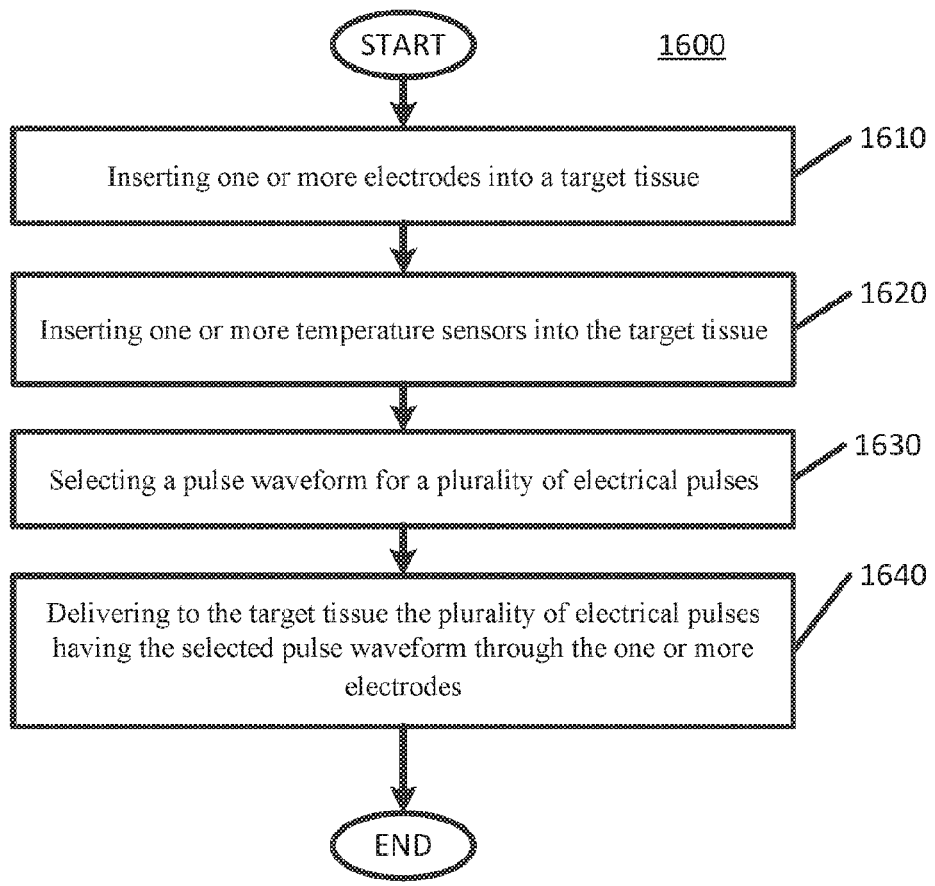
FIG. 16 illustrates operations for ablating tissue, according to embodiments described herein.

FIG. 16 illustrates operations 1600 for ablating tissue, according to embodiments described herein. The operations 1600 may begin at block 1610 in which one or more electrodes are inserted into target tissue. The one or more electrodes may be similar, for example, to the electrodes discussed herein with respect to FIGS. 9A, 9B, 10A, and 10B.

The operations 1600 may continue with block 1620 in which one or more temperature sensors are inserted into target tissue. The one or more temperature sensors may be similar, for example, to the temperature and/or thermal sensors discussed herein with respect to FIGS. 9A, 9B, and 10B.

The operations 1600 may continue with block 1630 in which a pulse waveform is selected for a plurality of electrical pulses. The waveform selected may be, for example, of the waveforms discussed with respect to FIGS. 14A-14F, though the embodiments described herein are not limited thereto.

The operations 1600 may continue with block 1640 in which the plurality of electrical pulses are delivered to the target tissue through the one or more electrodes. The electrical pulses may be delivered from a high voltage power supply and/or capacitor bank, such as the high voltage capacitor bank 914 and/or the high voltage power supply 916 of FIG. 9B. In some embodiments, a delay between ones of the plurality of electrical pulses is selected based on a temperature reading from the one or more temperature sensors. In this way, a temperature of the target tissue may be used to control a size of an ablation area of the ablation system.

In some embodiments, an adjunctive compound (e.g., adjunctive therapy) may be introduced into the target tissue in conjunction with the ETT treatment. The ETT treatment may, for example, promote a delivery path for the adjunctive compound which may facilitate and/or increase an effectiveness of the adjunctive compound. Adjunctive compounds may include any material designed to illicit or enhance an immune response and/or enhance the lethality of the therapy (e.g., a chemotherapeutic compound). Materials designed to enhance an immune response include, for example, antigen capturing nanoparticles or checkpoint inhibitors.

Adjunctive compounds may also include material designed to introduce new genetic material into cells. Material designed to introduce new genetic material includes, for example, DNA, RNA, RNAi, SIRNA, genes, endonucleases, amino acids, polypeptides, proteins, or other biological compounds which change the behavior or genetic code of cells. Further non-limiting examples include Cas3, Cas8a, Cas5, Cas8b, Cas8c, Cas10d, Cse1, Cse2, Csy1, Csy2, Csy3 GSU0054, Cas10, Csm2, Cmr5, Cas10, Csx11, Csx10, Csf1, Cas9, Csn2, Cas4 Cpf1, C2c1, C2c3, C2c2. CRISPR-Cas9, CRISPR-DR2, CRISPR-DR5, CRISPR-DR6, CRISPR-DR8, CRISPR-DR9, CRISPR-DR19, CRISPR-DR41, CRISPR-DR52, CRISPR-DR57, CRISPR-DR65, DRACO (Double-stranded RNA Activated Caspase Oligomerizer), zinc-finger nucleases, and/or transcription activator-like nucleases.

Chemotherapeutic compounds may include, for example, those materials used to induce necrosis, apoptosis, or DNA damage. Example compounds include Anthracyclines, doxorubicin (Adriamycin) epirubicin (Ellence), Taxanes, paclitaxel (Taxol), docetaxel (Taxotere), 5-fluorouracil, Cyclophosphamide, Carboplatin, Docetaxel, Paclitaxel Platinum agents (cisplatin, carboplatin), Vinorelbine (Navelbine), Capecitabine (Xeloda), Liposomal doxorubicin (Doxil), Gemcitabine (Gemzar), Mitoxantrone (Novantrone), Ixabepilone (Ixempra), Albumin-bound paclitaxel (nab-paclitaxel or Abraxane), and/or Eribulin (Halaven).

Figure 17:
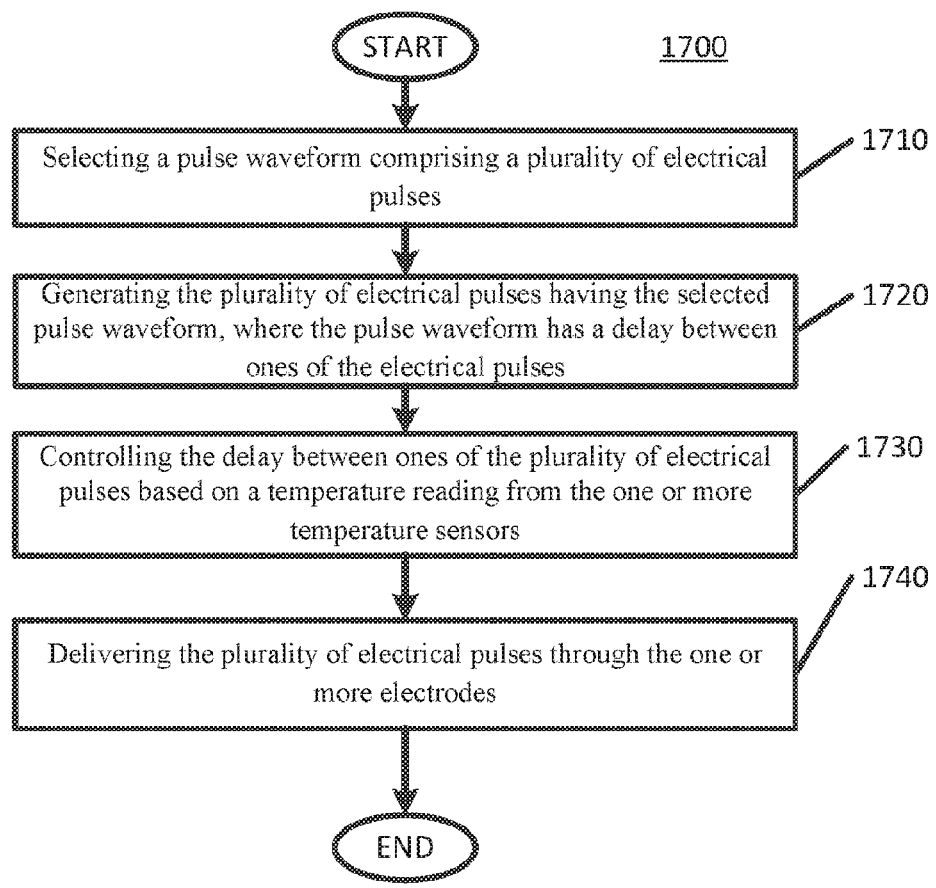
FIG. 17 illustrates operations for an ETT treatment system, according to embodiments described herein.

FIG. 17 illustrates operations 1700 for an ETT treatment system, according to embodiments described herein. The operations 1700 may begin at block 1710 in which a pulse waveform comprising a plurality of electrical pulses is selected. The waveform selected may be, for example, of the waveforms discussed with respect to FIGS. 14A-14F, though the embodiments described herein are not limited thereto.

The operations 1700 may continue with block 1720 in which the plurality of electrical pulses having the selected pulse waveform are generated. In some embodiments, the pulse waveform may have a delay between ones of the electrical pulses. The electrical pulses may be delivered from a high voltage power supply and/or capacitor bank, such as the high voltage capacitor bank 914 and/or the high voltage power supply 916 of FIG. 9B.

The operations 1700 may continue with block 1730 in which the delay between ones of the plurality of electrical pulses is controlled based on a temperature reading from the one or more temperature sensors. The waveform may be controlled, for example, by a hardware and/or software controller similar to the controller illustrated in FIGS. 9A, 9B, and 15.

The operations 1700 may continue with block 1740 in which the plurality of electrical pulses is delivered through the one or more electrodes. The one or more electrodes may be similar, for example, to the electrodes discussed herein with respect to FIGS. 9A, 9B, 10A, and 10B.

Figure 18A:
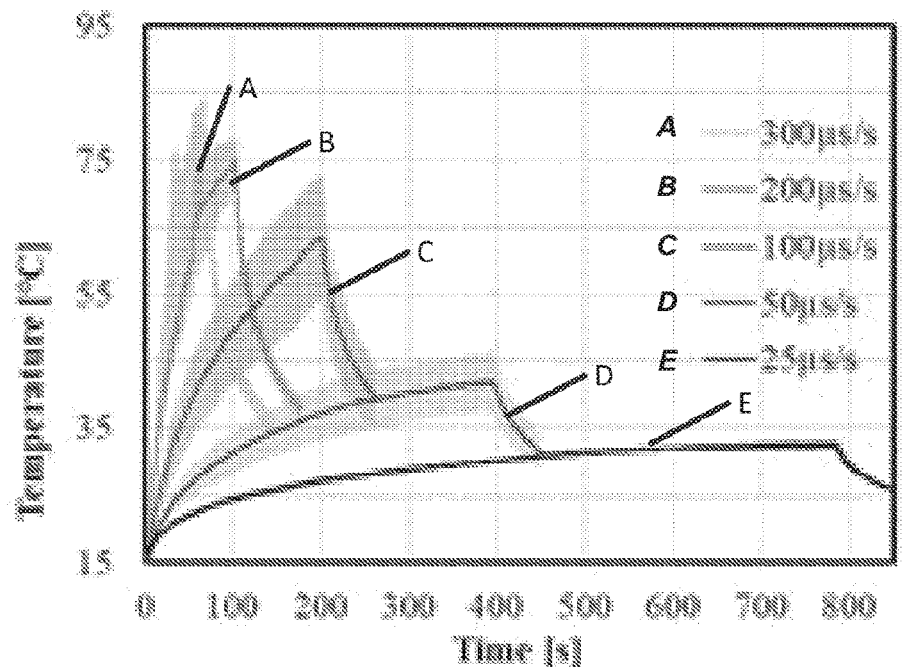
FIGS. 18A, 18B, and 18C illustrate an example of the use of an energy delivery rate to tune the relative proportion of thermal injury to ETT ablation, according to embodiments described herein.
Figure 18B:
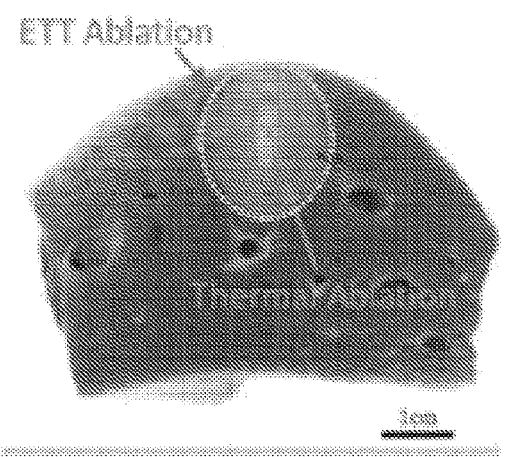
Figure 18C:
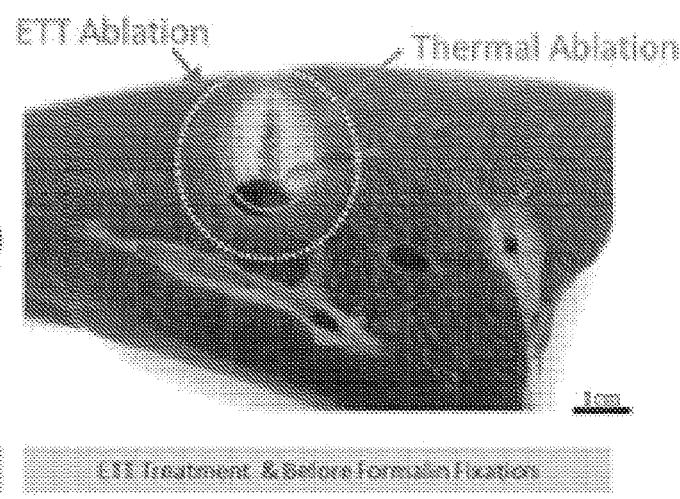

Investigation ETT in ex vivo tissue enabled the evaluation of ETT ablation zones and thermal injury zones as a function of applied energy rate and local temperature, according to embodiments described herein. FIGS. 18A, 18B, and 18C illustrate an example of the use of an energy delivery rate to tune the relative proportion of thermal injury to ETT ablation. FIG. 18A illustrates temperature response to 5 kV ETT treatments delivered at rates of 25 µs/s through 300 µs/s when the total dose delivered is fixed to 0.02 s. FIG. 18B illustrates resulting ETT ablation with a very small thermal injury zone for a 5 kV treatment with delivered at a rate of 25 µs/s for an integrated energized time of 0.08 s. FIG. 18C illustrates resulting ETT ablation with a moderate thermal injury zone for a 5 kV treatment delivered at a rate of 200 µs/s for an integrated energized time of 0.02 s.

As illustrated in FIGS. 18A-18C, treatments were administered to an ex vivo porcine liver model under active mechanical perfusion via single applicator and grounding pad (A+GP). Integrated energized times (IET) between 0.01-0.08 s and energy delivery rates between 25-300 µs/s were investigated. Temperatures were recorded simultaneously in the tissue at a location far from the treatment site, and at the electrode-tissue interface. Organs were preserved at 4° C. for 10-15 hours before sectioning and gross analysis using a metabolic stain to identify the size and shape of ablation zones. The results in FIGS. 18A-18C clearly indicate that the temperature proximal to the applicator electrode can be modulated via the energy delivery rate. By adjusting the energy delivery rate and the local tissue temperature, the ratio ETT to thermal injury can be precisely controlled.

Figure 19:
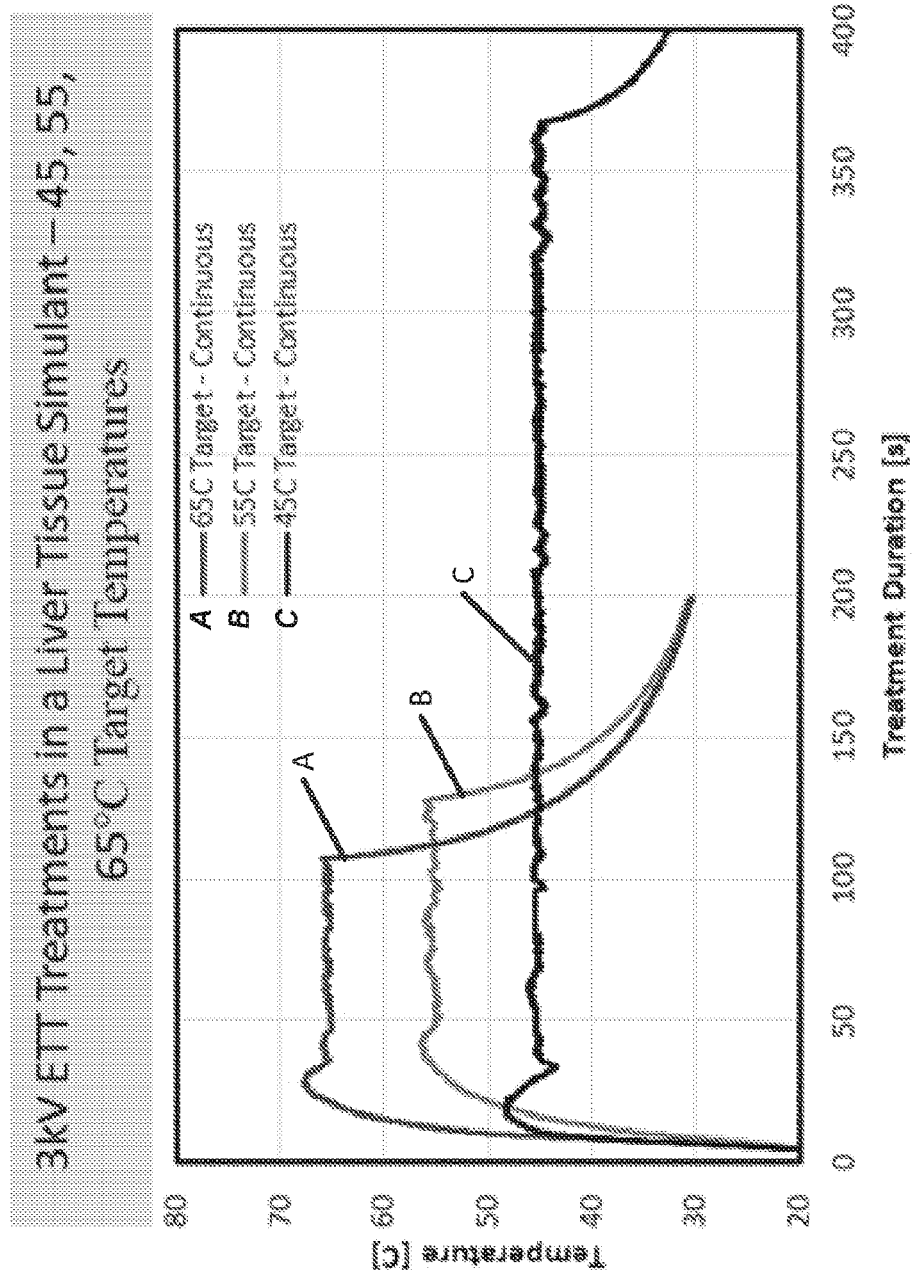
FIG. 19 illustrates a demonstration of ETT temperature control algorithms using a liver simulant, according to embodiments described herein.

FIG. 19 illustrates a demonstration of ETT temperature control algorithms using a liver simulant, according to embodiments described herein. A temperature sensor attached to the applicator electrode was used to obtain real time feedback information as 3 kV ETT waveforms were administered to a liver tissue simulant. The energy delivery rate was dynamically adjusted by increasing or decreasing the time between each subsequent ETT waveform to ensure that the local temperature remained at the target set point.

Figure 20A:
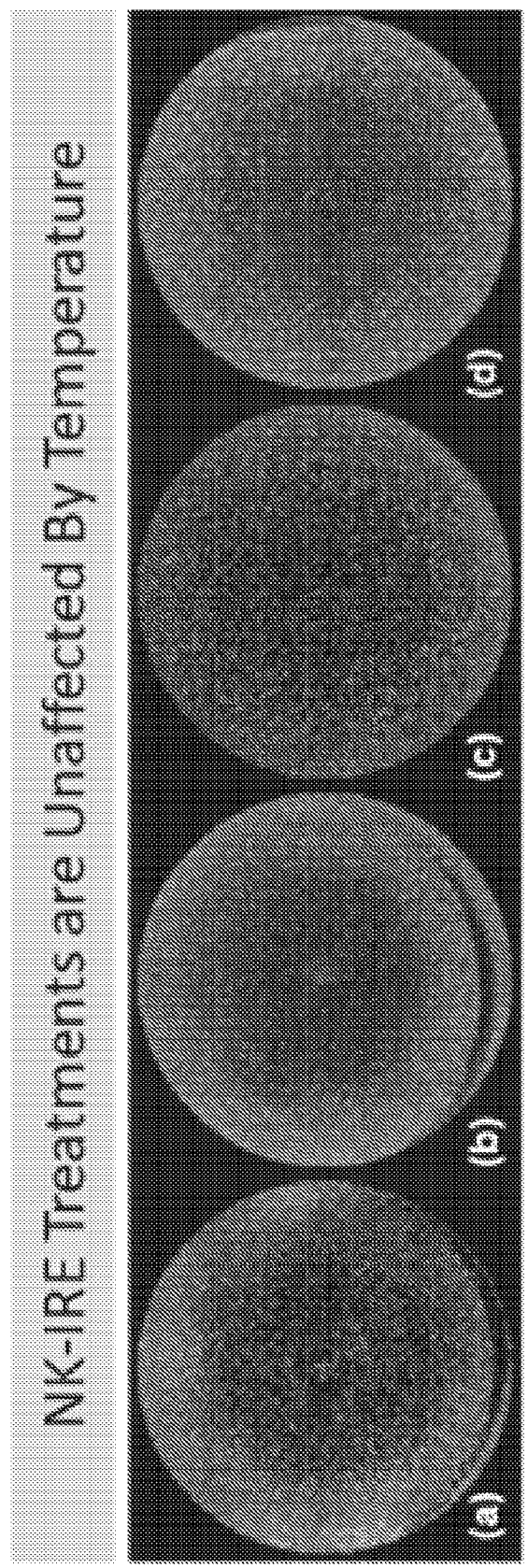
FIGS. 20A, 20B, and 20C illustrate a temperature independence of NK-IRE treatments.
Figures 20B, 20C:
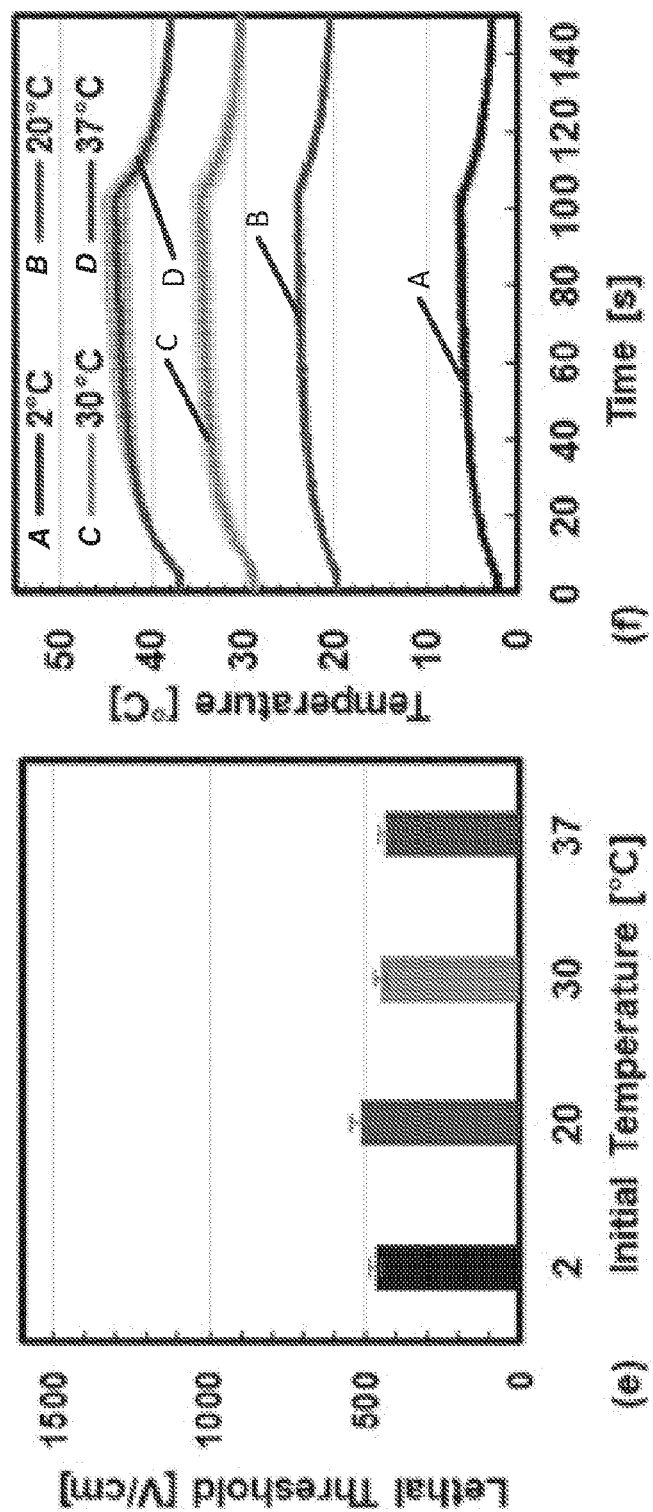

FIGS. 20A, 20B, and 20C illustrate a temperature independence of NK-IRE treatments. FIG. 20A illustrates captured images of NK-IRE ablations created when 500 V pulses were delivered to tumor models at 2° C. (a) (n=3), 20° C. (b) (n=3), 30° C. (c) (n=3) and 37° C. (d) (n=6). FIGS. 20B and 20C illustrate lethal thresholds (FIG. 20B) and temperature profiles (FIG. 20C) for treatments starting at 2° C., 20° C., 30° C. and 37° C.

Referring to FIGS. 20A-20C, NK-IRE treatments consisted of 100×, 100 µs, 500 V positive polarity pulses delivered at 1 Hz. The treatments resulted in characteristic circular ablations surrounding the center pin electrode (FIG. 20A). Cells inside the pin electrode were not exposed to an electric field and were unaffected by the treatment despite exposure to temperatures above 40° C. in some treatments.

The lethal thresholds were 466±19, 514±34, 451±19, and 436±16 V/cm for treatments starting at 2° C., 20° C., 30° C., and 37° C., respectively (FIG. 20B). For these treatments the average temperature rise was 4.3±0.8, 4.5±0.6, 6.2±0.4, and 6.2±1.6° C., respectively (FIG. 20C). A significant (p<0.01) difference in lethal threshold was found between the 37° C. NK-IRE group and the respective 2° C. and 20° C. groups. The NK-IRE ablation diameters changed significantly (p<0.01) but did not change substantially (range: 9.1±0.4-9.8±0.3 mm diameter, FIG. 20A) between the 37° C. group and the respective 2° C. and the 20° C. groups.

Figure 21A:
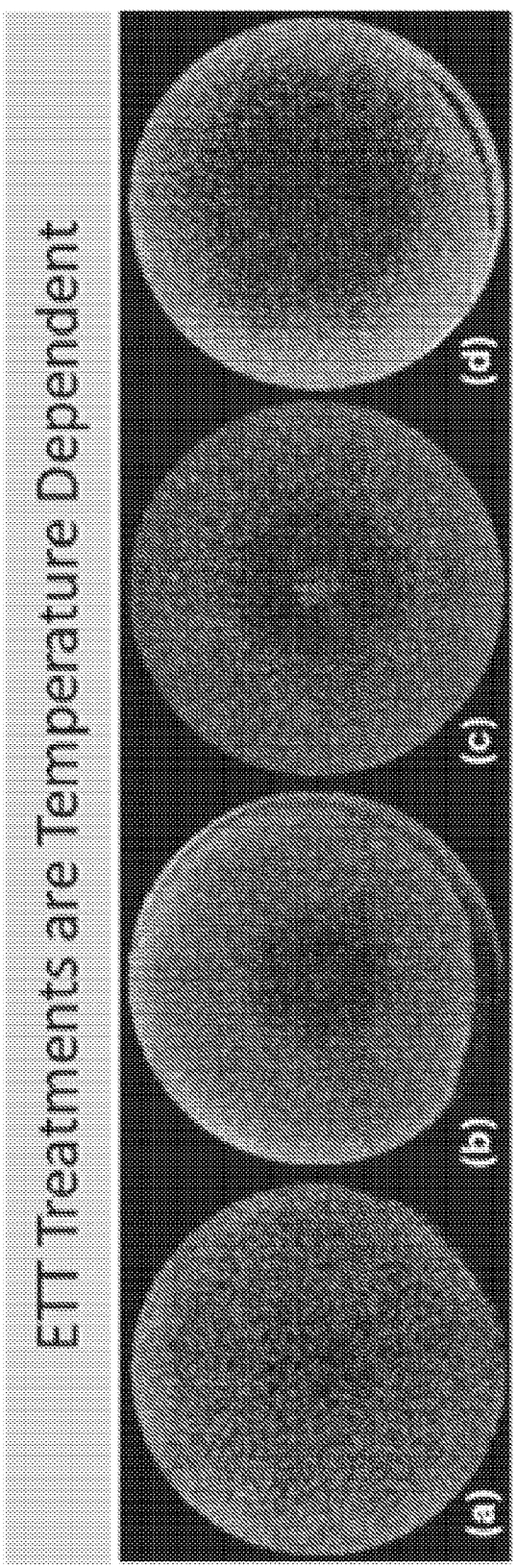
FIGS. 21A, 21B, and 21C illustrate a temperature dependence of ETT treatments, according to embodiments described herein.
Figures 21B, 21C:
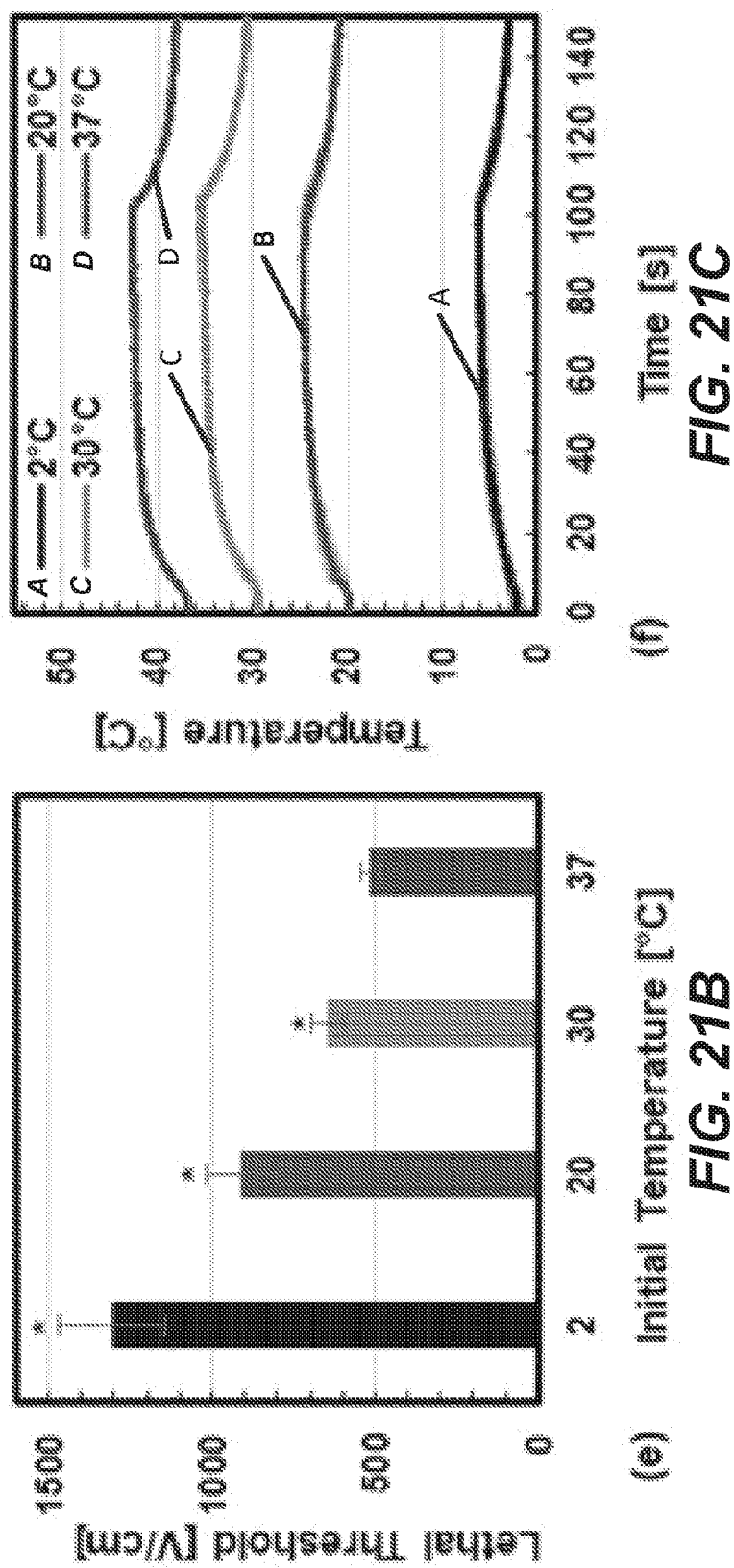

FIGS. 21A, 21B, and 21C illustrate a temperature dependence of ETT treatments, according to embodiments described herein. FIG. 21A illustrates captured images of ablations created when 500V pulses were delivered to tumor models at 2° C. (a) (n=7), 20° C. (b) (n=3), 30° C. (c) (n=3) and 37° C. (d) (n=5). FIGS. 21B and 21C illustrate lethal thresholds (FIG. 21B) and temperature profiles (FIG. 21C) for ETT starting at 2° C., 20° C., 30° C., and 37° C. In FIG. 21C, a '*' marks experimental groups that are statistically different (p<0.01) than the 37° C. treatment group. As illustrated in FIGS. 21A-21C, ETT protocols are affected by initial treatment temperature.

ETT treatments were administered by delivering one positive and one negative 500V 2 µs pulse with a 1 µs delay between pulses (e.g., a 2-1-2 waveform) continuously at a rate of 25 Hz. This waveform was repeated 2500 times (2500×) over 100 s to deliver an equivalent integrated energized time (electrical dose) as the NK-IRE treatments. A rate of 25 Hz was chosen so the continuously delivered waveform delivered the same energized time per second (100 µs/sec) as the NK-IRE treatments.

The lethal thresholds were 1305±164, 911±108, 647±50, 515±29 V/cm for treatments at 2° C., 20° C., 30° C., and 37° C., respectively (FIG. 21B). For these treatments, the average temperature rise was 4.4±0.4, 5.3±0.3, 6.1±1.0, and 6.1±0.7° C., respectively (FIG. 21C). The ETT treatments resulted in ablations where the lethal threshold and ablation diameters changed significantly (p<0.01) (range: 3.3±0.4-8.3±0.5 mm diameter, FIG. 21A) across the 2° C. to 37° C. temperature range tested.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. Although some of the diagrams include arrows on communication paths to show a primary direction of communication, it is to be understood that communication may occur in the opposite direction to the depicted arrows. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Other methods, systems, articles of manufacture, and/or computer program products will be or become apparent to one with skill in the art upon review of the embodiments described herein. It is intended that all such additional systems, methods, articles of manufacture, and/or computer program products be included within the scope of the present disclosure. Moreover, it is intended that all embodiments disclosed herein can be implemented separately or combined in any way and/or combination.

The terminology used herein is for the purpose of describing particular embodiments only and is not intended to be limiting to other embodiments. As used herein, the singular forms "a," "an," and "the" are intended to include the plural forms as well, unless the context clearly indicates otherwise. It will be further understood that the terms "comprises," "comprising," "includes," and/or "including," "have," and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

When a certain example embodiment may be implemented differently, a specific process order may be performed differently from the described order. For example, two consecutively described processes may be performed substantially at the same time or performed in an order opposite to the described order.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method for performing electrothermal therapy (ETT), the method comprising:
 inserting one or more electrodes into a target tissue;
 inserting one or more temperature sensors into the target tissue;
 selecting a pulse waveform for a plurality of electrical pulses, wherein selecting the pulse waveform comprises selecting an average energy delivered per second by the pulse waveform; and delivering to the target tissue the plurality of electrical pulses having the selected pulse waveform through the one or more electrodes, the plurality of electrical pulses configured as a plurality of multi-pulse groups of electrical pulses including a first multi-pulse group of consecutive electrical pulses that precedes a second multi-pulse group of consecutive electrical pulses by an intergroup delay having a duration that is set as a function of a temperature reading from the one or more temperature sensors, the first multi-pulse group of electrical pulses including at least a first pair of intragroup pulses, which have opposite polarities relative to each other and are spaced in time from each other by a pulse-free interval having a non-zero duration, and the second multi-pulse group of electrical pulses including at least a second pair of intragroup pulses, which have opposite polarities relative to each other and are spaced in time from each other by a pulse-free interval having a non-zero duration, wherein a volume of tissue to be treated is controlled by adjusting a rate of energy delivery by the plurality of electrical pulses by adjusting a length of the intergroup delay in response to changes in the temperature reading, to thereby elevate a temperature of the target tissue while maintaining the temperature at or below a threshold value.

2. The method of claim 1, wherein the pulse waveform is a symmetric or an asymmetric waveform that comprises positive pulses with positive durations and negative pulses with negative durations, wherein each of the positive durations and each of the negative durations is between 0.01 to 10 microseconds, and wherein a sum of the positive durations and the negative durations is between 1 and 500 microseconds every second.

3. The method of claim 1, wherein selecting the pulse waveform comprises selecting positive electrical pulses comprising a first voltage magnitude and negative electrical pulses comprising a second voltage magnitude, wherein a first absolute value of the first voltage magnitude is within 10% of a second absolute value of the second voltage magnitude.

4. The method of claim 3, wherein the positive electrical pulses and the negative electrical pulses have a same duration of 0.01 to 10 microseconds.

5. The method of claim 1, wherein the plurality of electrical pulses comprise positive electrical pulses and negative electrical pulses, with at least one of the positive electrical pulses having a different duration than at least one of the negative electrical pulses, and wherein a first total on-time duration of the positive electrical pulses is substantially equal to a second total on-time duration of the negative electrical pulses.

6. The method of claim 1, wherein selecting the pulse waveform comprises selecting positive electrical pulses and negative electrical pulses, wherein a first voltage magnitude of the positive electrical pulses is different than a second voltage magnitude of the negative electrical pulses.

7. The method of claim 1, wherein the pulse waveform comprises a positive pulse and a negative pulse repeated at a frequency between 25 Hz and 100 Hz.

8. The method of claim 1, wherein the length of the intergroup delay is controlled to maintain the temperature of the target tissue between 30° C. and 50° C.

9. The method of claim 1, wherein, after delivering to the target tissue the plurality of electrical pulses, the target tissue comprises thermal necrosis that is surrounded by cells that have had their membranes permeabilized.

10. An apparatus for electrothermal therapy (ETT) comprising:

one or more electrodes for insertion into a target tissue;
one or more temperature sensors; and
a computer controller configured to perform operations comprising:

selecting a pulse waveform comprising a plurality of electrical pulses, wherein selecting the pulse waveform comprises selecting an average energy delivered per second by the pulse waveform;

generating the plurality of electrical pulses having the selected pulse waveform, the plurality of electrical pulses configured as a plurality of multi-pulse groups of electrical pulses including a first multi-pulse group of consecutive electrical pulses that precedes a second multi-pulse group of consecutive electrical pulses by an intergroup delay;

controlling the intergroup delay based on a temperature reading from the one or more temperature sensors; and delivering the plurality of electrical pulses through the one or more electrodes, wherein the first multi-pulse group of electrical pulses includes at least a first pair of intragroup pulses, which have opposite polarities relative to each other and are spaced in time from each other by a pulse-free interval having a non-zero duration, and the second multi-pulse group of electrical pulses includes at least a second pair of intragroup pulses, which have opposite polarities relative to each other and are spaced in time from each other by a pulse-free interval having a non-zero duration, and wherein a volume of tissue to be treated is controlled by elevating a temperature of the target tissue based on a rate of energy delivery by the plurality of electrical pulses and by adjusting the rate of energy delivery by adjusting a length of the intergroup delay.

11. The apparatus of claim 10, wherein the pulse waveform is a symmetric or an asymmetric waveform that comprises positive pulses with positive durations and negative pulses with negative durations.

12. The apparatus of claim 11, wherein a sum of the positive durations and the negative durations are between 0.02 microseconds and 5000 microseconds every second.

13. The apparatus of claim 10, wherein selecting the pulse waveform comprises selecting positive electrical pulses comprising a first voltage magnitude and negative electrical pulses comprising a second voltage magnitude, and wherein a first absolute value of the first voltage magnitude is within 10% of a second absolute value of the second voltage magnitude.

14. The apparatus of claim 13, wherein the positive electrical pulses and the negative electrical pulses have a same duration of 0.01 to 10 microseconds.

15. The apparatus of claim 10, wherein the plurality of electrical pulses comprise positive electrical pulses and negative electrical pulses, with at least one of the positive electrical pulses having a different duration than at least one of the negative electrical pulses, and wherein a first total on-time duration of the positive electrical pulses is substantially equal to a second total on-time duration of the negative electrical pulses.

16. A method for performing electrothermal therapy (ETT), the method comprising:
inserting one or more electrodes and one or more temperature sensors into a target tissue;
selecting a pulse waveform for a plurality of electrical pulses, wherein selecting the pulse waveform comprises selecting an average energy delivered per second by the pulse waveform; and
delivering to the target tissue, via the one or more electrodes, the plurality of electrical pulses configured as a plurality of multi-pulse groups of electrical pulses including a first multi-pulse group of consecutive electrical pulses that precedes a second multi-pulse group of consecutive electrical pulses by an intergroup delay having a duration that is set as a function of a temperature reading from the one or more temperature sensors, the first multi-pulse group of electrical pulses including at least a first pair of intragroup pulses, which have opposite polarities relative to each other and are spaced in time from each other by a first pulse-free interval having a non-zero duration, and the second multi-pulse group of electrical pulses including at least a second pair of intragroup pulses, which have opposite polarities relative to each other and are spaced in time from each other by a second pulse-free interval having a non-zero duration,
wherein a volume of tissue to be treated is controlled by elevating a temperature of the target tissue upon delivery of energy thereto by the plurality of electrical pulses and by adjusting a rate of the delivery of energy to the target tissue by adjusting a length of the intergroup delay.

17. The method of claim 16, wherein the first pulse-free interval and the second pulse-free interval each have a fixed duration, and
wherein a duration of a first pulse included in the first pair of intragroup pulses is about twice as long as a duration of the first pulse-free interval.

18. The method of claim 16, wherein a combined duration of the first pair of intragroup pulses and the first pulse-free interval does not exceed 5 microseconds.

19. The method of claim 16, wherein the temperature of the target tissue is elevated above 37° C.

20. The method of claim 16, wherein the plurality of electrical pulses comprise positive electrical pulses and negative electrical pulses, and
wherein ones of the positive electrical pulses have a different duration from each other, and ones of the negative electrical pulses have a different duration from each other.

21. The method of claim 16, wherein adjusting the length of the intergroup delay comprises increasing the length of the intergroup delay in response to the temperature reading from the one or more temperature sensors indicating that the temperature of the target tissue has reached a predetermined threshold, to thereby downward adjust the rate of the delivery of energy to the target tissue.

* * * * *